United States Patent
Hasegawa et al.

(10) Patent No.: US 9,266,142 B2
(45) Date of Patent: Feb. 23, 2016

(54) COATING DEVICE

(75) Inventors: Koji Hasegawa, Itami (JP); Yasuhiro Hotta, Itami (JP); Naotoshi Kinoshita, Itami (JP); Tarou Endou, Itami (JP); Shuichiro Fukuda, Itami (JP); Kazuhiro Uchida, Itami (JP); Yosuke Tomita, Itami (JP); Hitoshi Kamada, Itami (JP); Kazunori Wakabayashi, Itami (JP)

(73) Assignee: KABUSHIKI KAISHA POWREX, Hyogo (JP)

( * ) Notice: Subject to any disclaimer, the term of this patent is extended or adjusted under 35 U.S.C. 154(b) by 126 days.

(21) Appl. No.: 14/232,341

(22) PCT Filed: Sep. 6, 2012

(86) PCT No.: PCT/JP2012/072776
§ 371 (c)(1),
(2), (4) Date: Jan. 13, 2014

(87) PCT Pub. No.: WO2013/035800
PCT Pub. Date: Mar. 14, 2013

(65) Prior Publication Data
US 2014/0137797 A1    May 22, 2014

(30) Foreign Application Priority Data

| Sep. 6, 2011 | (JP) | 2011-194059 |
| Mar. 30, 2012 | (JP) | 2012-080373 |
| Jun. 12, 2012 | (JP) | 2012-132902 |
| Jun. 25, 2012 | (JP) | 2012-141955 |
| Jun. 26, 2012 | (JP) | 2012-143281 |
| Jun. 26, 2012 | (JP) | 2012-143282 |
| Jun. 26, 2012 | (JP) | 2012-143284 |
| Jun. 26, 2012 | (JP) | 2012-143285 |

(51) Int. Cl.
*B05C 9/12* (2006.01)
*B05C 3/08* (2006.01)
(Continued)

(52) U.S. Cl.
CPC ............... *B05C 9/12* (2013.01); *A23G 3/2076* (2013.01); *A23G 3/26* (2013.01); *A23P 1/083* (2013.01);
(Continued)

(58) Field of Classification Search
CPC .......... A23G 3/26; A23G 3/2076; A23L 1/31; A23P 1/082; A61J 3/005; B01J 2/00; B01J 2/12; B01J 2/14; B01J 2/003; B05C 3/08; B05C 9/12; F26B 13/005; F26B 17/108; F27B 7/22
USPC ......... 118/19, 58, 303; 34/601, 610; 366/105, 366/234, 175.3
See application file for complete search history.

(56) References Cited

U.S. PATENT DOCUMENTS 4,245,580 A * 1/1981 Okawara .......................... 118/19
4,363,285 A   12/1982 Yoshida et al.
(Continued)

FOREIGN PATENT DOCUMENTS

CN    1048167    1/1991
CN    1105294    7/1995
(Continued)

OTHER PUBLICATIONS

Chinese Office Action issued Jan. 7, 2015 in corresponding Chinese Patent Application No. 201280032567.6 with English translation.
(Continued)

*Primary Examiner* — Laura Edwards
(74) *Attorney, Agent, or Firm* — Wenderoth, Lind & Ponack, L.L.P.

(57) ABSTRACT

A partition portion includes a proximal portion fixed to the outer periphery of the peripheral wall portion and a sealing member mounted to the proximal portion in a manner that the sealing member is allowed to move in inner and outer circumferential directions of the peripheral wall portion. When receiving a force toward an outer circumferential direction, the sealing member is moved in the outer circumferential direction, and a distal end portion thereof is held in press-contact with a sliding contact portion of a ventilation member with a force generated along with the above-mentioned force.

11 Claims, 34 Drawing Sheets

(51) Int. Cl.
  *B01J 2/00* (2006.01)
  *A23G 3/20* (2006.01)
  *A23P 1/08* (2006.01)
  *A23G 3/26* (2006.01)
  *B01J 2/12* (2006.01)
  *B01J 2/14* (2006.01)

(52) U.S. Cl.
  CPC .. *B01J 2/00* (2013.01); *B01J 2/006* (2013.01); *B01J 2/12* (2013.01); *B05C 3/08* (2013.01); *B01J 2/14* (2013.01)

(56) References Cited

U.S. PATENT DOCUMENTS

| | | |
|---|---|---|
| 4,476,804 A | 10/1984 | Glatt et al. |
| 4,543,906 A | 10/1985 | Glatt et al. |
| 4,785,759 A | 11/1988 | Motoyama et al. |
| 5,038,709 A | 8/1991 | Yamada et al. |
| 5,397,393 A | 3/1995 | Tsujino et al. |
| 5,507,868 A | 4/1996 | Takei et al. |
| 5,531,826 A | 7/1996 | Fusejima et al. |
| 2002/0182129 A1 | 12/2002 | Filippi et al. |
| 2006/0108796 A1 | 5/2006 | Welle |
| 2008/0271668 A1 | 11/2008 | Hasegawa et al. |
| 2008/0289571 A1 | 11/2008 | Isobe et al. |
| 2011/0079301 A1 | 4/2011 | Karihara |
| 2011/0203520 A1 | 8/2011 | Fusejima et al. |

FOREIGN PATENT DOCUMENTS

| | | |
|---|---|---|
| CN | 2290397 | 9/1998 |
| CN | 1536252 | 10/2004 |
| CN | 1682064 | 10/2005 |
| CN | 102037365 | 4/2011 |
| CN | 102202778 | 9/2011 |
| EP | 0 355 771 | 2/1990 |
| GB | 2 057 308 | 4/1981 |
| JP | 58-137437 | 8/1983 |
| JP | 62-174633 | 11/1987 |
| JP | 63-062536 | 3/1988 |
| JP | 6-23258 | 2/1994 |
| JP | 6-63377 | 3/1994 |
| JP | 07-163853 | 6/1995 |
| JP | 7-63608 | 7/1995 |
| JP | 8-266883 | 10/1996 |
| JP | 8-323179 | 12/1996 |
| JP | 2000-093903 | 4/2000 |
| JP | 2001-58125 | 3/2001 |
| JP | 2001-096143 | 4/2001 |
| JP | 2002-113401 | 4/2002 |
| JP | 3349580 | 11/2002 |
| JP | 2003-1088 | 1/2003 |
| JP | 2003-62500 | 3/2003 |
| JP | 2004-097853 | 4/2004 |
| JP | 2004-148292 | 5/2004 |
| JP | 2005-296777 | 10/2005 |
| JP | 2005-305227 | 11/2005 |
| JP | 2008-253910 | 10/2008 |
| JP | 2008-279429 | 11/2008 |
| JP | 2010-99555 | 5/2010 |
| WO | 82/03972 | 11/1982 |

OTHER PUBLICATIONS

Korean Notice of Allowance dated Jun. 1, 2015, in corresponding Korean Application No. 2014-7008790 (with partial English translation).

International Preliminary Report on Patentability and Written Opinion of the International Searching Authority issued Mar. 20, 2014 in International (PCT) Application No. PCT/JP2012/072776.

International Search Report issued Nov. 20, 2012 in International (PCT) Application No. PCT/JP2012/072776.

Extended European Search Report issued Jul. 1, 2015 in corresponding European Patent Application No. 12829971.6.

Office Action issued Nov. 26, 2015 in corresponding Japanese Application No. 2012-132902 with partial English translation.

* cited by examiner

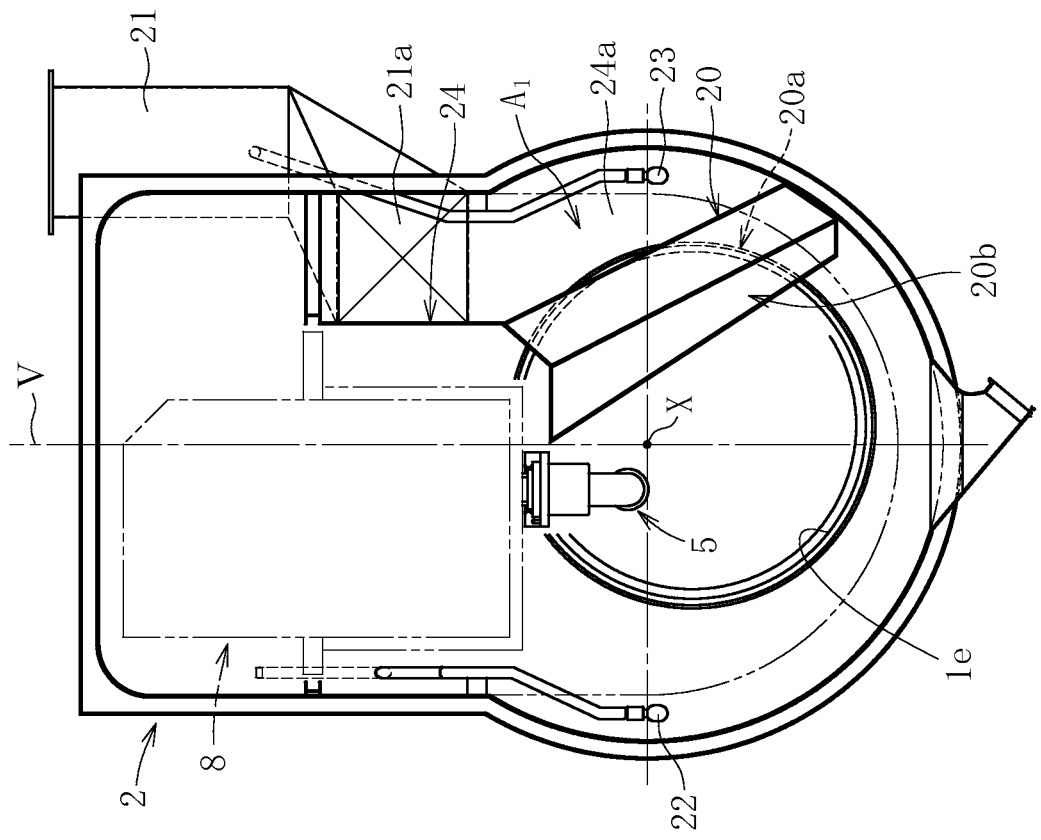
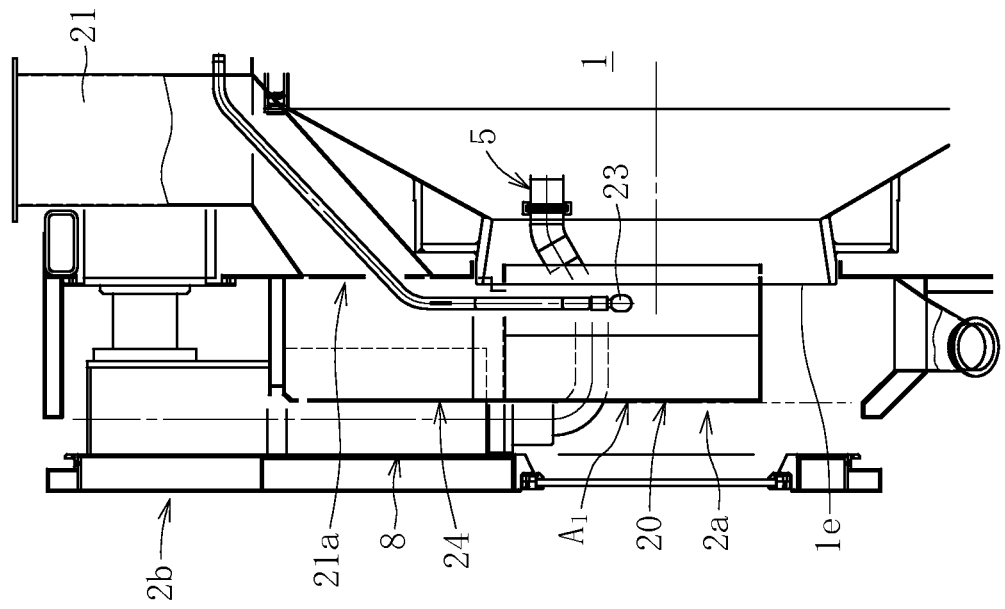

COATING DEVICE

This application is a 371 of PCT/JP2012/072776 filed Sep. 6, 2012.

TECHNICAL FIELD

The present invention relates to a coating apparatus for performing coating, mixing, drying, and the like of medical products, food, pesticidal products, and the like in a granular form, and more particularly, to a coating apparatus including a ventilated-type rotating drum to be driven to rotate about its axis.

BACKGROUND ART

Coating apparatus including a rotating drum have been used for performing film coating, sugar coating, and the like of medical products, food, pesticidal products, and the like, which are prepared as tablets, soft capsules, pellets, grains, and in other similar forms (hereinafter collectively referred to as "particles").

The following Patent Literatures 1 to 10 disclose this type of coating apparatus.

For example, Patent Literature 1 discloses a coating apparatus including a ventilated-type rotating drum to be driven to rotate about a horizontal axis. The rotating drum includes a peripheral wall portion having a polygonal shape in cross-section, and the peripheral wall portion includes side surfaces having ventilation characteristics due to porous portions. Further, a jacket is mounted on an outer peripheral side of each of the side surfaces of the peripheral wall portion, and a ventilation channel is formed between the jacket and each of the side surfaces of the peripheral wall portion. Further, on another end side of the rotating drum where a rotary drive mechanism including a motor is set, there is arranged a ventilation mechanism for controlling ventilation of a process gas such as dry air for the rotating drum. The ventilation mechanism has a function to communicate the ventilation channels that have come to predetermined positions along with rotation of the rotating drum respectively to an air inlet duct and to an air outlet duct.

Further, Patent Literatures 2 and 3 each disclose a coating apparatus having what is called a jacketless structure. A rotating drum of a coating apparatus illustrated in FIG. 1 of Patent Literature 2 includes the peripheral wall portion having a polygonal shape in cross-section. The peripheral wall portion of the rotating drum includes the side surfaces having ventilation characteristics due to the porous portions. Partition plates are provided respectively at apexes of the polygonal peripheral wall portion, and sliding frames are provided along both axial end portions of the peripheral wall portion. Ventilation spaces are formed by being divided by the side surfaces, the partition plates, and the sliding frames of the peripheral wall portion. The rotating drum is accommodated in an inside of an outer casing, and the outer casing includes an air inlet portion and an air outlet portion provided respectively on an upper side and a lower side thereof. The air outlet portion on the lower side includes a sealing plate made of rubber, a synthetic resin, or the like. Along with the rotation of the rotating drum, the partition plates and the sliding frames of the peripheral wall portion are held in sliding contact with the sealing plate. With this, air in an interior space of the outer casing is prevented from being exhausted without contributing to drying of particles in the rotating drum. The peripheral wall portion includes an upper part opened to the interior space of the outer casing. A drying gas supplied from the air inlet portion on the upper side to the interior space of the outer casing enters the rotating drum through the porous portion at the upper part of the peripheral wall portion, and passes through a particle layer in the rotating drum. Then, along with the rotation of the rotating drum, the drying gas is exhausted to the air outlet portion through the ventilation space that has come to a position corresponding to the air outlet portion on the lower side. A rotating drum of a coating apparatus illustrated in FIG. 2 of Patent Literature 2 includes a peripheral wall portion having a circular shape in cross-section. Further, a sealing plate having a circular-arc shape in cross-section is provided on each of the air inlet portion side and the air outlet portion side. Patent Literature 3 also discloses a coating apparatus having a jacketless structure that is basically the same as that disclosed in Patent Literature 2.

CITATION LIST

Patent Literature

Patent Literature 1: JP 2001-58125 A
Patent Literature 2: JP 07-63608 B
Patent Literature 3: JP 2008-253910 A
Patent Literature 4: JP 2003-1088 A
Patent Literature 5: JP 2003-62500 A
Patent Literature 6: JP 08-266883 A
Patent Literature 7: JP 2010-99555 A
Patent Literature 8: JP 3349580 B
Patent Literature 9: JP 2002-113401 A
Patent Literature 10: 2004-148292 A

SUMMARY OF INVENTION

Technical Problems

In the coating apparatus having the jacketless structure according to Patent Literatures 2 and 3, exhaust air is sealed by holding the sliding frames and the partition plates provided to the rotating drum in sliding contact with the sealing plate provided on the air outlet side. Thus, the sealing plate is liable to be abraded, and the abrasion of the sealing plate is liable to cause leakage and a short circuit of the exhaust air (phenomenon that the drying gas supplied in the rotating drum is exhausted without contributing to drying of the particle layer). Meanwhile, in order to replace the abraded sealing plate, operations of removing the air outlet duct of the air outlet portion and the rotating drum are required, and burden of this operation is heavy.

Further, a sliding contact force between the sliding frames and the partitions plates and the sealing plate is fluctuated by influence of decentering of a rotational axis of the rotating drum, distortion of the casing, and the like. As the sliding contact force fluctuates to be excessively greater, the sealing plate is more liable to be abraded to generate contaminants. As the sliding contact force fluctuates to be excessively smaller, the leakage and the short circuit of the exhaust air are liable to be caused.

Still further, in order to effect hermetical sealing with respect to the exhaust air by holding the sliding frames and the partition plates of the rotating drum and the sealing plate in sliding contact with each other, dimensions and shapes of the sliding frames, the partition plates, and the sealing plate need to be managed with high accuracy. Thus, manufacturing cost is increased, and processing operations become more troublesome and complicated. In addition, there is a fundamental problem that it is practically difficult to manage the dimensions and shapes so that outer peripheries (circular shapes) of the sliding frames and an inner surface (circular-arc shape) of the sealing plate are held in close sliding contact with each other, and hence sealing with respect to the exhaust air is liable to be insufficient.

Yet further, the partition plates of the polygonal rotating drum are provided respectively at the apexes of the peripheral wall portion, and hence an interval between adjacent ones of the partition plates in the rotational direction is large. Thus, a dimension in the rotational direction of each of the ventilation spaces divided by the partition plates is increased, and hence a risk of occurrence of the short circuit of the exhaust air becomes higher. Specifically, when one of the partition plates enters a region of the air outlet portion along with the rotation of the rotating drum, the ventilation spaces divided by the partition plate communicate to the air outlet portion. When the dimension in the rotational direction of the ventilation spaces is large, the drying gas in the rotating drum enters the ventilation spaces through a region in which the particle layer is thin or via an upper side of the particle layer, and is exhausted to the air outlet portion through the ventilation spaces.

It is an object of the present invention to provide a coating apparatus that has a jacketless structure without jackets for ventilation channels unlike the coating apparatus disclosed in Patent Literature 1, and is less liable to cause leakage and a short circuit of exhaust air.

It is another object of the present invention to provide a configuration of a sealing portion of the coating apparatus having the jacketless structure, which is less liable to be influenced by decentering of a rotational axis of a rotating drum, distortion of a casing, and the like, has a dimension and shape that can be easily managed, and may be replaced by a simple operation.

Solution to Problem

In order to achieve the above-mentioned objects, according to one embodiment of the present invention, there is provided a coating apparatus, comprising a ventilated-type rotating drum that contains particles to be processed and is driven to rotate about an axis of the ventilated-type rotating drum, wherein the ventilated-type rotating drum comprises: a peripheral wall portion comprising a ventilation portion for communicating an inside of the ventilated-type rotating drum and an outside of the ventilated-type rotating drum to each other; and a plurality of partition portions provided on an outer periphery of the peripheral wall portion at predetermined intervals in a rotational direction of the ventilated-type rotating drum, wherein the coating apparatus further comprises a ventilation member comprising a ventilation hole and arranged on an outer peripheral side of the peripheral wall portion of the ventilated-type rotating drum, and wherein the plurality of partition portions each comprise: a proximal portion fixed to the outer periphery of the peripheral wall portion; and a sealing member mounted to the proximal portion in a manner that the sealing member is allowed to move in inner and outer circumferential directions of the peripheral wall portion, the sealing member being held in sliding contact with the ventilation member during rotation of the ventilated-type rotating drum.

In the above-mentioned structure, the coating apparatus may further comprise annular sealing rings mounted respectively to both axial end portions of the outer periphery of the peripheral wall portion, and the annular sealing rings may be held in sliding contact with the ventilation member during the rotation of the ventilated-type rotating drum.

In the above-mentioned structure, the ventilation member may be arranged at a predetermined position in the rotational direction of the ventilated-type rotating drum, or the ventilation member may be arranged so as to cover the peripheral wall portion of the ventilated-type rotating drum from the outer peripheral side.

In the above-mentioned structure, the sealing member of each of the plurality of partition portions may be held in press-contact with the ventilation member by being urged by a centrifugal force generated during the rotation of the ventilated-type rotating drum.

In the above-mentioned structure, the peripheral wall portion of the ventilated-type rotating drum may have a polygonal shape in cross-section.

In the above-mentioned structure, the plurality of partition portions may be arranged respectively at apexes and side surfaces of the peripheral wall portion of the ventilated-type rotating drum.

In addition to the invention described above, the present application also encompasses the following inventions.

There is provided a coating apparatus, comprising: a rotating drum that contains particles to be processed therein and is driven to rotate about an axis of the rotating drum; a spray nozzle unit comprising one or a plurality of spray nozzles for spraying spray liquid to a particle layer in an inside of the rotating drum; and a nozzle moving mechanism for moving in/out, between the inside of the rotating drum and an outside of the rotating drum, the spray nozzle unit through an front end opening portion of the rotating drum, wherein the nozzle moving mechanism comprises a nozzle position adjustment mechanism for moving the spray nozzle unit between a first position at which the spray nozzle unit is located on a radially inner side with respect to a diameter of the front end opening portion of the rotating drum, and a second position at which at least the one or a plurality of spray nozzles of the spray nozzle unit are located on a radially outer side with respect to the diameter of the front end opening portion of the rotating drum and on a downstream side in a rotational direction of the rotating drum with respect to a vertical plane comprising the axis of the rotating drum. The nozzle position adjustment mechanism preferably swivels the spray nozzle unit between the first position and the second position, and more preferably, swivels the spray nozzle unit together with a front panel for closing a front portion of a casing.

There is provided another coating apparatus, comprising: a rotating drum that contains particles to be processed therein and is driven to rotate about an axis of the rotating drum; a spray nozzle unit comprising one or a plurality of spray nozzles for spraying spray liquid to a particle layer in an inside of the rotating drum; and an air inlet portion for supplying a process gas to the inside of the rotating drum through an opening portion provided to at least one of a front end portion or a rear end portion in a direction of the axis of the rotating drum, wherein the air inlet portion comprises an airflow control portion for controlling a flow of the process gas supplied to the inside of the rotating drum through the opening portion so that the process gas flows toward a space portion in the rotating drum, the space portion being above the particle layer and corresponding to a rear side of the spray nozzle unit. The airflow control portion may comprise an airflow guide plate for guiding the process gas to the space portion. In this case, the airflow guide plate may be arranged in an inclined posture so that the process gas flows toward the space portion. Alternatively, the airflow guide plate may be arranged at a position within a range of the opening portion of the rotating drum, which corresponds to a region on an upstream side in a rotational direction of the rotating drum with respect to a vertical plane comprising the axis of the rotating drum. Still alternatively, the airflow control portion may comprise an air inlet chamber communicating to the opening portion of the rotating drum, and an airflow swirling portion for generating the flow toward the space portion by swirling the process gas in the air inlet chamber.

There is provided still another coating apparatus, comprising a ventilated-type rotating drum that contains particles to be processed therein and is driven to rotate about an axis of the ventilated-type rotating drum, wherein the ventilated-type rotating drum comprises a peripheral wall portion comprising a ventilation portion for communicating an inside of the ventilated-type rotating drum and an outside of the ventilated-type rotating drum to each other, wherein the coating apparatus further comprises: a washing bath for pooling washing liquid, the washing bath being arranged on an outer peripheral side with respect to the ventilated-type rotating drum; and bubble generating means for mixing bubbles into the washing liquid, and wherein the ventilated-type rotating drum is washed by being rotated under a state in which the peripheral wall portion of the ventilated-type rotating drum is immersed in the washing liquid pooled in the washing bath and mixed with the bubbles. Here, a diameter of the bubbles mixed in the washing liquid is preferably smaller than a diameter of the ventilation portion (ventilation hole) of the peripheral wall portion. Specifically, a number median diameter ranges, for example, from 500 μm to 0.5 μm, preferably 200 μm to 0.5 μm, more preferably 100 μm to 0.5 μm (microbubbles). Alternatively, when the ventilation portion (ventilation hole) is formed to have a major diameter and a minor diameter, the number median diameter is preferably smaller than at least one twentieth of the minor diameter of the ventilation portion (ventilation hole). When the diameter of the bubbles is excessively larger than that of the ventilation portion, washability in the ventilation hole is deteriorated. The washing bath may comprise an overflow drain portion for causing the washing liquid to overflow to be drained from the washing bath, the overflow drain portion being provided on a downstream side in a rotational direction of the ventilated-type rotating drum.

There is provided yet another coating apparatus, comprising: a ventilated-type rotating drum that contains particles to be processed therein and is driven to rotate about an axis of the ventilated-type rotating drum; and a washing bath for pooling washing liquid, the washing bath being arranged on an outer peripheral side with respect to the ventilated-type rotating drum, wherein the ventilated-type rotating drum comprises a peripheral wall portion comprising a ventilation portion for communicating an inside of the ventilated-type rotating drum and an outside of the ventilated-type rotating drum to each other, wherein the ventilated-type rotating drum is washed by being rotated under a state in which the peripheral wall portion is immersed in the washing liquid pooled in the washing bath so that the washing liquid is supplied to the inside of the ventilated-type rotating drum through the ventilation portion, wherein the ventilated-type rotating drum further comprises a plurality of flowing members for flowing the washing liquid in the washing bath to a downstream side in a rotational direction of the ventilated-type rotating drum during rotation of the ventilated-type rotating drum, wherein the plurality of flowing members are provided on an outer periphery of the peripheral wall portion, and each comprise a movable portion that is movable in inner and outer circumferential directions of the peripheral wall portion, and wherein the washing liquid in the washing bath comprises: a restriction region in which the movable portion is restricted by a restricting member to an inner circumferential position with respect to an outermost circumferential position; and a release region in which the movable portion is released to the outer peripheral side.

There is provided yet another coating apparatus, comprising: a rotating drum that contains particles to be processed therein and is driven to rotate about an axis of the rotating drum; a baffle for stirring the particles, the baffle being provided on an inner surface of a wall portion of the rotating drum; and height adjustment means that is capable of adjusting a height of the baffle with respect to the inner surface of the wall portion from an outside of the rotating drum. The height adjustment means adjusts the height of the baffle, for example, by changing a position of the baffle along a height direction. Specifically, the height adjustment means comprises a height adjustment pin having a height to pass through the wall portion of the rotating drum in a freely retractable manner. The height adjustment pin comprises one end mounted in a freely removable manner to the baffle, and another end mounted in a freely removable manner to an outer side of the rotating drum. In order to change the position of the baffle along the height direction, the height adjustment pin is replaced with a height adjustment pin having a different height. Alternatively, the height adjustment means adjusts the height of the baffle by inclining the baffle with respect to the height direction. Still alternatively, the height adjustment means comprises a baffle that comprises one end mounted in a freely removable manner to the outer side of the rotating drum and passes through the wall portion of the rotating drum in a freely retractable manner. In order to adjust the height of the baffle, the baffle is replaced with another baffle having a different height.

There is provided yet another coating apparatus, comprising: a rotating drum that contains particles to be processed therein and is driven to rotate about a horizontal axis of the rotating drum; and a plate-like baffle for stirring the particles, the plate-like baffle being provided on an inner surface of a peripheral wall portion of the rotating drum, wherein the plate-like baffle comprises: a plurality of upper baffles arranged at predetermined intervals in a circumferential direction of the rotating drum; and a plurality of lower baffles arranged at predetermined intervals in the circumferential direction of the rotating drum, wherein the plurality of upper baffles and the plurality of lower baffles extend in respective directions inclined opposite to each other with respect to the circumferential direction of the rotating drum, and wherein a height of a lower end of each of the plurality of upper baffles is equal to or larger than a height of an upper end of each of the plurality of lower baffles. A region of the peripheral wall portion, in which the plurality of upper baffles and the plurality of lower baffles are arranged, is divided along the circumferential direction into a plurality of compartments that are equal to each other in axial length. In this case, the plurality of compartments may be equal to each other in numbers of the upper baffles and the lower baffles provided therein. Alternatively, the peripheral wall portion may comprise a plurality of unit regions each comprising the upper baffles and the lower baffles, the plurality of unit regions extending in the circumferential direction and being arrayed in the axial direction.

Advantageous Effects of Invention

According to the present invention, it is possible to provide the coating apparatus that has a jacketless structure without jackets unlike the coating apparatus disclosed in Patent Literature 1, and is less liable to cause leakage and a short circuit of exhaust air.

Further, it is also possible to provide the configuration of the sealing portion of the coating apparatus having the jacketless structure, which is less liable to be influenced by decentering of the rotational axis of the rotating drum, distortion of the casing, and the like, has a dimension and shape that can be easily managed, and may be replaced by a simple operation.

BRIEF DESCRIPTION OF DRAWINGS

FIG. 9(A) is a front view of a front end portion of a casing, for illustrating an air inlet portion on a front end portion side of the rotating drum.

FIG. 9(B) is a vertical sectional view of a peripheral portion of the air inlet portion.

DESCRIPTION OF EMBODIMENTS

Figure 1:
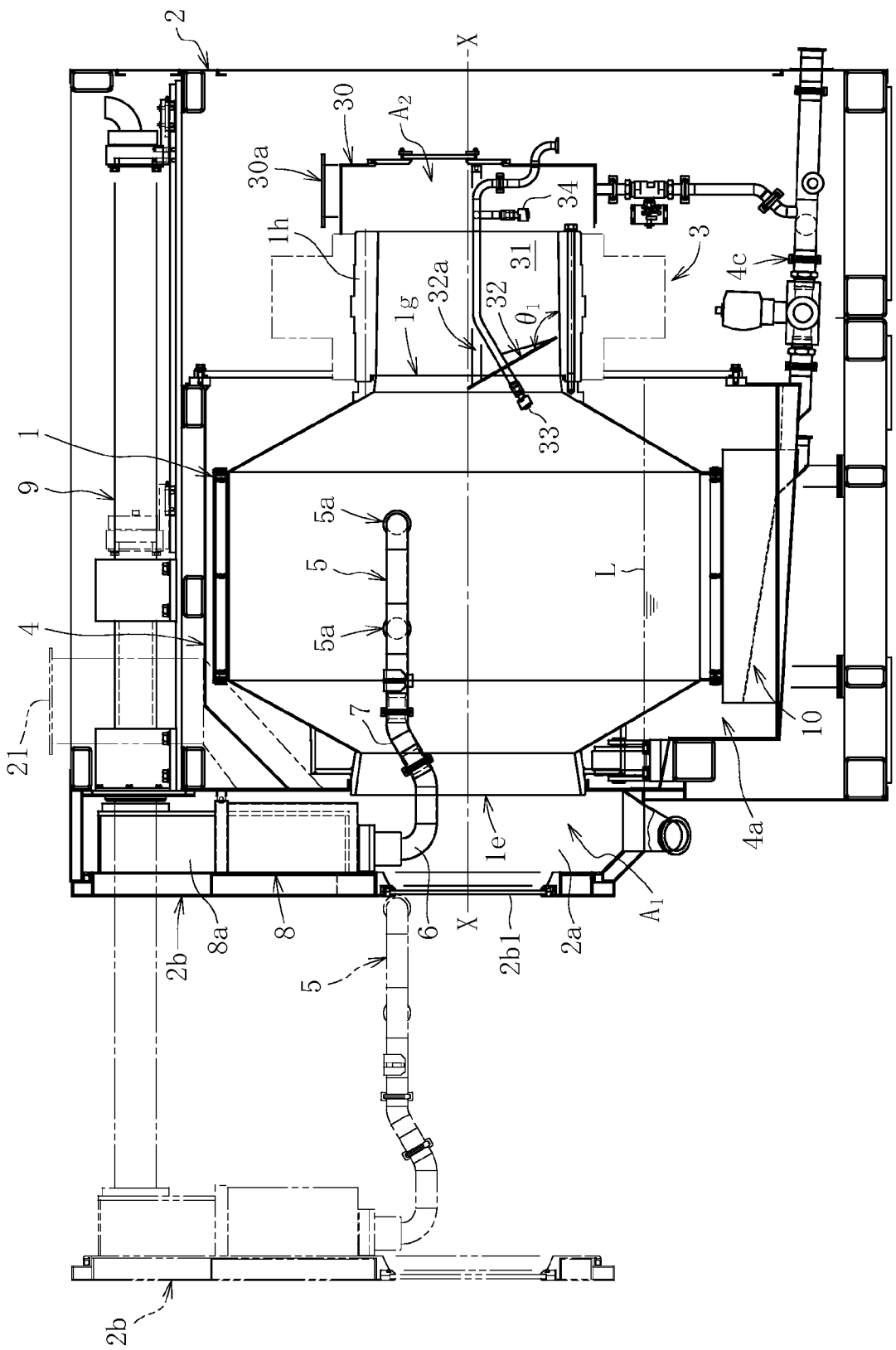
FIG. 1 is a vertical sectional view of a coating apparatus according to an embodiment of the present invention.

As illustrated in FIG. 1, a coating apparatus according to this embodiment comprises a ventilated-type rotating drum 1 that is driven to rotate about an axis X parallel to or substantially parallel to a horizontal line. The rotating drum 1 is accommodated in a freely rotatable manner in an inside of a casing 2, and is driven to rotate by a rotary drive mechanism 3 arranged on a rear end portion side thereof. Further, the rotating drum 1 is accommodated in an inside of an inner housing 4 in the inside of the casing 2, and a space portion of the inner housing 4 is sealed in an air-tight manner with respect to an outside thereof. Further, in an inside of the rotating drum 1, there is arranged a spray nozzle unit 5 comprising one or a plurality of spray nozzles 5a for spraying spray liquid such as a coating solution toward a particle layer. In this embodiment, the rotating drum 1 comprises a front end opening portion 1e at a front end portion, and a rear end opening portion 1g at the rear end portion. Further, air inlet portions A1 and A2 are provided respectively on the front end opening portion 1e side and the rear end opening portion 1g side.

A front end portion of the casing 2 comprises a chamber 2a, and a front side of the chamber 2a is closed by a front panel 2b comprising a monitoring window 2b1. The chamber 2a receives a vertical movement mechanism 8 and an airflow guide member 20 described below.

The spray nozzle unit 5 is mounted to a distal end portion of an L-shaped support pipe 6 through intermediation of a connecting pipe 7, and a proximal end portion of the support pipe 6 is connected to the vertical movement mechanism 8 mounted to an inner surface side of the front panel 2b. The vertical movement mechanism 8 (actuator mechanism such as an air cylinder and a ball screw) enables the spray nozzle unit 5 to be manually or automatically adjusted in vertical position. Further, a nozzle moving mechanism 9 described below is connected to the front panel 2b, and the nozzle moving mechanism 9 enables the front panel 2b to be moved together with the spray nozzle unit 5 in a direction of an axis X of the rotating drum 1, and to swivel between a first position P1 indicated by the dashed line and a second position P2 indicated by a solid line in FIG. 2.

Figure 3A:
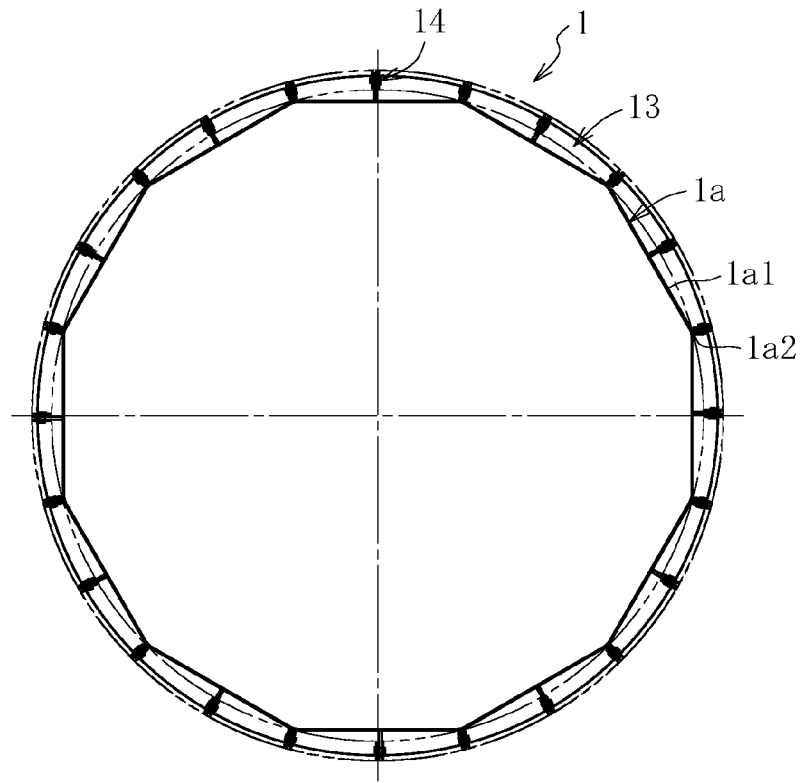
FIG. 3(A) is a cross sectional view of a rotating drum.
Figure 3B:
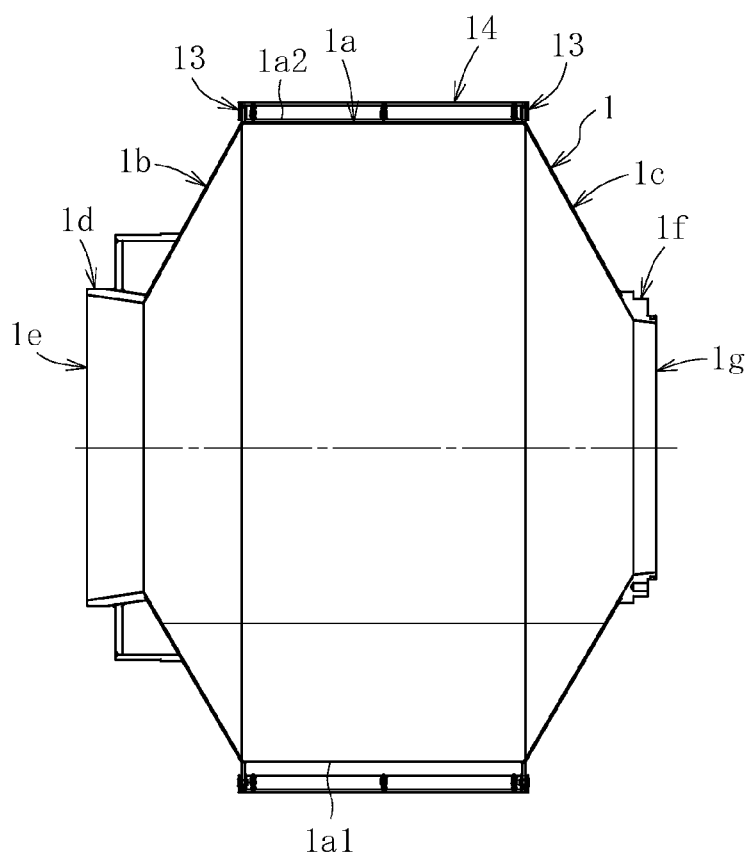
FIG. 3(B) is a vertical sectional view of the rotating drum.

As illustrated in FIG. 3, in this embodiment, the rotating drum 1 comprises a peripheral wall portion 1a having a polygonal shape (such as decagonal shape and dodecagonal shape) in cross-section, an end wall portion 1b continuous with a front end of the peripheral wall portion 1a, and an end wall portion 1c continuous with a rear end of the peripheral wall portion 1a. The peripheral wall portion 1a has side surfaces each comprising a ventilation portion formed of a porous portion. In this embodiment, the ventilation portion is formed by mounting a porous plate to each of the side surfaces of the peripheral wall portion 1a. A front end of the end wall portion 1b comprises a mouth ring portion 1d, and the front end opening portion 1e is provided to the mouth ring portion 1d. Further, a rear end of the end wall portion 1c comprises a coupling portion 1f, and the rear end opening portion 1g is provided to the coupling portion 1f. An extended portion 1h (refer to FIG. 1) that is used, for example, to mount components of a drive system for driving to rotate the rotating drum 1 is coupled to the coupling portion 1f.

In this embodiment, both axial end portions of the peripheral wall portion 1a of the rotating drum 1 comprise annular sealing rings 13, and a plurality of partition portions 14 are provided at predetermined intervals in a rotational direction on an outer periphery of the peripheral wall portion 1a. The partition portions 14 each have a plate-like form as a whole, each have a longitudinal dimension substantially equal to an axial dimension of the peripheral wall portion 1a, and are arranged parallel to the axis of the rotating drum 1 on the outer periphery of the peripheral wall portion 1a. Further, the partition portions 14 are arranged respectively at apexes 1a2 and side surfaces 1a1 of the polygonal peripheral wall portion 1a. During rotation of the rotating drum 1, the seal rings 13 and the partition portions 14 are held in sliding contact with a sliding contact portion 10a (refer to FIG. 6) of an ventilation member 10 comprising a ventilation hole 10b.

Figure 4A:
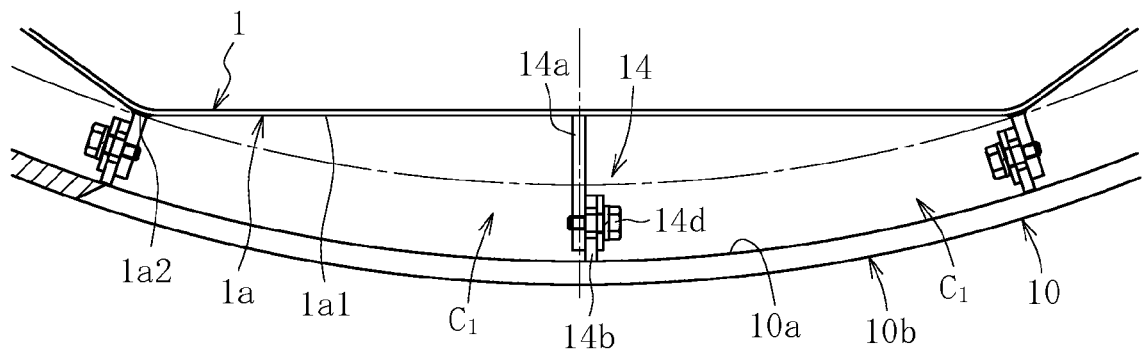
FIG. 4(A) is an enlarged cross sectional view of a vicinity of a peripheral wall portion of the rotating drum.
Figure 4B:
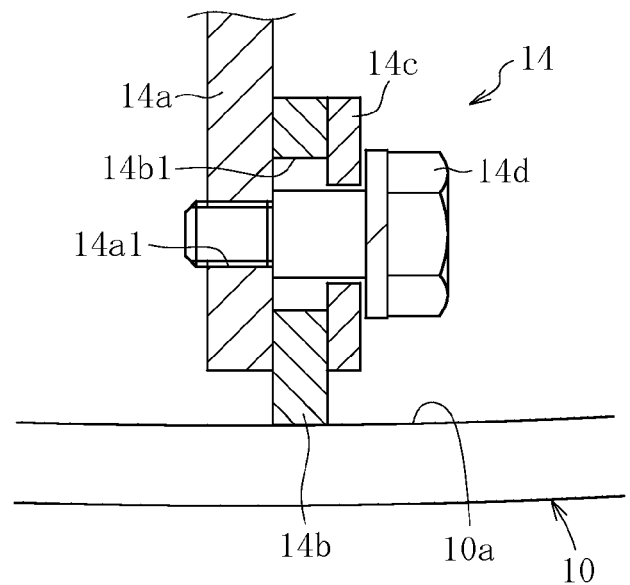
FIG. 4(B) is an enlarged sectional view of a partition portion.

As illustrated in FIG. 4, in this embodiment, the partition portions 14 each comprise a proximal portion 14a fixed to the outer periphery of the peripheral wall portion 1a, and a sealing member 14b mounted to the proximal portion 14a in a manner that the sealing member 14b is allowed to move in inner and outer circumferential directions of the peripheral wall portion 1a. The proximal portion 14a is obtained by forming a metal material or the like into a flat plate shape, and fixed parallel to the axis of the rotating drum 1 by appropriate means such as welding to the outer periphery of the peripheral wall portion 1a. The sealing member 14b is obtained by forming a synthetic resin material of a fluorine resin (such as PTFE) or a synthetic rubber material such as hard rubber into a flat plate shape, and mounted to one surface side or another surface side of the proximal portion 14a. Specifically, the sealing member 14b comprises an oblong hole 14b1 that is vertically long in the inner and outer circumferential directions of the peripheral wall portion 1a (also refer to FIG. 5). Through intermediation of a washer 14c made of a resin or a metal, a bolt 14d inserted through the oblong hole 14b1 is threadedly engaged with a bolt hole 14a1 provided through the proximal portion 14a. In this way, the sealing member 14b is mounted to the proximal portion 14a. Under the state in which the sealing member 14b is mounted to the proximal portion 14a, the sealing member 14b is movable within a range of a gap between the oblong hole 14b1 and a shaft portion of the bolt 14d in the inner and outer circumferential directions of the peripheral wall portion 1a with respect to the proximal portion 14a. Thus, when receiving a force toward the outer circumferential direction, the sealing member 14b is moved in sliding contact with the one surface or the another surface of the proximal portion 14a in the outer circumferential direction, and a distal end portion thereof is held in press-contact with the sliding contact portion 10a of the ventilation member 10 with a force generated along with the above-mentioned force. As means for applying the above-mentioned external force to the sealing member 14b, there may be employed elastic urging means such as a spring. In this embodiment, for the sake of structural simplification, means for urging the sealing member 14b in the outer circumferential direction uses a centrifugal force generated along with the rotation of the rotating drum 1. In addition, a pin may be used instead of the bolt 14d.

Figure 5:
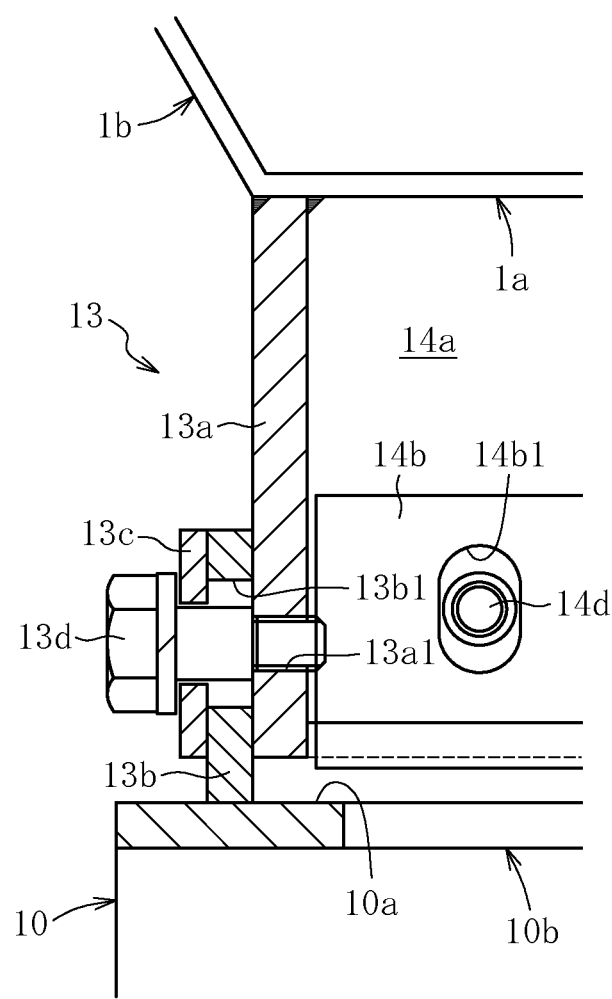
FIG. 5 is an enlarged sectional view of a vicinity of an end portion of the rotating drum.

Further, as illustrated in FIG. 5, the sealing rings 13 each comprise a proximal portion 13a fixed to a rim portion of the outer periphery of the peripheral wall portion 1a, and a sealing member 13b mounted to the proximal portion 13a. The proximal portion 13a is obtained by forming a metal material or the like into a ring plate shape, and fixed by appropriate means such as welding to the rim portion of the outer periphery of the rotating drum 1. The sealing member 13b is obtained by forming a synthetic resin material of a fluorine resin (such as PTFE) or a synthetic rubber material such as hard rubber into a ring plate shape (comprising a ring plate shape formed by combining a plurality of partial ring plate members with each other), and mounted to an outer surface side of the proximal portion 13a. Specifically, the sealing member 13b comprises an oblong hole 13b1 that is vertically long in the inner and outer circumferential directions of the peripheral wall portion 1a. Through intermediation of a washer 13c made of a resin or a metal, a bolt 13d inserted through the oblong hole 13b1 is threadedly engaged with a bolt hole 13a1 provided through the proximal portion 13a. In this way, the sealing member 13b is fixedly mounted to the proximal portion 13a. Under the state in which the sealing member 13b is fixedly mounted to the proximal portion 13a, a distal end portion thereof is held in press-contact with the sliding contact portion 10a of the ventilation member 10. Note that, under the state in which the sealing member 13b is mounted to the proximal portion 13a, the sealing member 13b may be movable within a range of a gap between the oblong hole 13b1 and a shaft portion of the bolt 13d in the inner and outer circumferential directions of the peripheral wall portion 1a with respect to the proximal portion 13a. In this case, when receiving a force toward the outer circumferential direction, the sealing member 13b is moved in sliding contact with one surface or another surface of the proximal portion 13a in the outer circumferential direction, and the distal end portion thereof is held in press-contact with the sliding contact portion 10a of the ventilation member 10 with a force generated along with the above-mentioned force. In addition, a pin may be used instead of the bolt 13d.

Figure 6:
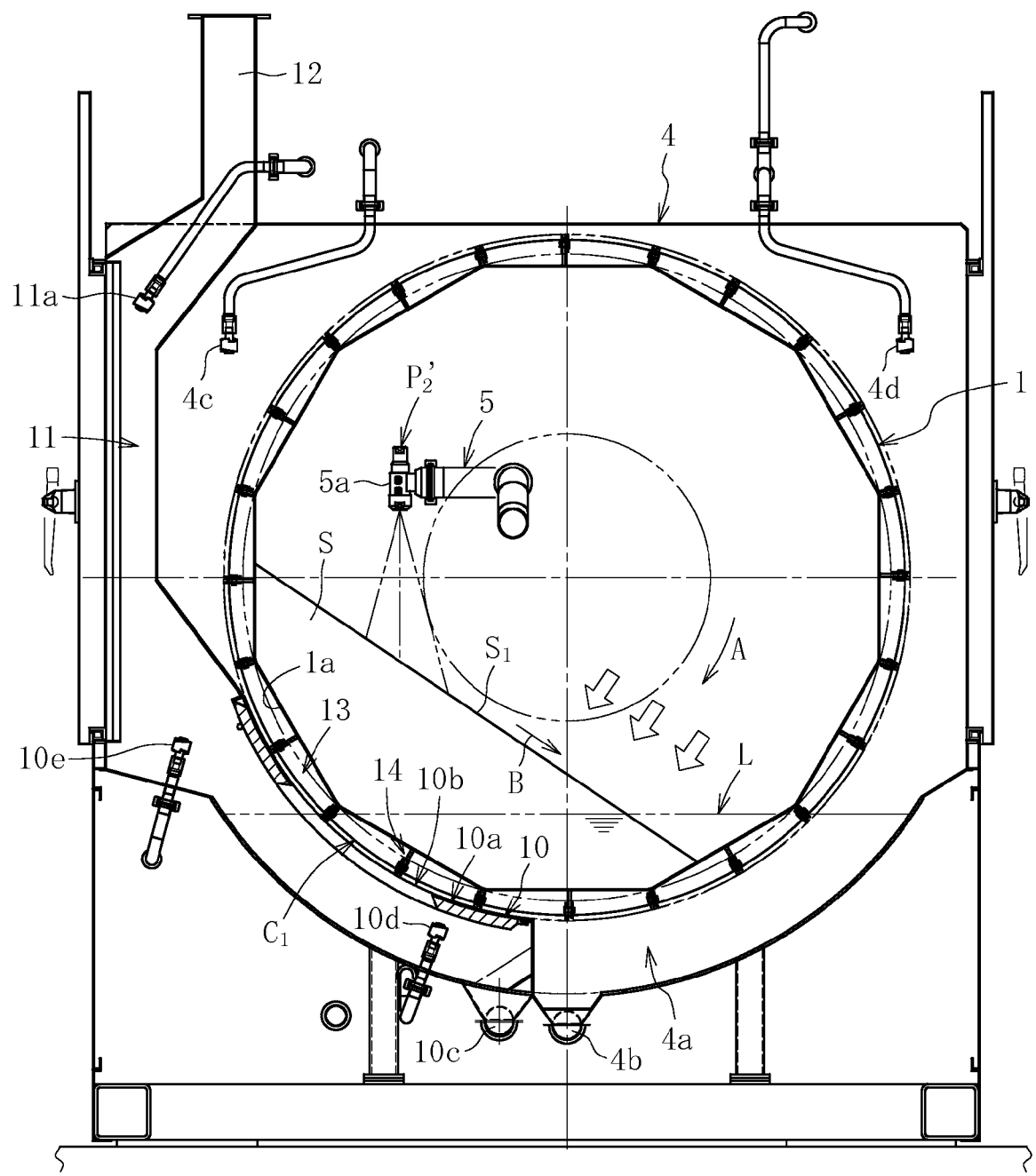
FIG. 6 is a cross sectional view of the coating apparatus.

As illustrated in FIG. 6, the ventilation member (air outlet member) 10 has a duct shape and is provided on a lower outer peripheral side with respect to the rotating drum 1. The ventilation member 10 communicates to an air outlet duct 12 via an air outlet passage 11 provided inside the inner housing 4. The ventilation member 10 comprises the sliding contact portion 10a which has a circular-arc shape and which is held in sliding contact with the sealing rings 13 and the partition portions 14 at the rotating drum 1, and the ventilation hole (air outlet) 10b provided through a part of the sliding contact portion 10a. The sealing rings 13 and the partition portions 14 provided along the peripheral wall portion 1a of the rotating drum 1 are held in sliding contact with the sliding contact portion 10a of the ventilation member 10 during the rotation of the rotating drum 1. With this, a plurality of ventilation spaces C1 partitioned at the predetermined intervals in the rotational direction by the plurality of partition portions 14 are formed in a region of the ventilation hole 10b. Specifically, the sealing rings 13 at both the axial end portions, adjacent two partition portions 14 in the rotational direction, and the outer periphery of the peripheral wall portion 1a form one ventilation spaces C1. In this way, the plurality of ventilation space C1 are formed along the rotational direction in the region of the ventilation hole 10b. In this embodiment, the partition portions 14 are arranged respectively at the apexes 1a2 and the side surfaces 1a1 of the polygonal peripheral wall portion 1a. With this, the ventilation spaces C1 that are larger in number than the apexes 1a2 (than the side surfaces 1a1) of the peripheral wall portion 1a are formed in the region of the ventilation hole 10b. A part or all of the plurality of ventilation spaces C1 may be different from each other in rotational dimension (partition portions 14 may be arranged at unequal intervals). However, all of the plurality of ventilation spaces C1 preferably have the same rotational dimension (partition portions 14 are arranged preferably at equal intervals). Further, the partition portions 14 at the apexes 1a2 extend in a radial direction with respect to an axial center of the rotating drum 1, and the partition portions 14 on the side surfaces 1a1 extend in a direction orthogonal to the side surfaces 1a1. However, all of the partition portions 14 may extend in the radial direction, or at least one of the partition portions 14 may be inclined to a downstream side or an upstream side (preferably to the upstream side) in the rotational direction.

Further, in this embodiment, a lower portion of the inner housing 4 serves as a wash bucket 4a (also refer to FIG. 1), and the ventilation member 10 is provided inside the wash bucket 4a. At the time of washing the rotating drum 1, washing liquid L such as wash water is supplied to the wash bucket 4a. The ventilation member 10 and the wash bucket 4a respectively comprise individual drain ports 10c and 4b. The wash bucket 4a comprises a bubble flow jetting nozzle (bubbling jet nozzle) (not shown) for jetting a bubble-mixed washing liquid into the washing liquid in the wash bucket 4a. Further, washing nozzles 10d and 10e for jetting the washing liquid are arranged inside the ventilation member 10. Another washing nozzle 11a for jetting the washing liquid is arranged inside the air outlet passage 11. Still other washing nozzles 4c and 4d for jetting the washing liquid are arranged in an upper space of the inner housing 4.

Figure 7:
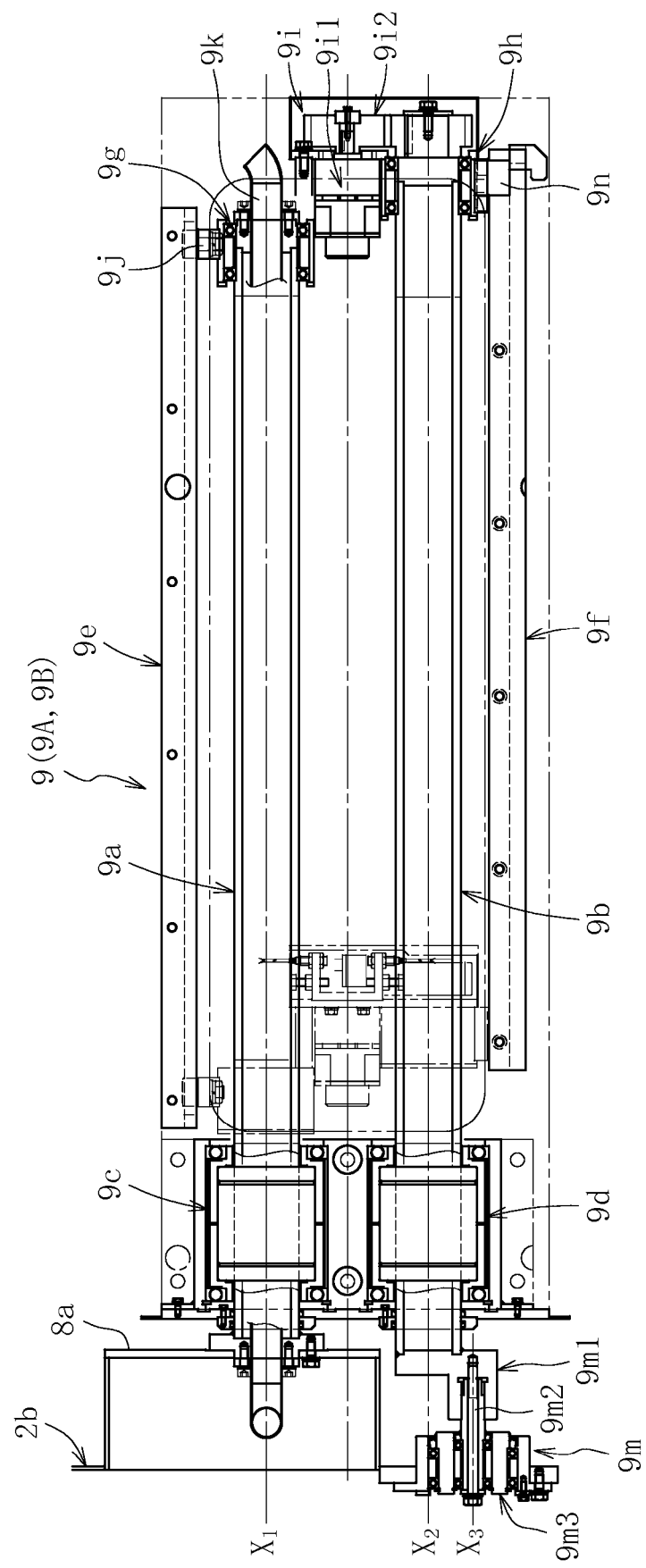
FIG. 7 is a partial sectional view of a nozzle moving mechanism viewed from above.

FIG. 7 is a partial sectional view of the nozzle moving mechanism 9 viewed from above. In this embodiment, the nozzle moving mechanism 9 comprises an axial moving mechanism 9A for moving the front panel 2b together with the spray nozzle unit 5 in the direction of the axis X of the rotating drum 1, and a nozzle position adjustment mechanism 9B for moving the front panel 2b together with the spray nozzle unit 5 in a swivel manner between the first position P1 indicated by the dashed line and the second position P2 indicated by the solid line in FIG. 2. The axial moving mechanism 9A comprises, as main components, slide shafts 9a and 9b arranged parallel to each other, slide bearing portions 9c and 9d and slide rails 9e and 9f for guiding axial movement of the slide shafts 9a and 9b in a sliding manner along axes X1 and X2 thereof (parallel to the axis X of the rotating drum 1). Further, the nozzle position adjustment mechanism 9B comprises, as main components, pivot bearing portions 9g and 9h for supporting the slide shafts 9a and 9b that pivot about the axes X1 and X2, and a pivot drive portion 9i for pivoting the slide shaft 9b.

The slide shaft 9a comprises a front end portion connected to a box 8a of the vertical movement mechanism 8 mounted on the inner surface side of the front panel 2b, and the slide shaft 9a comprises a rear end portion mounted in a freely slidable manner to the slide rail 9e through intermediation of a slide pin 9j provided to a housing of the pivot bearing portion 9g. Further, a routing pipe 9k is mounted through an inside of the slide shaft 9a. A routing tube for supplying an atomization gas (atomization air) or the like to the spray nozzles 5a of the spray nozzle unit 5 is accommodated inside the routing pipe 9k. Those routing tubes are connected to the spray nozzles 5a via an inside of the support pipe 6.

The slide shaft 9b comprises a front end portion connected to a swivel shaft portion 9m mounted on the inner surface side of the front panel 2b, and the slide shaft 9b comprises a rear end portion mounted in a freely slidable manner to the slide rail 9f through intermediation of a slide pin 9n provided to a housing of the pivot bearing portion 9h. The swivel shaft portion 9m comprises an eccentric member 9m1 mounted to the front end portion of the slide shaft 9b, an eccentric pin 9m2 fixed to the eccentric member 9m1, and an eccentric bearing portion 9m3 for supporting the eccentric pin 9m2 in a freely pivotal manner with respect to an inner surface wall of the front panel 2b. An axial center X3 of the eccentric pin 9m2 is decentered by a predetermined amount from the axis X2 of the slide shaft 9b.

The pivot drive portion 9i comprises a drive motor 9i1, and a gear mechanism 9i2 for transmitting a pivoting force of the drive motor 9i1 to the slide shaft 9b. The drive motor 9i1 is mounted to the housing of the pivot bearing portion 9h (and/or pivot bearing portion 9g), and the pivot drive portion 9i is movable in an axial direction together with the slide shaft 9b (and/or slide shaft 9a). When the drive motor 9i1 of the pivot drive portion 9i is rotated, the pivoting force thereof is transmitted to the slide shaft 9b through intermediation of the gear mechanism 9i2. As a result, the slide shaft 9b pivots about the axis X2. Then, when the slide shaft 9b pivots about the axis X2, the eccentric member 9m1 mounted to the front end portion of the slide shaft 9b pivots along therewith, and the eccentric pin 9m2 (axial center X3) fixed to the eccentric member 9m1 swivels about the axis X2 of the slide shaft 9b while being pivotally supported by the eccentric bearing portion 9m3. With this, as illustrated in FIG. 2, the front panel 2b swivels about the axis X1 of the slide shaft 9a, which is parallel to the axis X of the rotating drum 1 and serves as a swivel center (in a plane orthogonal to the axis X1) between the first position P1 indicated by the dashed line and the second position P2 indicated by the solid line in FIG. 2.

Figure 2:
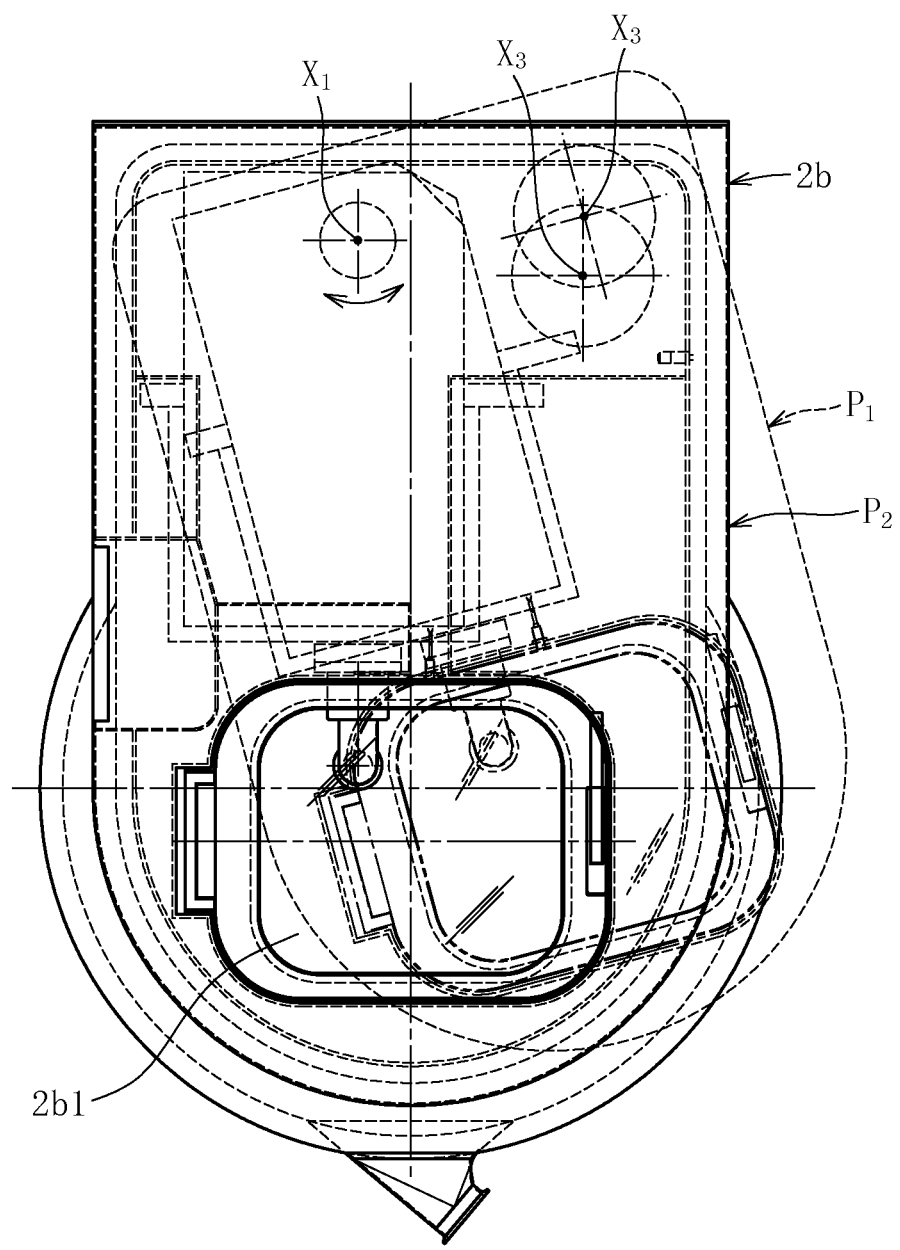
FIG. 2 is a front view of a front panel.
Figure 8:
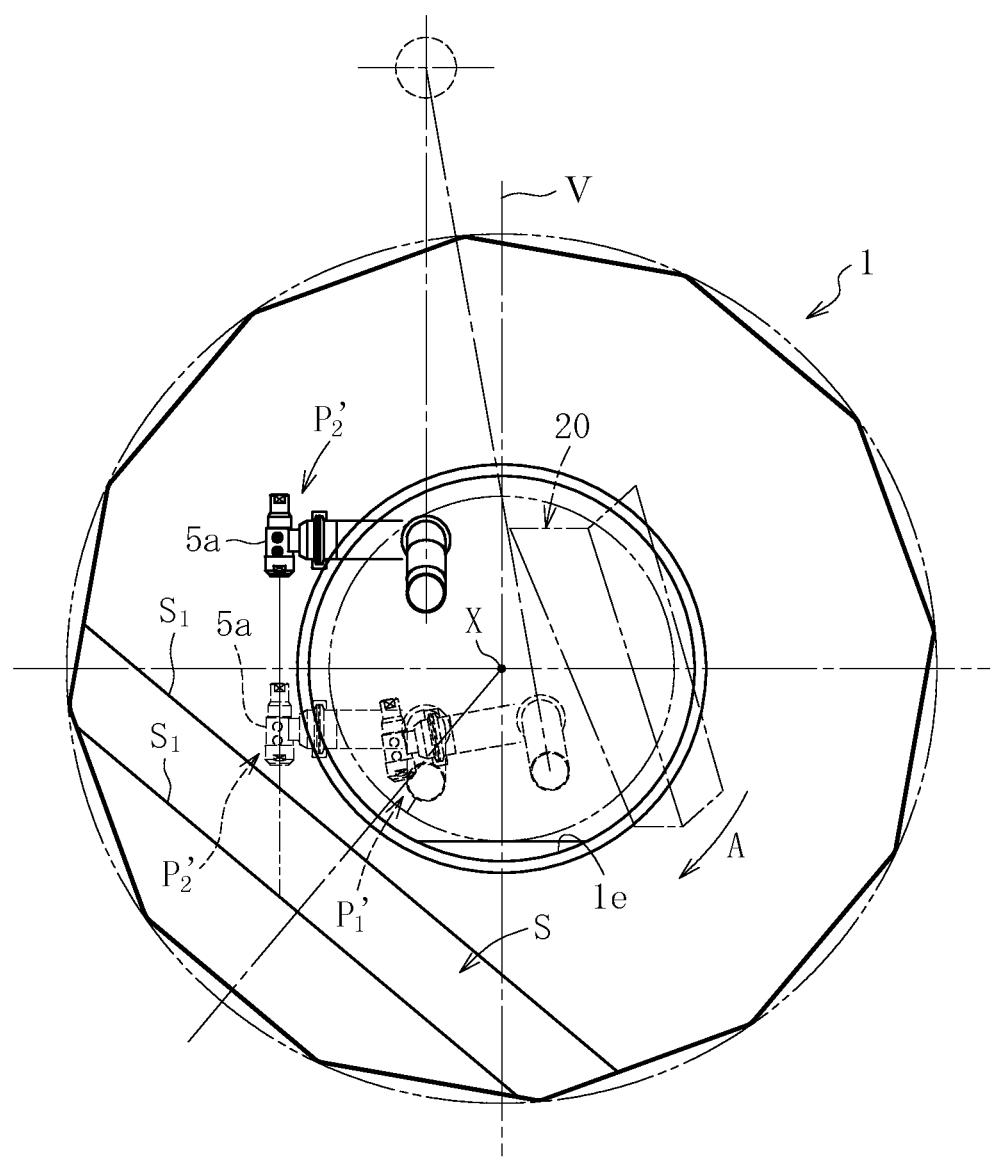
FIG. 8 is a schematic cross sectional view of the rotating drum view from a front side.

The first position P1 and the second position P2 of the front panel 2b illustrated in FIG. 2 correspond to a first position P1' and a second position P2' of the spray nozzle unit 5 illustrated in FIG. 8. The first position P1' refers to a position of the spray nozzle unit 5 at a time when the spray nozzle unit 5 is located on a radially inner side with respect to a diameter of the front end opening portion 1e of the rotating drum 1, in other words, a position of the spray nozzle unit 5, at which the spray nozzle unit 5 is movable in the axial direction without interfering with the front end opening portion 1e of the rotating drum 1. The second position P2' refers to a position of the spray nozzle unit 5 at a time when at least the spray nozzle 5a of the spray nozzle unit 5 is located on the radially outer side with respect to the diameter of the front end opening portion 1e of the rotating drum 1 and on the downstream side in the rotational direction A of the rotating drum 1 with respect to a vertical plane V comprising the axis X of the rotating drum 1. At the second position P2', when the spray nozzle unit 5 is moved in the axial direction, the spray nozzle unit 5 interferes with the front end opening portion 1e of the rotating drum 1. The second position P2' may correspond to a setting position of the spray nozzle unit 5 at a time of processing particles, or a position above or below the setting position. In the latter case, the spray nozzle unit 5 is moved with the vertical movement mechanism 8 from the second position P2' to the setting position, or moved from the setting position to the second position P2'. In an example illustrated in FIG. 7, the second position P2' corresponds to the setting position of the spray nozzle unit 5 at the time of processing the particles. Note that, in the illustration of FIG. 8, the second position P2' (solid lines) of the spray nozzle unit 5 corresponds to a case where a surface layer portion S1 of a particle layer S is relatively high (case where a large amount of particles are processed), and the second position P2' (dotted lines) of the spray nozzle unit 5 corresponds to a case where the surface layer portion S1 of the particle layer S is relatively low (case where a small amount of particles are processed). Further, in this embodiment, the spray nozzle 5a of the spray nozzle unit 5 is directed so that the spray nozzle 5a sprays the spray liquid vertically downward at the second position P2' (jetting hole of the spray nozzle 5a is directed vertically downward). Note that, a spray position of the spray nozzle 5a is adjustable in the vertical direction with the vertical movement mechanism 8.

FIG. 9 illustrate the air inlet portion A1 provided on the front end opening portion 1e side of the rotating drum 1. In this embodiment, the air inlet portion A1 comprises the airflow guide plate 20 that is arranged in the chamber 2a at the front end portion of the casing 2 and serves as an airflow control portion, and a passage member 24 for forming a passage portion 24a for guiding a process gas that is supplied through an air inlet duct 21, such as hot air and cool air, to the airflow guide plate 20. The airflow guide plate 20 comprises one side portion 20a directed in a direction away from the front end opening portion 1e and another side portion 20b bent in a direction toward the front end opening portion 1e form the one side portion 20a. The airflow guide plate 20 is arranged at a position within a range of the front end opening portion 1e, which corresponds to a region on an upstream side in the rotational direction (right side in FIG. 9(A)) with respect to the vertical plane V comprising the axis X of the rotating drum 1. Further, the airflow guide plate 20 is arranged in a posture inclined from bottom up gradually toward the vertical plane V. The passage member 24 is mounted to a front end wall of the casing 2, and a front side thereof is closed by the front panel 2b. In this way, the passage portion 24a is formed in the chamber 2a. An upper portion of the passage portion 24a communicates to an air inlet 21a of the air inlet duct 21. The airflow guide plate 20 is fixed to a front side part of a lower portion of the passage member 24, or formed integrally therewith. Note that, a washing nozzle 22 for jetting the washing liquid is arranged inside the chamber 2a, and another washing nozzle 23 for jetting the washing liquid is arranged inside the passage portion 24a. The process gas that is supplied from the air inlet 21a of the air inlet duct 21 is guided to the airflow guide plate 20 via the passage portion 24a, and guided by the airflow guide plate 20 formed as described above. Then, the process gas flows into the rotating drum 1 from the front end opening portion 1e. Thus, as illustrated in FIG. 8, the process gas that flows into the rotating drum 1 flows toward a space portion in the rotating drum 1, which is located above the particle layer S and corresponds to a rear side of the spray nozzle unit 5 with respect to the setting position P2' of the spray nozzle unit 5 at the time of processing the particles.

Figure 10:
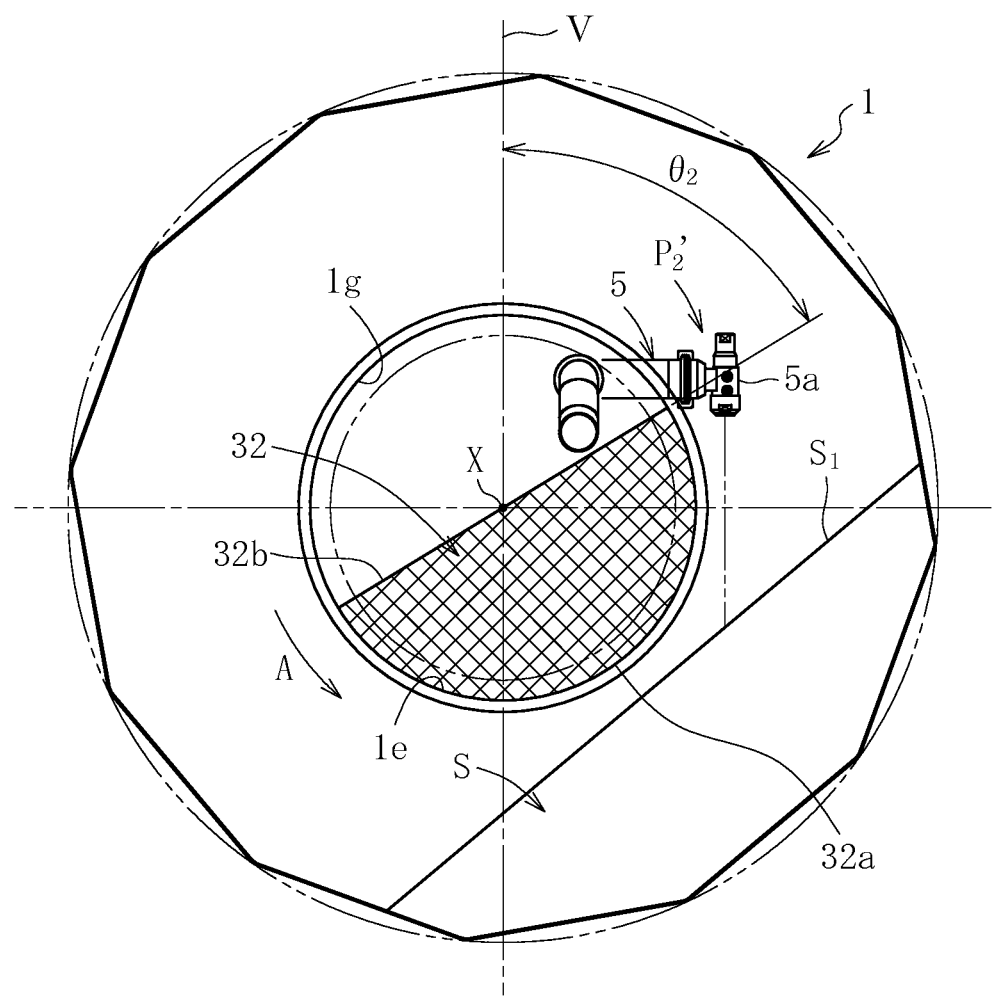
FIG. 10 is a schematic cross sectional view of the rotating drum viewed from a rear side.

As illustrated in FIG. 1, in the air inlet portion A2 provided on the rear end opening portion 1g side of the rotating drum 1, an airflow guide plate 32 is arranged in an air inlet chamber 31 formed of an interior space of a chamber member 30 comprising a connection port 30a' with respect to an air inlet duct (not shown) and an interior space of the extended portion 1h of the rotating drum 1. The process gas that is supplied into the air inlet chamber 31 through the air inlet duct, such as hot air and cool air, is guided by the airflow guide plate 32, and supplied into the rotating drum 1 from the rear end opening portion 1g. The chamber member 30 is connected to a rear end portion of the extended portion 1h. In this embodiment, the airflow guide plate 32 is supported by one or a plurality of support members 32a, and arranged in an inclined posture at a predetermined angle θ1 in the interior space of the extended portion 1h. Further, in this embodiment, the airflow guide plate 32 comprises a plate member having a semicircular shape as illustrated in FIG. 10. A circular-arc portion 32a is arranged along an inner peripheral surface (having a diameter equal to or substantially equal to that of the rear end opening portion 1g) of the extended portion 1h, and a side portion 32b is arranged in an inclined posture at a predetermined angle θ2 with respect to the vertical plane V comprising the axis X of the rotating drum 1 so that the side portion 32b is directed to the rear side of the spray nozzle unit 5. With this, the process gas that is supplied to the air inlet chamber 31 through the air inlet duct is guided by the airflow guide plate 32. As a result, the process gas flows into the rotating drum 1 from the rear end opening portion 1g toward the space portion in the rotating drum 1, which is located above the particle layer S and corresponds to the rear side of the spray nozzle unit 5 with respect to the setting position P2' of the spray nozzle unit 5 at the time of processing the particles. Note that, a washing nozzle 33 for jetting the washing liquid is arranged through the airflow guide plate 32. Further, another washing nozzle 34 for jetting the washing liquid is arranged inside the chamber member 30.

As illustrated in FIG. 6, at the time of processing the particles, along with the rotation of the rotating drum 1 in the direction A in FIG. 6, the sealing rings 13 and the partition portions 14 of the peripheral wall portion 1a are held in sliding contact with the sliding contact portions 10a of the ventilation member 10. In particular, the sealing member 14b of each of the partition portions 14 is movable in the inner and outer circumferential directions. The sealing member 14b is moved in the outer circumferential direction by receiving the centrifugal force generated along with the rotation of the rotating drum 1, and is held in press-contact with the sliding contact portion 10a of the ventilation member 10 with the force generated along with the above-mentioned centrifugal force. The process gas supplied from the air inlet portion A1 on the front end portion side and from the air inlet portion A2 on the rear end portion side of the rotating drum 1 into the rotating drum 1 passes through the particle layer S so as to contribute to drying of the particle layer S. After that, the process gas enters the above-mentioned ventilation spaces C1 through the ventilation portions (porous portions) of the peripheral wall portion 1a of the rotating drum 1, and is exhausted from the ventilation spaces C1 to the ventilation member 10 through the ventilation hole 10b.

With the centrifugal force generated along with the rotation of the rotating drum 1, the sealing member 14b of each of the partition portions 14 is held in press-contact with the sliding contact portion 10a of the ventilation member 10 so as to seal the ventilation spaces C1. Thus, without influence of dimensional and mounting errors of the partition portions 14, dimensional variation of the sealing member 14b due to abrasion, decentering of the axis of the rotating drum 1, distortion of the casing, and the like, the sealing member 14b is held in press-contact with the sliding contact portion 10a of the ventilation member 10 constantly with a predetermined force (force generated along with the centrifugal force). Thus, sealing performance with respect to the ventilation spaces C1 is stabilized, and leakage of exhaust air and occurrence of a short circuit of the exhaust air are more effectively prevented. Further, dimensions and shapes of the components of the partition portions 14 are relatively easily managed. In addition, an excessive press-contact force is not generated, and hence the sealing member 14b is not abnormally abraded. As a result, generation of contaminants is reduced, and replacement frequency of the sealing member 14b is lowered. Further, even when the sealing member 14b is replaced, the replacement operation is relatively easy. In addition, in this embodiment, the partition portions 14 are arranged at the apexes 1a2 and on the side surfaces 1a1 of the polygonal peripheral wall portion 1a. With this, the ventilation spaces C1 that are larger in number than the apexes 1a2 of the peripheral wall portion 1a (side surfaces 1a1) are formed in the region of the ventilation hole 10b. With this, the occurrence of the short circuit of the exhaust air is more effectively prevented.

At the time of processing the particles (during rotation of the rotating drum 1), the surface layer portion S1 of the particle layer S is inclined at a rising gradient toward the downstream side in the rotational direction A. In this state, particle grains of the surface layer portion S1 to which the spray liquid is sprayed from the spray nozzle 5a are subjected to spread of the spray liquid and moderate drying (drying zone) while flowing downward along the inclination (direction B illustrated in FIG. 6) from a position at which the spray liquid is sprayed (spray zone). The spray nozzle unit 5 is set to the second position P2' above the surface layer portion S1 of the particle layer S in the inclination direction. Thus, at the time of flowing downward in the direction B along the inclination, the particle grains of the surface layer portion S1 to which the spray liquid is sprayed from the spray nozzle 5a flow over a relatively long distance. With this, the spread of the spray liquid and the drying are effectively performed. Further, in this embodiment, at the second position P2', the spray nozzle 5a of the spray nozzle unit 5 sprays the spray liquid vertically downward toward the particle layer S. Thus, the particle grains of the surface layer portion S1 to which the spray liquid is sprayed from the spray nozzle 5a more efficiently flow downward along the inclination due to a spraying pressure of the spray liquid.

In the air inlet portion A1 on the front end portion side of the rotating drum 1, the process gas guided by the airflow guide plate 20 and supplied into the rotating drum 1 toward the space portion in the rotating drum 1, which is located above the particle layer S and corresponds to the rear side of the spray nozzle unit 5, is reduced in flow rate in the space portion. Then, as indicated by hollow arrows in FIG. 6, the process gas enters the particle layer S from the drying zone on a lower side of the inclination with respect to the spray zone, passes through the particle layer S, and then is exhausted from the ventilation hole 10b of the ventilation member 10. The process gas is supplied toward the space portion on the rear side of the spray nozzle unit 5, and the process gas enters the particle layer S from the drying zone on the lower side of the inclination with respect to the spray zone. In addition, the process gas is reduced in flow rate in the space portion. By synergistic effects of those configurations, a phenomenon that airflow of the process gas disturbs a spray pattern of the spray liquid sprayed from the spray nozzle 5a is more effectively prevented. Further, the process gas is reduced in flow rate, and hence the airflow of the process gas does not rebound back from the surface layer portion S1 of the particle layer S. As a result, dust is less liable to be generated or scattered due to the rebound of the airflow. In addition, the particle grains of the surface layer portion S1 to which the spray liquid is sprayed at an upper position (spray zone) in the inclination direction of the particle layer S from the spray nozzle 5a flow to the drying zone on the lower side of the inclination. Then, the particle grains are exposed to the airflow of the process gas after the spray liquid is spread to some extent over their surfaces. Thus, dust is much less liable to be generated or scattered.

Further, in the air inlet portion A2 on the rear end portion side of the rotating drum 1, the process gas guided by the airflow guide plate 32 and supplied from the rear end opening portion 1g into the rotating drum 1 toward the space portion in the rotating drum 1, which is located above the particle layer S and corresponds to the rear side of the spray nozzle unit 5, is reduced in flow rate in the space portion. Then, the process gas enters the particle layer S from the drying zone on the lower side of the inclination with respect to the spray zone, passes through the particle layer S, and then is exhausted. The process gas is supplied toward the space portion on the rear side of the spray nozzle unit 5, and the process gas enters the particle layer S from the drying zone on the lower side of the inclination with respect to the spray zone. In addition, the process gas is reduced in flow rate in the space portion. By synergistic effects of those configurations, the phenomenon that the airflow of the process gas disturbs the spray pattern of the spray liquid sprayed from the spray nozzle 5a is more effectively prevented. Further, the process gas is reduced in flow rate, and hence the airflow of the process gas does not rebound back from the surface layer portion S1 of the particle layer S. As a result, dust is less liable to be generated or scattered due to the rebound of the airflow. In addition, the particle grains of the surface layer portion S1 to which the spray liquid is sprayed at the upper position (spray zone) in the inclination direction of the particle layer S from the spray nozzle 5a flow to the drying zone on the lower side of the inclination. Then, the particle grains are exposed to the airflow of the process gas after the spray liquid is spread to some extent over their surfaces. Thus, dust is much less liable to be generated or scattered.

As described above, the spray liquid such as the coating liquid, which is sprayed from the spray nozzle 5a of the spray nozzle unit 5 to the particle layer S, is spread over the surfaces of the particle grains by stirring and mixing effects obtained through the rotation of the rotating drum 1, and then is dried by the process gas that passes through the particle layer S. In this way, coating films are formed on the surfaces of the particle grains.

In order to draw out the spray nozzle unit 5 from the inside of the rotating drum 1 to an outside after completion of the process on the particles, first, the drive motor 9i1 (refer to FIG. 7) of the pivot drive portion 9i of the nozzle position adjustment mechanism 9B of the nozzle moving mechanism 9 is actuated. With this, the slide shaft 9b is pivoted about the axis X2, and the eccentric pin 9m2 (axial center X3) is swiveled about the axis X2, to thereby swivel the front panel 2b about a swivel center, that is, the axis X1 of the slide shaft 9a from the second position P2 indicated by the solid line to the first position P1 indicated by the dashed line in FIG. 2. In this way, the spray nozzle unit 5 mounted to the front panel 2b swivels from the second position P2' to the first position P1' illustrated in FIG. 8 so as to be movable in the direction of the axis X of the rotating drum 1 without interfering with the front end opening portion 1e of the rotating drum 1. Note that, when the spray nozzle unit 5 is set to the second position P2' indicated by the solid line in FIG. 8, the spray nozzle unit 5 is moved by the vertical movement mechanism 8 to the second position P2' indicated by the dotted line, and then swiveled. After that, the axial moving mechanism 9A of the nozzle moving mechanism 9 is actuated manually or by appropriate axial drive means such as an air cylinder so as to move the spray nozzle unit 5 in the direction of the axis X of the rotating drum 1 together with the front panel 2b. In this way, the spray nozzle unit 5 can be drawn out to the outside of the rotating drum 1 (refer to FIG. 1) through the front end opening portion 1e. At this time, the slide shafts 9a and 9b of the axial moving mechanism 9A are guided in a sliding manner by the slide bearing portions 9c and 9d and the slide rails 9e and 9f. With this, the front panel 2b and the spray nozzle unit 5 can be smoothly moved in the direction of the axis X of the rotating drum 1.

Meanwhile, in order to insert the spray nozzle unit 5 from the outside into the rotating drum 1, in the reverse order to that described above, first, the front panel 2b is located at the first position P1 indicated by the dashed line in FIG. 2. In this state, the spray nozzle unit 5 is moved in the direction of the axis X of the rotating drum 1 together with the front panel 2b so as to insert the spray nozzle unit 5 from the front end opening portion 1e into the rotating drum 1. After that, the drive motor 9i1 of the pivot drive portion 9i of the nozzle position adjustment mechanism 9B of the nozzle moving mechanism 9 is actuated to swivel the front panel 2b about the swivel center, that is, the axis X1 of the slide shaft 9a to the second position P2 indicated by the solid line in FIG. 2. In this way, the spray nozzle unit 5 mounted to the front panel 2b is swiveled from the first position P1' to the second position P2' illustrated in FIG. 8, to thereby be set to the position of processing the particles. Note that, in order to set the spray nozzle unit 5 to the second position P2' indicated by the solid line in FIG. 8, the spray nozzle unit 5 is moved by the vertical movement mechanism 8 from the second position P2' indicated by the dotted line to the second position P2' indicated by the solid line.

In order to wash the rotating drum 1, as illustrated in FIG. 6, first, the washing liquid L such as wash water is supplied to the wash bucket 4a. The washing liquid L supplied to the wash bucket 4a enters the rotating drum 1 through the ventilation portions (porous portions) of the peripheral wall portion 1a of the rotating drum 1, and also enters the air outlet member through the ventilation hole 10b of the ventilation member 10. After the washing liquid is pooled in the wash bucket 4a in this way, washing is performed while rotating the rotating drum 1 and jetting a bubble flow of the washing liquid from the bubble flow jetting nozzle (not shown) into the washing liquid. By synergistic effects of the rotation of the rotating drum 1 in the washing liquid in the wash bucket 4a, and the jet and bubbles of the washing liquid, which are jetted from the bubble flow jetting nozzle into the washing liquid, the peripheral wall portion and the ventilation portions of the rotating drum 1, the inside of the rotating drum 1, the inside of the ventilation member 10, and the like can be effectively washed.

Further, in this embodiment, the partition portions 14 are provided around the peripheral wall portion 1a of the rotating drum 1. Thus, during the rotation of the rotating drum 1, the partition portions 14 cause the washing liquid in the wash bucket 4a to flow to the downstream side in the rotational direction. In addition, the bubbles in the washing liquid are retained on the downstream side of the partition portions 14 in the rotational direction, and caused to flow into the rotating drum 1 through the ventilation portions (porous portions) of the peripheral wall portion 1a. Specifically, a flow rate of the washing liquid at the time of passing through the ventilation portions of the peripheral wall portion 1a is liable to be low, and hence the bubbles in the washing liquid are trapped, for example, in porous wall surfaces of the ventilation portions (ventilation holes). As a result, sufficient washability may not be obtained. However, the partition portions 14 cause the washing liquid to flow at a higher flow rate at the time of passing through the ventilation portions. Thus, the bubbles are less liable to be trapped, and flowability of the bubbles is enhanced. As a result, even the ventilation portions of the peripheral wall portion 1a, which are particularly difficult to wash, can be washed effectively. Further, the partition portions 14 scoop up the washing liquid in the wash bucket 4a from a liquid surface L to the downstream side in the rotational direction and splash the washing liquid over the peripheral wall portion 1a. Such an effect of splash washing can be expected as well. Along with the effect of splash washing, more efficient washing can be expected not only for the peripheral wall portion 1a of the rotating drum 1 but also for the spray nozzle unit 5 and baffles in the inside of the rotating drum 1. In addition, the partition portions 14 are moved in the rotational direction, and hence a positive pressure is generated in the washing liquid on the downstream side in the rotational direction of the partition portions 14, while a negative pressure is generated in the washing liquid on the upstream side in the rotational direction thereof. Therefore, the washing liquid flows into the rotating drum 1 through the ventilation portions (ventilation holes) on the downstream side in the rotational direction of the partition portions 14, and flows out to the outside of the rotating drum 1 through the ventilation portions (ventilation holes) on the upstream side in the rotational direction thereof. With this, a circulation flow/swirl of the washing liquid is generated. The circulation flow/swirl of the washing liquid enhances the washability. Note that, even when the partition portions 14 are not provided, the above-mentioned circulation flow/swirl of the washing liquid is generated to some extent in a peripheral portion of the apexes of the peripheral wall portion 1a. However, when the partition portions 14 are not provided, the circulation of the washing liquid is slowed down particularly in a peripheral portion of a center in the rotational direction of each of the side surfaces of the peripheral wall portion 1a. Thus, in view of washing efficiency, it is effective to provide the partition portions 14 on the side surfaces of the peripheral wall portion 1a. It is preferred to set one or a plurality of partition portions 14 on the side surfaces so as to promote the circulation of the washing liquid in the peripheral portion of the center in the rotational direction of each of the side surfaces. Further, it is preferred that the interval between the partition portions 14 adjacent to each other in the rotational direction be set to be larger than a height of the highest one of the partition portions 14.

After the rotating drum 1 is washed as described above, the washing liquid is drained from the drain ports 10c and 4b through a drain pipe 4c' illustrated in FIG. 1.

Figure 11:
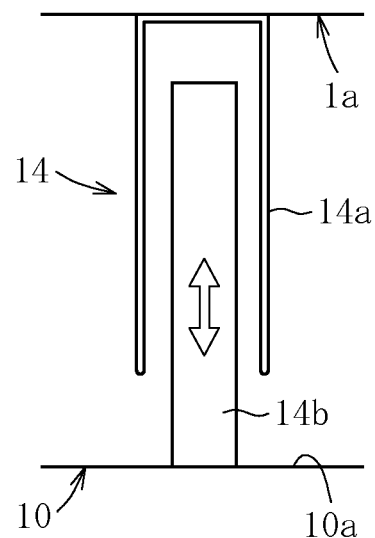
FIG. 11 is a schematic sectional view of a modification of the partition portion.
Figure 12:
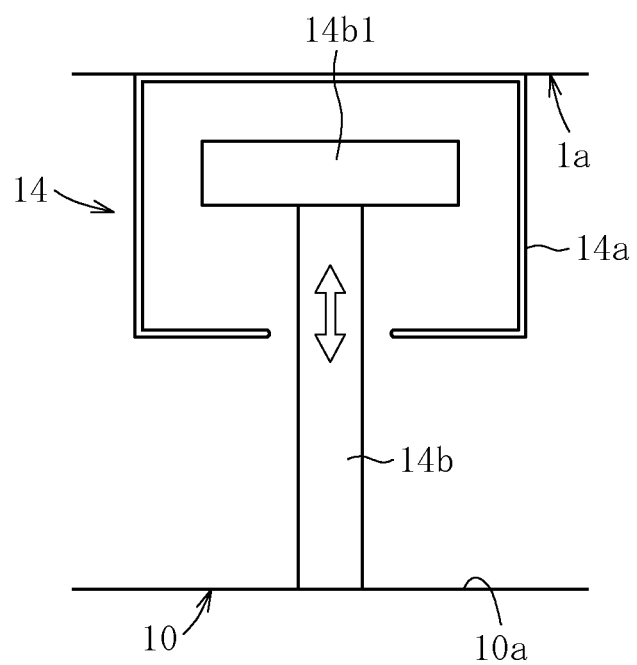
FIG. 12 is a schematic sectional view of another modification of the partition portion.
Figure 13:
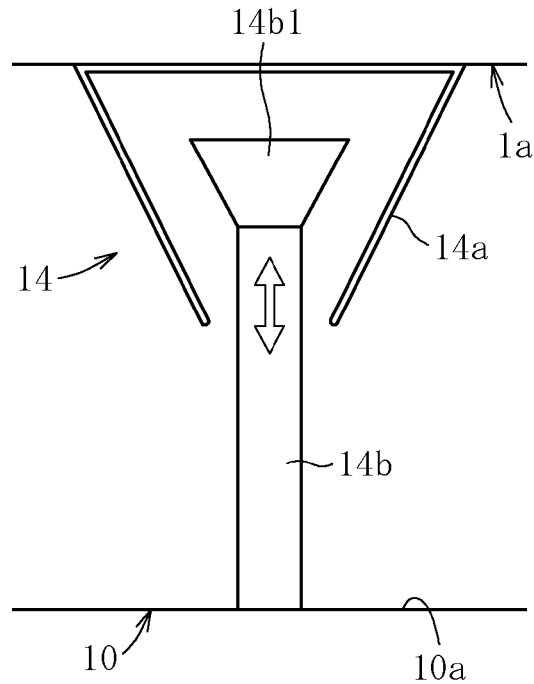
FIG. 13 is a schematic sectional view of still another modification of the partition portion.

FIGS. 11 to 13 each schematically illustrate a modification of the partition portions 14. In the modification illustrated in FIG. 11, the sealing member 14b having a flat plate shape is mounted to the proximal portion 14a having a C-shape in cross-section. In the modification illustrated in FIG. 12, the sealing member 14b having a flat plate shape and comprising a wide portion 14b1 having a rectangular shape in cross-section is mounted to the proximal portion 14a having a quadrangular cylindrical shape and comprising a longitudinal opening portion. In the modification illustrated in FIG. 13, the sealing member 14b having a flat plate shape and comprising the wide portion 14b1 having a trapezoidal shape in cross-section is mounted to the proximal portion 14a having a triangular cylindrical shape and comprising a longitudinal opening. In those modifications, when receiving the centrifugal force generated along with the rotation of the rotating drum 1, the sealing member 14b is moved in the outer circumferential direction in sliding contact with the proximal portion 14a (in FIGS. 11 to 13, gaps between the proximal portion 14a and the sealing member 14b are illustrated on a considerably exaggerated scale), and the distal end portion thereof is held in press-contact with the sliding contact portion 10a of the ventilation member 10 with the force generated along with the centrifugal force. Note that, in the modifications illustrated in FIGS. 12 and 13, at the time, for example, of assembly and disassembly, the wide portion 14b1 of the sealing member 14b is engaged with the opening portion of the proximal portion 14a. With this, the sealing member 14b is retained in the proximal portion 14a.

Figure 14:
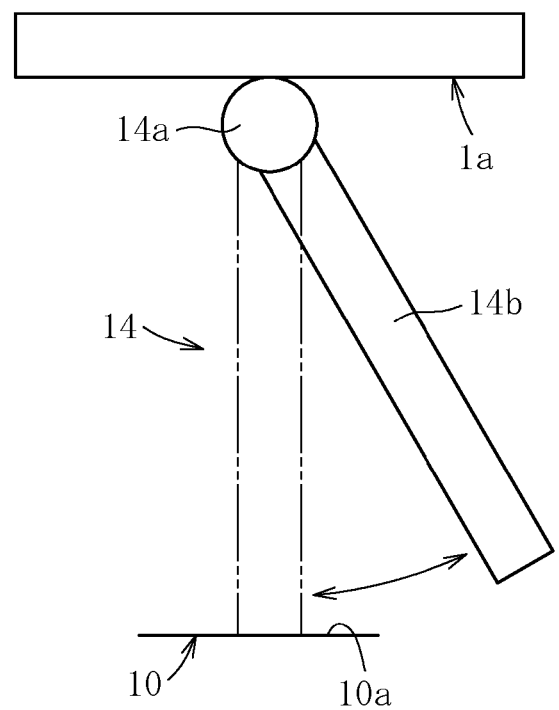
FIG. 14 is a schematic sectional view of yet another modification of the partition portion.

FIG. 14 schematically illustrates yet another modification of the partition portion 14. In this modification, the sealing member 14b having a flat plate shape is mounted in a freely pivotal manner to the proximal portion 14a having a circular shape in cross-section. When receiving the centrifugal force generated along with the rotation of the rotating drum 1, the sealing member 14b pivots in a direction of standing upright with respect to the proximal portion 14a, and the distal end portion thereof is held in press-contact with the sliding contact portion 10a of the ventilation member 10 with the force generated along with the centrifugal force.

Figure 15A:
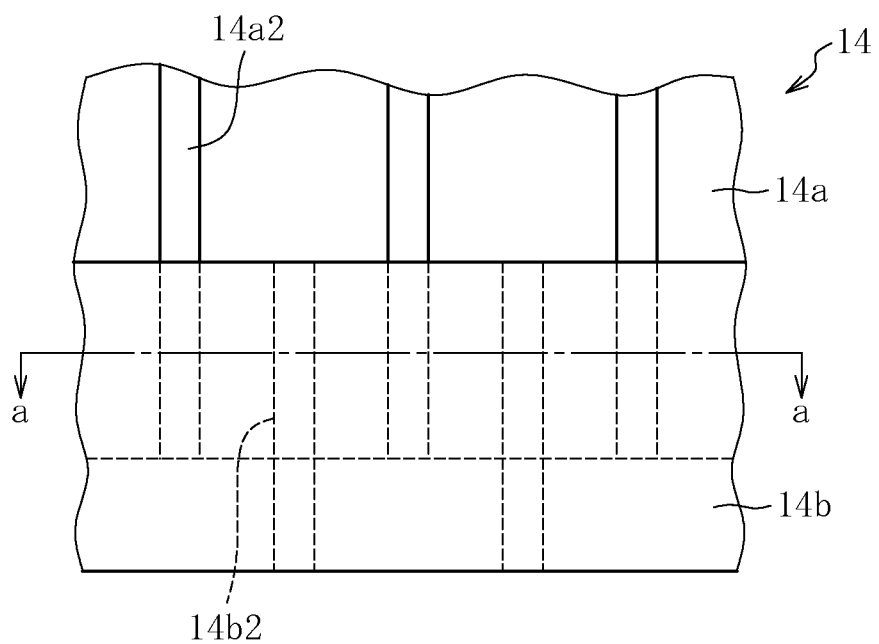
FIG. 15(A) is a schematic sectional view of yet another modification of the partition portion.
Figure 15B:
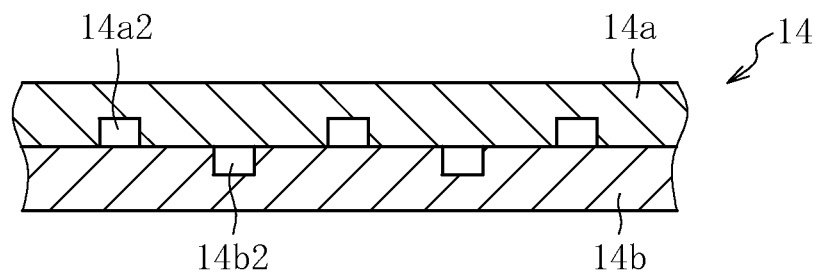
FIG. 15(B) is a sectional view taken along the line a-a in FIG. 15(A).

FIG. 15 schematically illustrate yet another modification of the partition portion 14. In this modification, opposed sliding contact surfaces of the proximal portion 14a and the sealing member 14b respectively comprise a plurality of grooves 14a2 and a plurality of grooves 14b2. The grooves 14a2 and the grooves 14b2 each extend in the outer circumferential direction. At the time of washing the rotating drum 1, the washing liquid enters the sliding contact portion of the proximal portion 14a and a sliding contact portion of the sealing member 14b through the grooves 14a2 and the grooves 14b2. With this, washing efficiency at the sliding contact portions is enhanced. Note that, such grooves may be formed at least one of the opposed sliding contact surfaces of the proximal portion 14a and the sealing member 14b. Alternatively, such grooves may be formed in a direction inclined or orthogonal to the outer circumferential direction.

Figure 16:
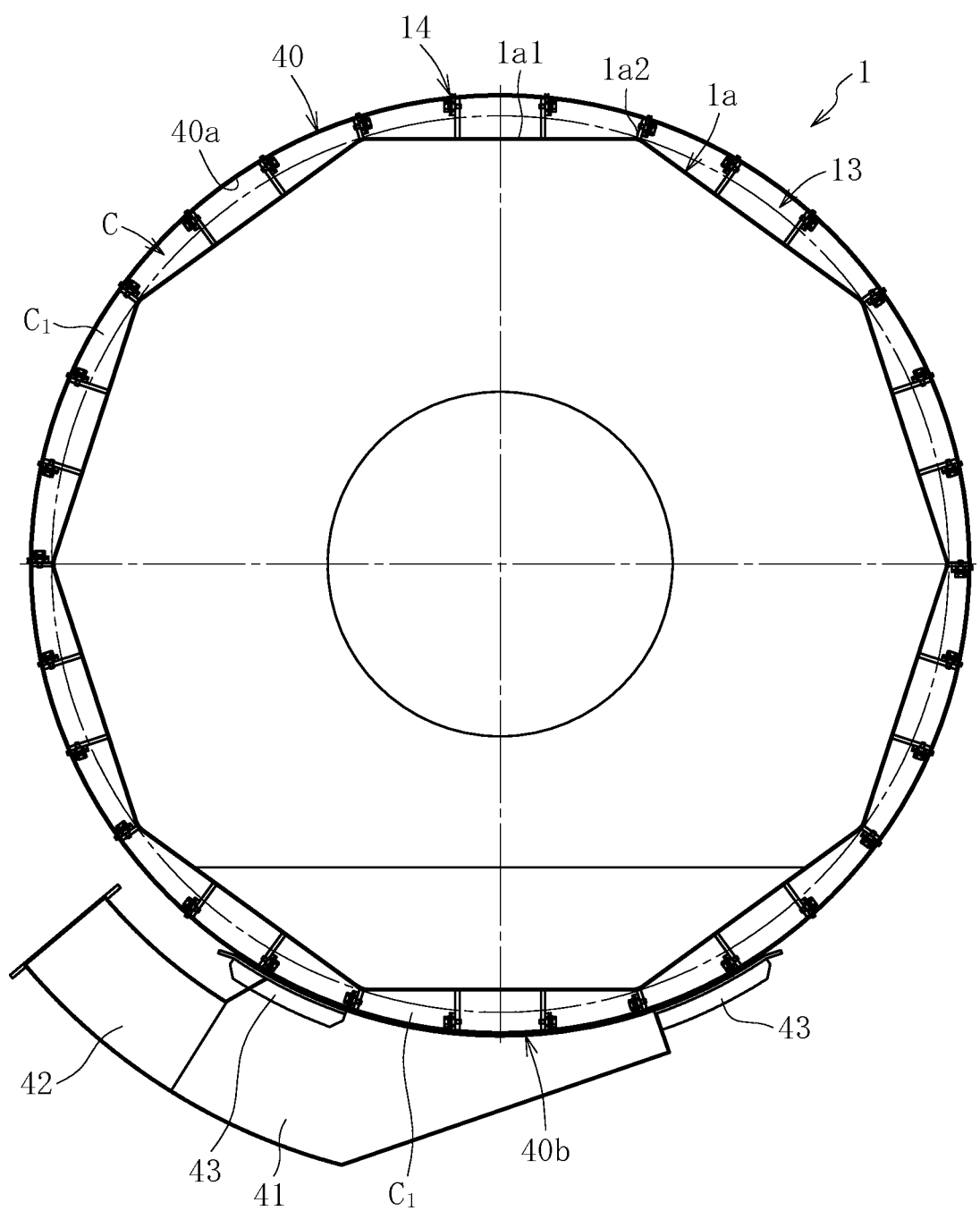
FIG. 16 is a cross sectional view of a rotating drum according to another embodiment of the present invention.

FIG. 16 illustrates a rotating drum 1 according to another embodiment of the present invention. In this embodiment, the peripheral wall portion 1a of the rotating drum 1 is covered with a cylindrical ventilation member 40 from the outer peripheral side at a predetermined clearance. With this, a space portion C is formed over the entire circumference between an inner periphery 40a of the ventilation member 40 and the outer periphery of the peripheral wall portion 1a. The sealing rings 13 provided at both the axial end portions of the peripheral wall portion 1a close the space portion C from the end portion sides, and the plurality of partition portions 14 provided on the outer periphery of the peripheral wall portion 1a partition the space portion C at a predetermined interval in the rotational direction. The sealing rings 13 and the partition portions 14 are the same as those in the embodiment described above, and are held in sliding contact with the inner peripheral surface 40a of the ventilation member 40 during the rotation of the rotating drum 1. The space portion C is partitioned at the predetermined interval in the rotational direction by the plurality of partition portions 14. With this, the plurality of ventilation spaces C1 formed on the outer peripheral side of the peripheral wall portion 1a are divided into a predetermined rotational dimension. Specifically, the inner periphery 40a of the ventilation member 40, the sealing rings 13 at both the axial end portions, adjacent two partition portions 14 in the rotational direction, and the outer periphery of the peripheral wall portion 1a form each one of the ventilation spaces C1. In this way, the plurality of ventilation spaces C1 are formed along the rotational direction on the outer peripheral side of the peripheral wall portion 1a.

The ventilation member 40 comprises a ventilation hole (air outlet) 40b provided at a part thereof. In this embodiment, the ventilation hole 40b is formed to have a predetermined rotational dimension and axial dimension in a lower portion of the ventilation member 40. Further, a ventilation chamber 41 is connected to the ventilation hole 40b of the ventilation member 40, and a ventilation duct 42 is connected to the ventilation chamber 41. A connecting part between the ventilation hole 40b and the ventilation chamber 41 of the ventilation member 40 comprises a plugging member 43 for preventing leakage of a drying gas.

The process gas supplied from the air inlet portion A1 on the front end portion side and from the air inlet portion A2 on the rear end portion side of the rotating drum 1 into the rotating drum 1 passes through the particle layer S so as to contribute to drying of the particle layer S. After that, the process gas enters the above-mentioned ventilation spaces C1 through the ventilation portions (porous portions) of the peripheral wall portion 1a of the rotating drum 1, and is exhausted from the ventilation spaces C1 to the ventilation chamber 41 through the ventilation hole 40b. Note that, an air inlet may be provided at a predetermined position on the ventilation member 40, and the process gas may be supplied from the air inlet into the rotating drum 1. Other details are the same as those in the embodiments described above, and hence redundant description thereof is omitted.

FIG. 17 illustrate an air inlet portion A1 provided on the front end opening portion 1e side of the rotating drum 1 according to another embodiment of the present invention. The air inlet portion A1 according to this embodiment comprises an air inlet chamber 40 provided at the front end portion of the casing 2, and the air inlet chamber 40 comprises an airflow swirling portion 43 as an airflow control portion. A front side of the air inlet chamber 40 is closed by the front panel 2b, and a rear portion of the air inlet chamber 40 communicates to the front end opening portion 1e of the rotating drum 1. Further, an air inlet duct 41 is connected to the air inlet chamber 40. The process gas that is supplied through the air inlet duct 41, such as hot air and cool air, flows into the air inlet chamber 40, and then flows into the rotating drum 1 from the air inlet chamber 40 through the front end opening portion 1e.

Figure 17A:
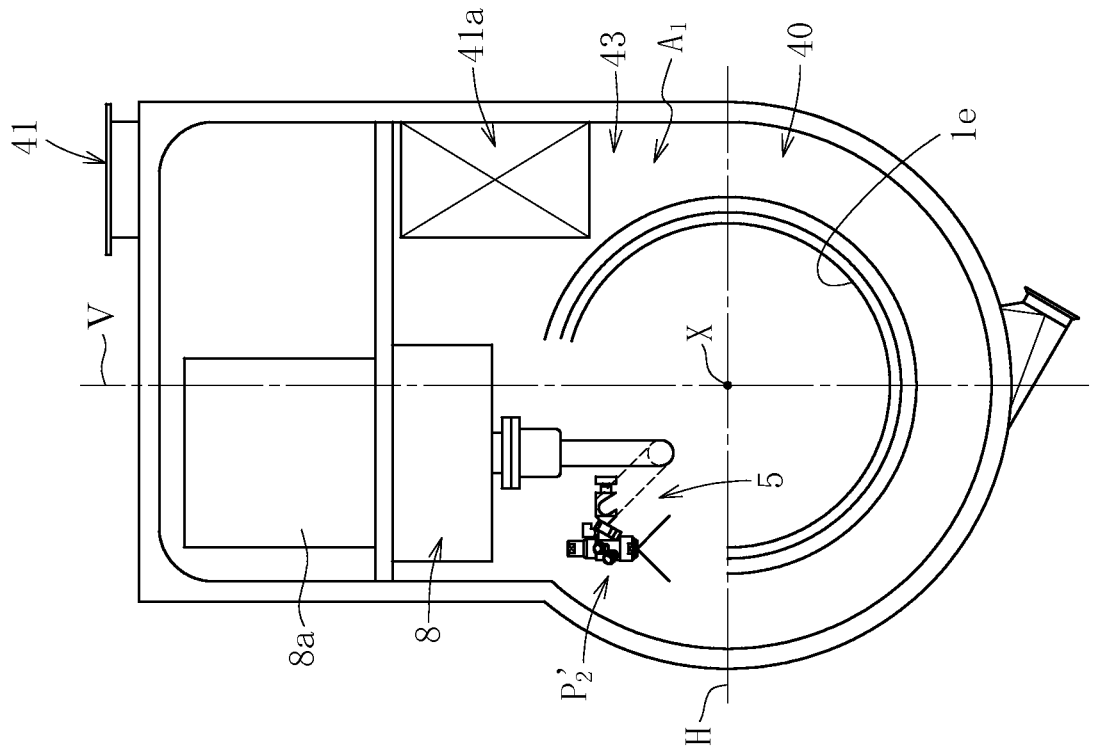
FIG. 17(A) is a front view of the front end portion of the casing, for illustrating the air inlet portion on the front end portion side of the rotating drum according to another embodiment of the present invention.
Figure 17B:
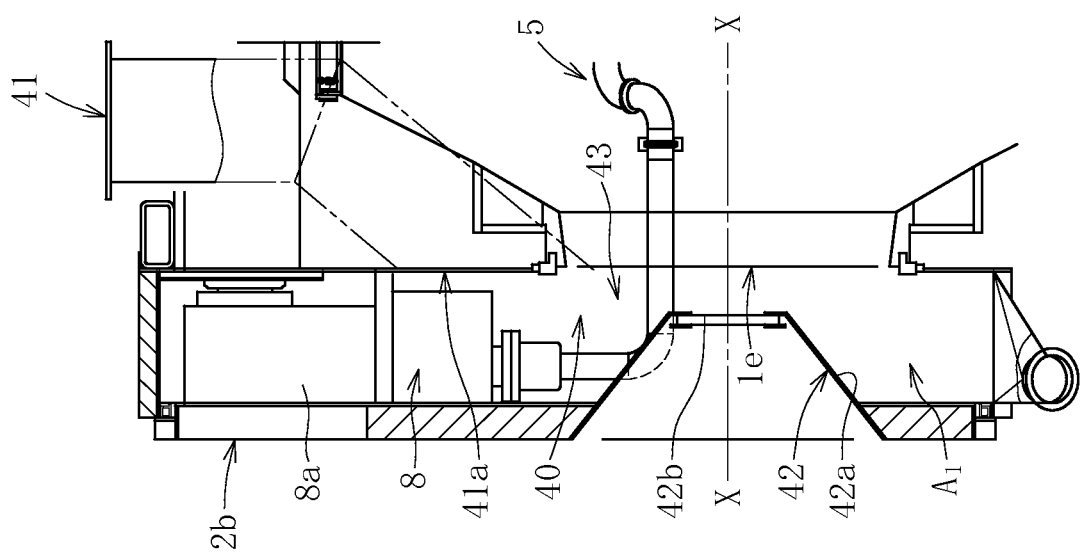
FIG. 17(B) is a vertical sectional view of a peripheral portion of the air inlet portion.

As illustrated in FIG. 17(A), as viewed from a front side of the rotating drum 1, the air inlet duct 41 comprises an air inlet 41a located on a right-hand side with respect to the vertical plane V comprising the axis X of the rotating drum 1 in FIG. 17(A) and located on an upper side with respect to a horizontal plane comprising the axis X of the rotating drum 1 in FIG. 17(A). Further, as illustrated in FIG. 17(B), the air inlet duct 41 supplies the process gas from obliquely above into the air inlet 41a set to the position described above. Thus, a flow of the process gas supplied to the air inlet chamber 40 from the air inlet duct 41 through the air inlet 41a swirls in a clockwise direction in the air inlet chamber 40 as viewed from the front side of the rotating drum 1. Further, in this embodiment, as illustrated in FIG. 17(B), a swelling portion 42 for guiding the process gas to swirl is provided in a predetermined region in the air inlet chamber 40, specifically, a region around the axis X of the rotating drum 1. In the example illustrated in FIG. 17(B), the swelling portion 42 is formed of a part of the front panel 2b, which swells in a direction of the front end opening portion 1e of the rotating drum 1 in the predetermined region. Further, a tapered conical guide surface 42a gradually reduced in diameter toward the front end opening portion 1e is formed as a peripheral surface of the swelling portion 42, and the swelling portion 42 comprises a distal end having a monitoring window 42b mounted thereto. The tapered conical guide surface 42a of the swelling portion 42 guides the process gas to swirl in the air inlet chamber 40. With this, the swirling flow is intensified, stabilized, and guided toward the front end opening portion 1e of the rotating drum 1.

The process gas that is supplied to the air inlet chamber 40 through the air inlet duct 41 swirls in the air inlet chamber 40. As a result, the process gas flows into the rotating drum 1 through the front end opening portion 1e toward the space portion in the rotating drum 1, which is located above the particle layer S and corresponds to the rear side of the spray nozzle unit 5 with respect to the setting position P2' of the spray nozzle unit 5 at the time of processing the particles. Other details are the same as those in the embodiments described above, and hence redundant description thereof is omitted.

Figure 18:
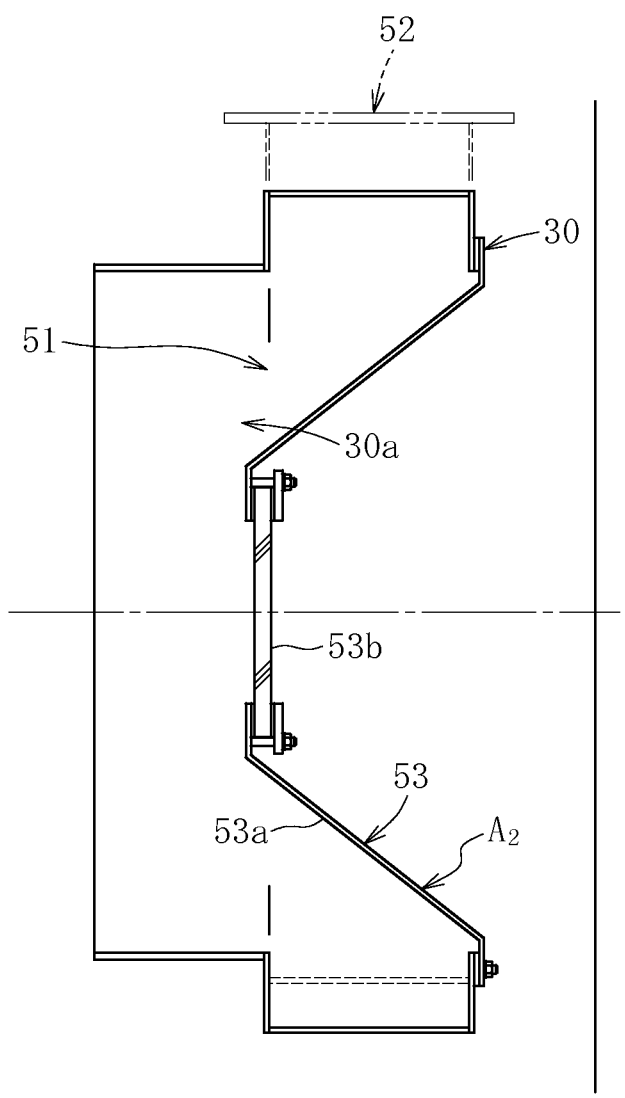
FIG. 18 is a vertical sectional view of an air inlet portion on a rear end portion side of the rotating drum according to another embodiment of the present invention.

FIG. 18 illustrates an air inlet portion A2 provided on the rear end opening portion 1g side of the rotating drum 1 according to another embodiment of the present invention. The air inlet portion A2 according to this embodiment comprises an airflow swirling portion S1 provided as an airflow control portion in the interior space (air inlet chamber 30a) of the chamber member 30 connected to the extended portion 1h on the rear end side of the rotating drum 1. An air inlet duct 52 is connected to the chamber member 30, and the process gas such as hot air and cool air is supplied in a tangential direction from the air inlet duct 52 to the air inlet chamber 30a.

A flow of the process gas supplied in the tangential direction from the air inlet duct 52 to the air inlet chamber 30a swirls in a clockwise direction in the air inlet chamber 30a as viewed from the rear side of the rotating drum 1. Further, in this embodiment, a swelling portion 53 for guiding the process gas to swirl is provided in a predetermined region in the air inlet chamber 30a, specifically, a region around the axis X of the rotating drum 1. A tapered conical guide surface 53a gradually reduced in diameter toward the rear end opening portion 1g (refer to FIG. 1) is formed as a peripheral surface of the swelling portion 53, and the swelling portion 53 comprises a distal end having a monitoring window 53b mounted thereto. The tapered conical guide surface 53a of the swelling portion 53 guides the process gas to swirl in the air inlet chamber 30a. With this, the swirling flow is intensified, stabilized, and guided toward the rear end opening portion 1g of the rotating drum 1.

The process gas that is supplied to the air inlet chamber 30a through the air inlet duct 52 swirls in the air inlet chamber 30a, and enters the interior space (in this embodiment, the airflow guide plate 32 illustrated in FIG. 1 is not arranged) of the extended portion 1h (refer to FIG. 1). As a result, the process gas flows into the rotating drum 1 from the rear end opening portion 1g toward the space portion in the rotating drum 1, which is located above the particle layer S and corresponds to the rear side of the spray nozzle unit 5 with respect to the setting position P2' of the spray nozzle unit 5 at the time of processing the particles. Other details are the same as those in the embodiments described above, and hence redundant description thereof is omitted.

As described above in this embodiment, the air inlet portion A1 is provided on the front end portion side of the rotating drum 1, and the air inlet portion A2 is provided on the rear end portion side thereof. However, there may be provided only one of the air inlet portion A1 on the front end portion side and the air inlet portion A2 on the rear end portion side. Alternatively, the air inlet portion A1 may have the same structure as that of the air inlet portion A2, or reversely, the air inlet portion A2 may have the same structure as that of the air inlet portion A1.

Further, as described above in this embodiment, the nozzle moving mechanism 9 has a double shaft structure comprising the two slide shafts 9a and 9b. However, the nozzle moving mechanism 9 may have a single shaft structure comprising only one slide shaft corresponding to the slide shaft 9a. In this case, the single shaft structure comprises a slide bearing portion for slide-guiding the one slide shaft, a pivot bearing portion for supporting the slide shaft that pivots about an axis thereof, and a pivot drive portion for driving the slide shaft to pivot. The slide shaft is driven to pivot by the pivot drive portion so as to swivel the front panel 2b about the swivel center, that is, the axis of the slide shaft.

Figure 19:
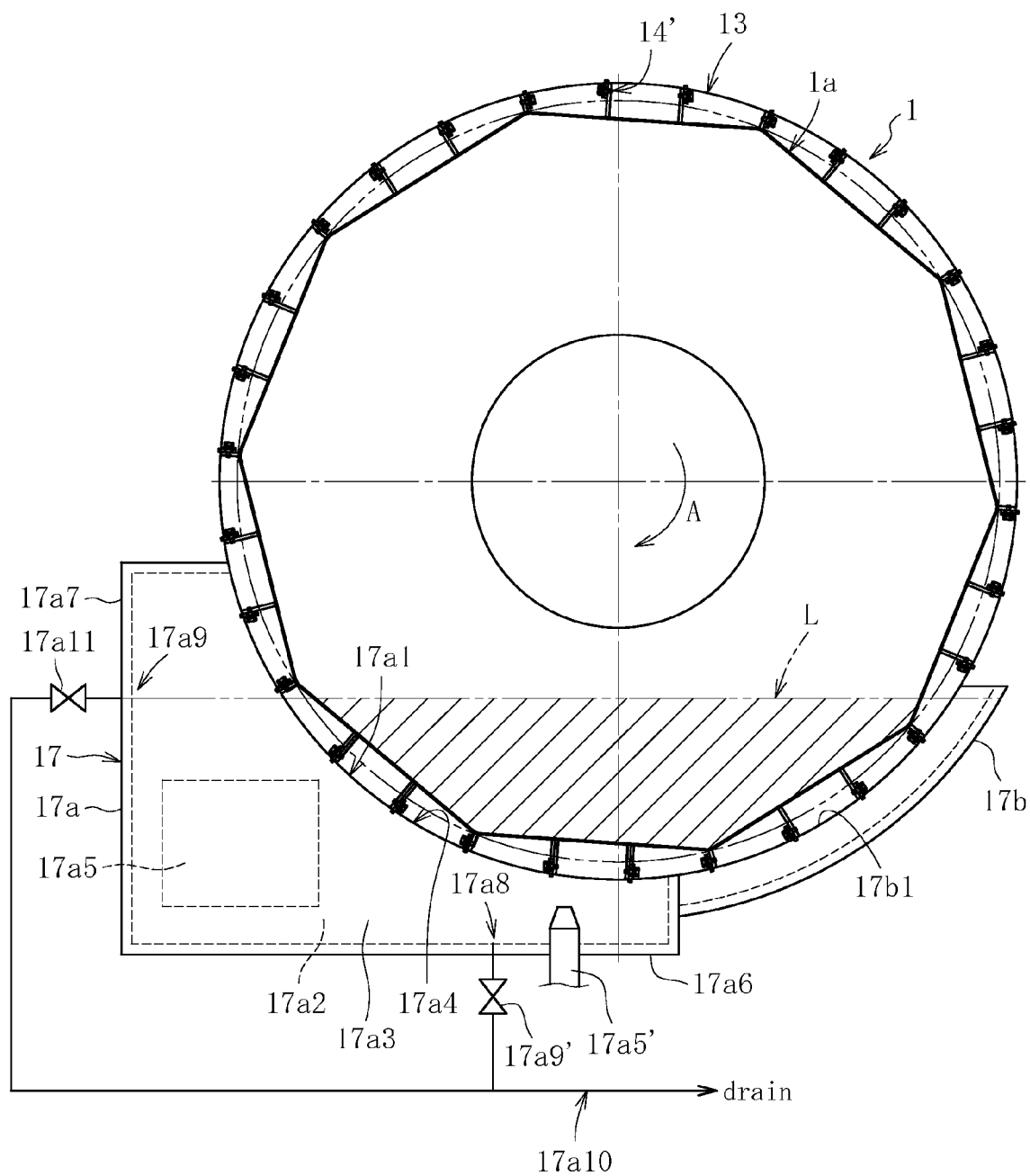
FIG. 19 is a partial sectional view of a peripheral portion of the rotating drum and a washing bath according to another embodiment of the present invention.

FIG. 19 illustrates how the rotating drum 1 is washed according to another embodiment of the present invention. The rotating drum 1 comprises a washing bath 17 provided on the lower outerperipheral side thereof. The washing bath 17 is provided inside the inner housing 4, and comprises a bucket portion 17a on the downstream side in the rotational direction and an extended portion 17b on the upstream side in the rotational direction with respect to the rotational direction A of the rotating drum 1. The bucket portion 17a is opened at a part facing the peripheral wall portion of the rotating drum 1

(opening portion 17a1), and comprises circular-arc sliding contact portions 17a4 which are provided respectively to lateral wall portions 17a2 and 17a3 in a direction perpendicular to the drawing sheet of FIG. 19, and are held in sliding contact with the sealing rings 13 and flowing plates 14' of the rotating drum 1. In this embodiment, the flowing plates 14' each comprise the proximal portion 14a and the sealing member 14b of each of the partition portions 14 in the embodiment described above. Further, the bucket portion 17a comprises an air outlet 17a5 provided through the lateral wall portion 17a2 on a depth side in the direction perpendicular to the drawing sheet of FIG. 19. An air outlet duct (not shown) is connected to the air outlet 17a5. Further, the bucket portion 17a comprises a bubble flow jetting nozzle (bubbling jet nozzle) 17a5' for jetting a bubble-mixed washing liquid into the washing bath 17. The extended portion 17b comprises a circular-arc sliding contact portion 17b1 which extends in a circular-arc form from a rear end portion in the rotational direction of the bucket portion 17a to the upstream side in the rotational direction along the peripheral wall portion 1a of the rotating drum 1, and is held in sliding contact with the sealing rings 13 (and flowing plates 14') of the rotating drum 1. The sliding contact portion 17b1 is smoothly continuous with the sliding contact portions 17a4 of the bucket portion 17a. Note that, the extended portion 17b may comprise a simple circular-arc plate so as to be held in sliding contact with the sealing rings 13 (and flowing plates 14') of the rotating drum 1.

The bucket portion 17a comprises a bottom wall portion 17a6 and a lateral wall portion 17a7 respectively comprising a drain port 17a8 and an overflow port 17a9. The drain port 17a8 is connected to a water delivery pipe 17a10 through intermediation of a drain valve 17a9', and the overflow port 17a9 is connected to the water delivery pipe 17a10 through intermediation of an overflow valve 17a11.

In order to wash the rotating drum 1, first, the drain valve 17a9' is closed, and the overflow valve 17a11 is opened. In this state, the washing liquid such as wash water is supplied to the washing bath 17 with the bubble flow jetting nozzle 17a5' or other liquid supply means. The washing liquid supplied to the washing bath 17 also enters the rotating drum 1 through the ventilation portions (porous portions) of the peripheral wall portion 1a of the rotating drum 1. In the washing bath 17, a water level increases to the liquid surface L illustrated in FIG. 19. After the washing liquid is pooled in the washing bath 17 in this way, washing is performed while rotating the rotating drum 1 and jetting a bubble flow of the washing liquid from the bubble flow jetting nozzle 17a5' into the washing liquid. By synergistic effects of the rotation of the rotating drum 1 in the washing liquid in the washing bath 17, and the jet and bubbles of the washing liquid, which are jetted from the bubble flow jetting nozzle 17a5' into the washing liquid, the peripheral wall portion and the ventilation portions of the rotating drum 1, the inside of the rotating drum 1, and the like can be effectively washed. Further, due to the bubble flow of the washing liquid jetted from the bubble flow jetting nozzle 17a5', an inside of the bucket portion 17a is also more efficiently washed.

At the time of washing, due to the bubble flow constantly jetted from the bubble flow jetting nozzle 17a5' into the washing liquid, the washing liquid near the liquid surface L overflows from the overflow port 17a9 and is drained into the water delivery pipe 17a10 through the overflow valve 17a11. Insoluble contaminants dispersed in the washing liquid (particulate contaminants, oily particulate matter, and the like) are floated on the liquid surface L by an action of the bubbles, and drained together with the washing liquid that overflows from the overflow port 17a9 into the water delivery pipe 17a10.

Thus, cleanliness of the washing liquid in the washing bath 17 can be maintained, and the contaminants in the washing liquid are prevented from re-adhering to the rotating drum 1. In this way, a washing effect can be enhanced.

After the rotating drum 1 is washed as described above, the drain valve 17a9' is opened to drain the washing liquid in the washing bath 17 into the water delivery pipe 17a10. When the drain valve 17a9' and the overflow valve are closed after the drainage of the washing liquid, a space portion is formed in the inside of the bucket portion 17a of the washing bath 17, and the space portion serves as an air outlet chamber at the time of processing the particles. In other words, the bucket portion 17a doubles as an air outlet member.

In this embodiment, the flowing plates 14' each comprise the proximal portion 14a fixed to the outer periphery of the peripheral wall portion 1a, and the sealing member 14b mounted to the proximal portion 14a so as to be movable in the inner and outer circumferential directions of the peripheral wall portion 1a. The flowing plates as a whole each may be obtained by forming a synthetic resin material of a fluorine resin (such as PTFE) or a synthetic rubber material such as hard rubber into a single flat plate shape, and fixed to the outer periphery of the peripheral wall portion 1a. Alternatively, the flowing plates may be fixed to the outer periphery of the peripheral wall portion 1a in a forward tilting posture with respect to the rotational direction of the rotating drum 1. With this, the generation of the above-mentioned positive pressure of the washing liquid is promoted on the downstream side in the rotational direction of the flowing plates. Still alternatively, the flowing plates need not necessarily be formed into the flat plate shape, and may comprise a plate having a sectional shape gradually increased in rotational dimension from the peripheral wall portion 1a to the outer peripheral side, such as an inverse triangular shape or inverse trapezoidal shape in cross-section. With this, the generation of the above-mentioned positive pressure of the washing liquid is promoted on the downstream side in the rotational direction of the flowing plates, and the generation of the above-mentioned negative pressure of the washing liquid is promoted on the upstream side in the rotational direction of the flowing plates. Further, instead of the bubble flow jetting nozzle 17a5', there may be used a bubble generating nozzle for generating bubbles in the washing liquid in the washing bath 17. Other details are the same as those in the embodiments described above, and hence redundant description thereof is omitted.

Figure 20:
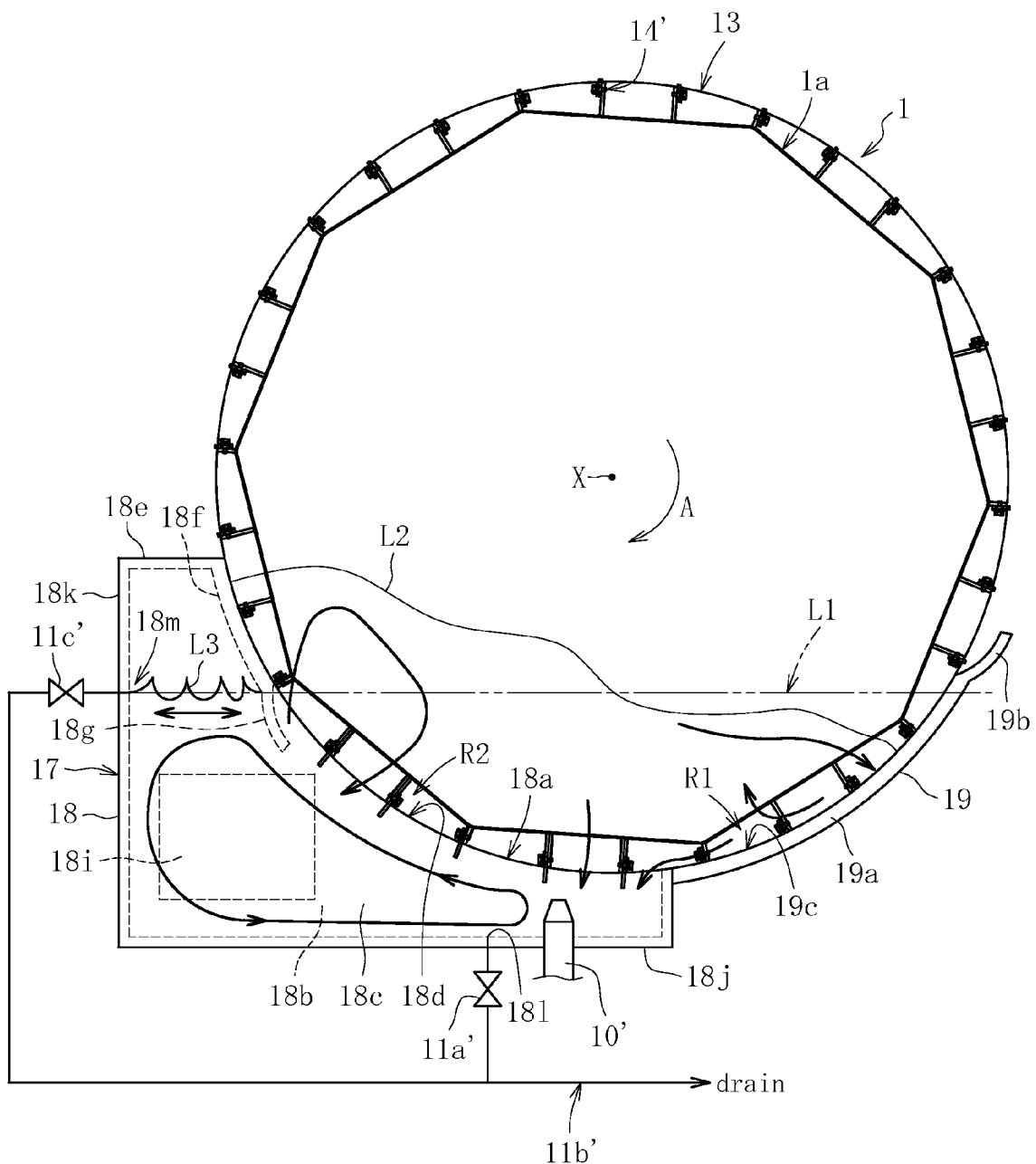
FIG. 20 is a partial sectional view of the peripheral portion of the rotating drum and the washing bath according to another embodiment of the present invention.

FIG. 20 illustrates how the rotating drum 1 is washed according to another embodiment of the present invention. The rotating drum 1 comprises the washing bath 17 provided on the lower outerperipheral side thereof. The washing bath 17 is provided inside the inner housing 4, and comprises a bucket portion 18 on the downstream side in the rotational direction and an extended portion 19 on the upstream side in the rotational direction with respect to the rotational direction A of the rotating drum 1.

Figure 21:
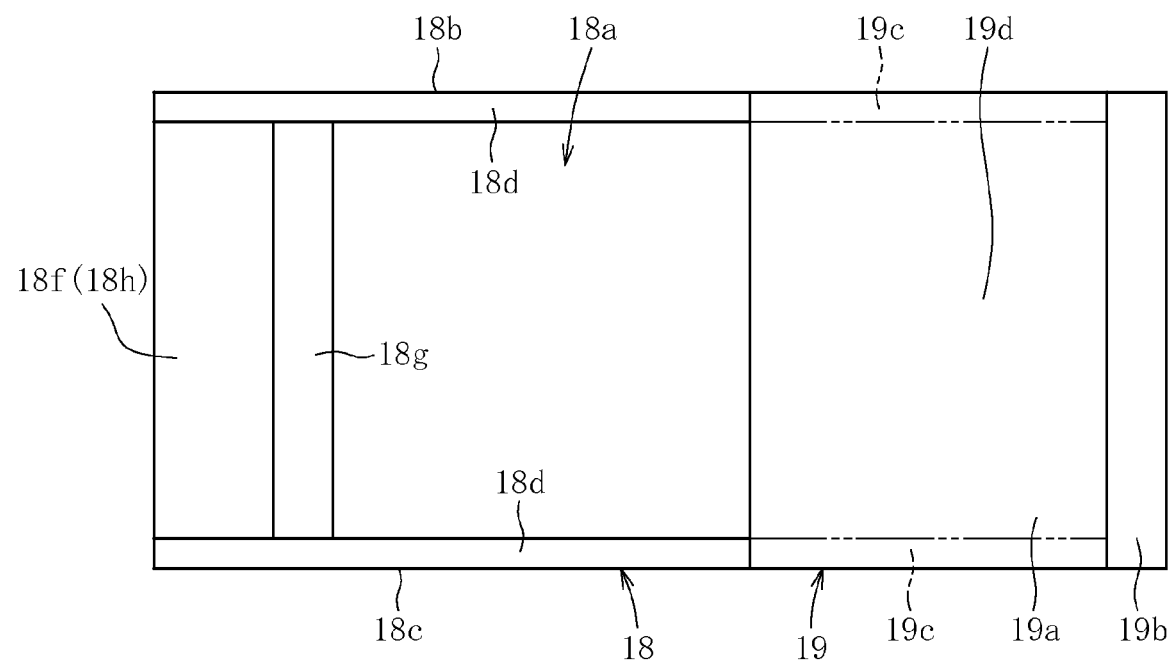
FIG. 21 is a developed view of the washing bath viewed from the rotating drum side.

The bucket portion 18 is opened at a part facing the peripheral wall portion 1a of the rotating drum 1 (opening portion 18a), and comprises circular-arc first ring sliding contact portions 18d which are provided respectively to lateral wall portions 18b and 18c in a direction perpendicular to the drawing sheet of FIG. 20, and are held in sliding contact with the sealing rings 13 of the rotating drum 1 (see FIG. 21). The flowing plates 14' are kept out of sliding contact with the first ring sliding contact portions 18d.

Further, the bucket portion 18 comprises a circular-arc wall portion 18f extending in side view from an end portion on the rotating drum 1 side of an upper wall portion 18e approximately to a position of a liquid surface L1 of the washing liquid along the sealing rings 13, and a first guide portion 18g extending obliquely downward from an end portion of the circular-arc wall portion 18f. The circular-arc wall portion 18f and the first guide portion 18g are provided between the lateral wall portion 18b and the lateral wall portion 18c.

A surface on the rotating drum 1 side of the circular-arc wall portion 18f of the bucket portion 18 comprises a first flowing-plate sliding contact portion 18h which comprises a circular-arc plate having the same curvature as that of a rim of the sealing rings 13, and is held in sliding contact with an entire axial region of each of the flowing plates 14'. However, the sealing rings 13 are kept out of sliding contact with the circular-arc wall portion 18f. The first guide portion 18g comprises a plate having a shape gradually spaced apart from the sealing rings 13 toward the upstream side in the rotational direction in side view.

Further, the bucket portion 18 comprises a connection port 18i provided through the lateral wall portion 18b on a depth side in the direction perpendicular to the drawing sheet of FIG. 20. An air outlet duct (not shown) is connected to the connection port 18i. Further, the bucket portion 18 comprises a bubble flow jetting nozzle (bubbling jet nozzle) 10' for jetting a bubble-mixed washing liquid into the washing bath 17.

The extended portion 19 extends in a circular-arc form from a rear end portion in the rotational direction of the bucket portion 18 to the upstream side in the rotational direction along the peripheral wall portion 1a of the rotating drum 1. In this embodiment, the extended portion 19 has a plate shape, and comprises a main body portion 19a and a second guide portion 19b. The main body portion 19a comprises a simple circular-arc plate along the sealing rings 13.

The rotating drum 1 side of the main body portion 19a of the extended portion 19 comprises a pair of second ring sliding contact portions 19c held in sliding contact with the pair of sealing rings 13 of the rotating drum 1, and a second flowing-plate sliding contact portion 19d (refer to FIG. 21) which is formed between those second ring sliding contact portions 19c, and is held in sliding contact with the flowing plates 14'. The second ring sliding contact portions 19c are smoothly continuous with the first ring sliding contact portions 18d of the bucket portion 18. The entire axial region of each of the flowing plates 14' is held in sliding contact with the second flowing plate sliding portion 19d of the main body portion 19a. The second guide portion 19b of the extended portion 19 comprises a plate having a shape gradually spaced apart from the sealing rings 13 toward the upstream side in the rotational direction. Note that, the extended portion 19 may be formed, for example, into a C-shape in cross-section along the axial direction so that only both axial end portions of each of the flowing plates 14' and the sealing rings 13 are held in sliding contact with the extended portion 19.

The bucket portion 18 comprises a bottom wall portion 18j and a lateral wall portion 18k respectively comprising a drain port 18l and an overflow port 18m. The drain port 18l is connected to a water delivery pipe 11b' through intermediation of a drain valve 11a', and the overflow port 18m is connected to the water delivery pipe 11b' through intermediation of an overflow valve 11c'.

In order to wash the rotating drum 1, first, the drain valve 11a' is closed, and the overflow valve 11c' is opened. In this state, the washing liquid such as wash water is supplied to the washing bath 17 with the bubble flow jetting nozzle 10' or other liquid supply means. The washing liquid supplied to the washing bath 17 also enters the rotating drum 1 through the ventilation portions (porous portions) of the peripheral wall portion 1a of the rotating drum 1. In the washing bath 17, a water level increases to the liquid surface L1 illustrated in FIG. 20. After the washing liquid is pooled in the washing bath 17 in this way, washing is performed while rotating the rotating drum 1 and jetting a bubble flow of the washing liquid from the bubble flow jetting nozzle 10' into the washing liquid.

Along with the rotation of the rotating drum 1, in the rotating drum 1, inner walls of the rotating drum 1 (rotational energy of the rotating drum 1) cause the washing liquid to flow. As a result, a liquid surface L2 of the washing liquid in the rotating drum 1 is inclined to be high on the downstream side in the rotational direction and low on the upstream side in the rotational direction.

Then, in the washing liquid, there are formed a restriction region R1 in which the sealing member 14b of each of the flowing plates 14' is restricted to an inner circumferential position with respect to an outermost circumferential position, and a release region R2 in which the sealing member 14b is released to the outer peripheral side. In the restriction region R1, the main body portion 19a of the extended portion 19 as a restricting member restricts the position of the sealing member 14b. In the release region R2, the sealing member 14b is released to the outer peripheral side in the opening portion 18a, and brought to the outermost circumferential position by the centrifugal force. The release region R2 is located on the downstream side in the rotational direction of the rotating drum 1 with respect to the restriction region R1.

Note that, the first guide portion 18g and the second guide portion 19b guide the sealing member 14b of each of the flowing plates 14'. The first guide portion 18g allows the sealing member 14b, which has been located on the outermost peripheral side in the release region R2, to be smoothly moved to the rotating drum 1 side of the circular-arc wall portion 18f. The second guide portion 19b allows the sealing member 14b, which has been located on the outer peripheral side by the centrifugal force at a position on the upstream side in the rotational direction in the restriction region, to be smoothly moved to the rotating drum 1 side of the main body portion 19a of the extended portion 19. Further, the first guide portion 18g also has a function to lead the washing liquid, which has flown to the downstream side in the rotational direction of the rotating drum 1, into the rotating drum 1.

Further, along with the rotation of the rotating drum 1, the sealing rings 13 and the flowing plates 14' of the peripheral wall portion 1a are held in sliding contact respectively with the second ring sliding contact portions 19c and the second flowing plate-sliding contact portion 19d of the extended portion 19. With this, spaces S divided by the flowing plates 14' are formed on an outer peripheral side of the peripheral wall portion 1a of the rotating drum 1. In other words, in the restriction region R1, both axial end sides of the spaces S between the flowing plates 14' adjacent to each other are closed by the sealing rings 13, and an outer peripheral side thereof is closed by the main body portion 19a of the extended portion 19. Further, the sealing member 14b of each the flowing plates 14' is movable in the inner and outer circumferential directions. The sealing member 14b is moved in the outer circumferential direction by receiving the centrifugal force generated along with the rotation of the rotating drum 1, and is held in press-contact with the second flowing-plate sliding contact portion 19d of the extended portion 19 with the force generated along with the above-mentioned centrifugal force.

Note that, also in the bucket portion 18, the sealing rings 13 of the peripheral wall portion 1a are held in sliding contact with the first ring sliding contact portions 18d of the lateral wall portions 18b and 18c, and the flowing plates 14' are held in sliding contact with the first flowing-plate sliding contact portion 18h of the circular-arc wall portion 18f of the bucket portion 18. In this way, the spaces divided by the flowing plates 14' are formed on the outer peripheral side of the peripheral wall portion 1a of the rotating drum 1. In other words, both the axial end sides of each of the spaces between the flowing plates 14' adjacent to each other are closed by the sealing rings 13, and the outer peripheral side thereof is closed by the lateral wall portions 18b and 18c and the circular-arc wall portion 18f of the bucket portion 18. Further, on the circular-arc wall portion 18f of the bucket portion 18, the sealing member 14b of the flowing plates 14' is held in sliding contact with the first flowing-plate sliding contact portion 18h of the circular-arc wall portion 18f by the centrifugal force.

In the washing liquid, the restriction region R1, the release region R2, or the first guide portion 18g generates flows indicated by arrows in, for example, FIG. 20.

In the release region R2, the sealing member 14b of each of the flowing plates 14' is released to the outer peripheral side, and hence the sealing member 14b is brought to the outermost circumferential position by the centrifugal force. With this, the flowing plates 14' extend in the outer circumferential direction, and an entire length in the inner and outer circumferential directions of each of the flowing plates 14' is increased. Thus, a stirring force of the flowing plates 14' with respect to the washing liquid can be increased. An action of draining the washing liquid, which is caused to flow by the flowing plates 14', from the inside of the rotating drum 1 to the outside by the centrifugal force is promoted.

Meanwhile, in the restriction region R1, the sealing member 14b is restricted to the inner circumferential position with respect to the outermost circumferential position, and hence the entire length in the inner and outer circumferential directions of each of the flowing plates 14' is smaller than those of the flowing plates 14' in the release region R2. Thus, the above-mentioned action of draining the washing liquid with the flowing plates 14' is weaker than that in the release region R2, and hence the washing liquid that has been drained to the outside is liable to return into the rotating drum 1.

For those reasons, strong flows of the washing liquid are generated on the inside and outside of the rotating drum 1, and the flows of the washing liquid around the flowing plates 14' and on the inside and outside of the rotating drum 1 are intensified. Thus, in the coating apparatus of the present invention, the rotating drum 1 can be effectively washed.

Further, as described above, during the washing, the washing liquid in the rotating drum 1 forms the liquid surface L2 inclined to be high on the downstream side and low on the upstream side in the rotational direction. In this state, normally, by a relationship between the liquid surface in the rotating drum 1 and a height of a liquid surface L3 in the washing bath, the washing liquid flows into the rotating drum 1 from the upstream side in the rotational direction of the rotating drum 1, on which the liquid surface is low. Reversely, the washing liquid flows to the outside of the rotating drum 1 from the downstream side in the rotational direction, on which the liquid surface is high. In addition, the flowing plates 14' are released in the release region R2 on the downstream side in the rotational direction with respect to the restriction region R1. With this, a larger amount of the washing liquid is drained from the downstream side in the rotational direction of the rotating drum 1 to the outside of the rotating drum 1. When the larger amount of the washing liquid is drained from the front side of the rotating drum 1 to the outside of the rotating drum 1, a larger amount of the washing liquid flows into the rotating drum 1 from the upstream side in the rotational direction of the rotating drum 1. As a result, the washing liquid more actively intercommunicates between the inside and outside of the rotating drum 1, and washing efficiency is enhanced.

Further, as described above, around the flowing plates 14', flows of the washing liquid from the inside of the rotating drum 1 to the outside are generated by the centrifugal force. Then, also at both the axial end portions of each of the flowing plates 14', flows of the washing liquid toward the outside are generated by the centrifugal force. However, when both the axial end sides of the spaces S between the flowing plates 14' are not closed by the sealing rings 13, for example, when both the axial end portions of the flowing plates 14' and the sealing rings 13 are spaced apart from each other, the following state may arise.

Specifically, at both the axial end portion of the flowing plates 14', the washing liquid does not necessarily flow from the inside of the rotating drum 1 to an outside of the flowing plates 14' via the flowing plates 14'. This is because, even when the washing liquid in the vicinity of the axial end portions of the flowing plates 14' flows toward the outside, the washing liquid flows into the vicinity of the end portions of the flowing plates 14' from an outside in the axial direction of the end portions of the flowing plates 14' (inflow leakage). Thus, the washing liquid in the inside of the rotating drum 1 is hindered from flowing out to the vicinity of the end portions of the flowing plates 14'. As a result, washability may be deteriorated in the ventilation portions at both the axial end portions of the peripheral wall portion of the rotating drum 1.

As a countermeasure, in this embodiment, both the axial end sides of the spaces S between the flowing plates 14' are closed by the sealing rings 13, and hence inflow leakage described above is suppressed. Thus, the washing liquid can be guided to flow from the inside of the rotating drum 1 to the outside of the flowing plates 14' via the ventilation portions and the flowing plates 14'. As a result, washability in the ventilation portions/rotating drum 1 is enhanced.

Further, at the time of washing, along with the rotation of the drum, the flowing plates 14' cause the washing liquid to flow, and hence strong circulatory flows are generated in the entire washing liquid in the washing bath 17. Further, when the flowing plates 14' are rotated up out of the washing liquid, reciprocal flows of the washing liquid are generated near the liquid surfaces, and waves are generated in the washing bath 17 as exemplified by the liquid surface L3. Those flows and waves of the washing liquid contribute to washing of the washing bath 17 itself, and hence the washing bath 17 can also be efficiently washed.

Figure 22:
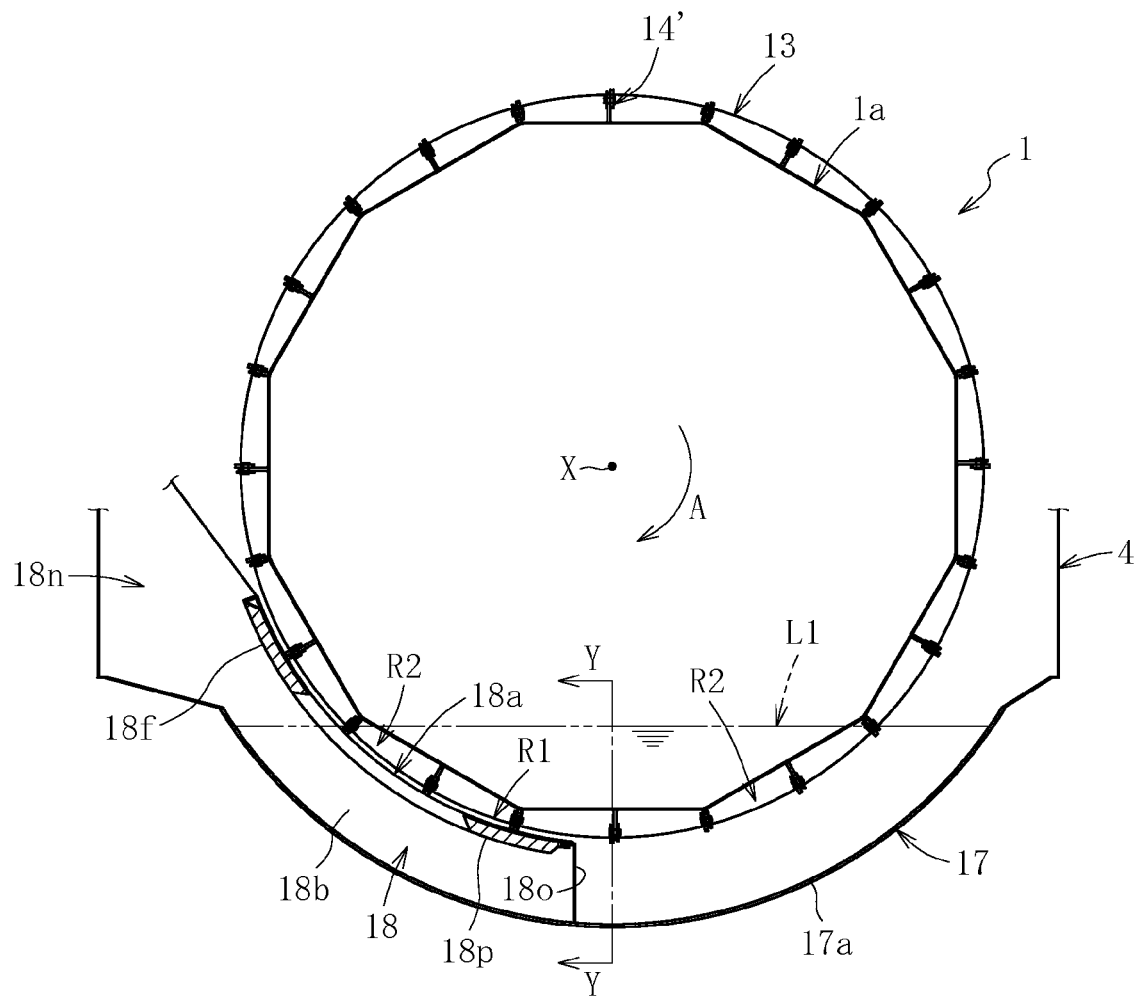
FIG. 22 is a sectional view of the peripheral portion of the rotating drum and the washing bath according to another embodiment of the present invention.
Figure 23:
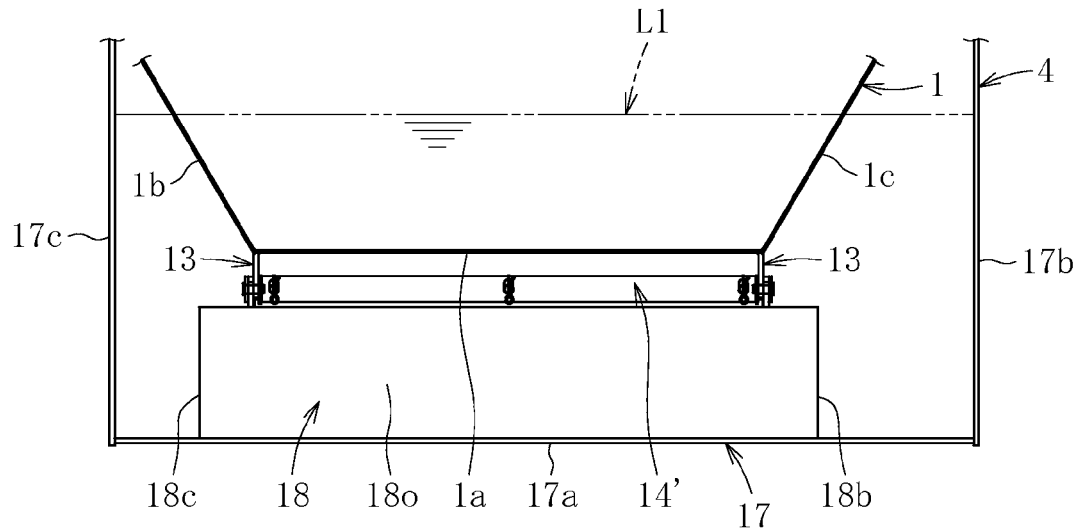
FIG. 23 is a sectional view taken along the line Y-Y in FIG. 22.

FIGS. 22 and 23 illustrate an embodiment of the present invention in which the lower portion of the inner housing 4 is used as the washing bath 17. The washing bath 17 comprises a bottom wall portion 17a of the lower portion of the inner housing 4, and lateral wall portions 17b and 17c. The bottom wall portion 17a extends along the rotational direction of the rotating drum 1 at a predetermined clearance with respect to the rotating drum 1. Further, in this embodiment, as illustrated in FIG. 23, the washing bath 17 comprises the bucket portion 18 provided therein. The bucket portion 18 comprises a bottom wall portion formed of the bottom wall portion 17a of the washing bath 17 by a predetermined distance. The lateral wall portions 18b and 18c of the bucket portion 18 are spaced apart respectively from the lateral wall portions 17b and 17c of the washing bath 17. The bucket portion 18 communicates to an air outlet duct (not shown) through intermediation of an air outlet passage 18n extending to the downstream side in the rotational direction of the rotating drum 1. At the time of processing the particles, the bucket portion 18 of the washing bath 17 functions as a part of a ventilation duct. Further, at the time of washing, the washing liquid is supplied up to the liquid surface L1 into the washing bath 17 and the bucket portion 18.

The bucket portion 18 as a whole extends to the downstream side along the rotational direction of the rotating drum 1 by a predetermined distance from a lateral wall portion 18o on the upstream side in the rotational direction of the rotating drum 1, and comprises the opening portion 18a provided at the part facing the rotating drum 1. Further, the bucket portion 18 comprises a circular-arc wall portion 18p extending between the lateral wall portions 18b and 18c along the sealing rings 13 in side view. The circular-arc wall portion 18p extends from an upper end of the lateral wall portion 18o to a side edge of the opening portion 18a. A surface on the rotating drum 1 side of the circular-arc wall portion 18p comprises a circular-arc plate having the same curvature as that of the rim of the sealing rings 13, and having the same shape as that of the circular-arc wall portion 18f on the downstream side in the rotational direction of the rotating drum 1 (left side in FIG. 22). The entire axial region of each of the flowing plates 14' is held in sliding contact with the surface on the rotating drum 1 side of the circular-arc wall portion 18p while the sealing rings 13 are kept out of sliding contact therewith. At the time of washing, the circular-arc wall portion 18p of the bucket portion 18 functions as the restricting member for restricting the position of the sealing member 14b so as to form the restriction region R1. Further, the restricting member is not provided on the upstream side of the bucket portion 18 in the washing bath 17 (right side in FIG. 22) in the rotational direction of the rotating drum 1, and the release region R2 is formed at the time of washing. By the way, also in this embodiment, the release region R2 is formed also in the opening portion 18a of the bucket portion 18. Thus, the release region R2 of the opening portion 18a of the bucket portion 18 is located on the downstream side in the rotational direction of the rotating drum 1 with respect to the restriction region R1. Other details are substantially the same as those in the embodiments described above, and hence redundant description thereof is omitted.

In the following, description is made of baffles arranged inside the rotating drum according to an embodiment of the present invention.

Figure 24:
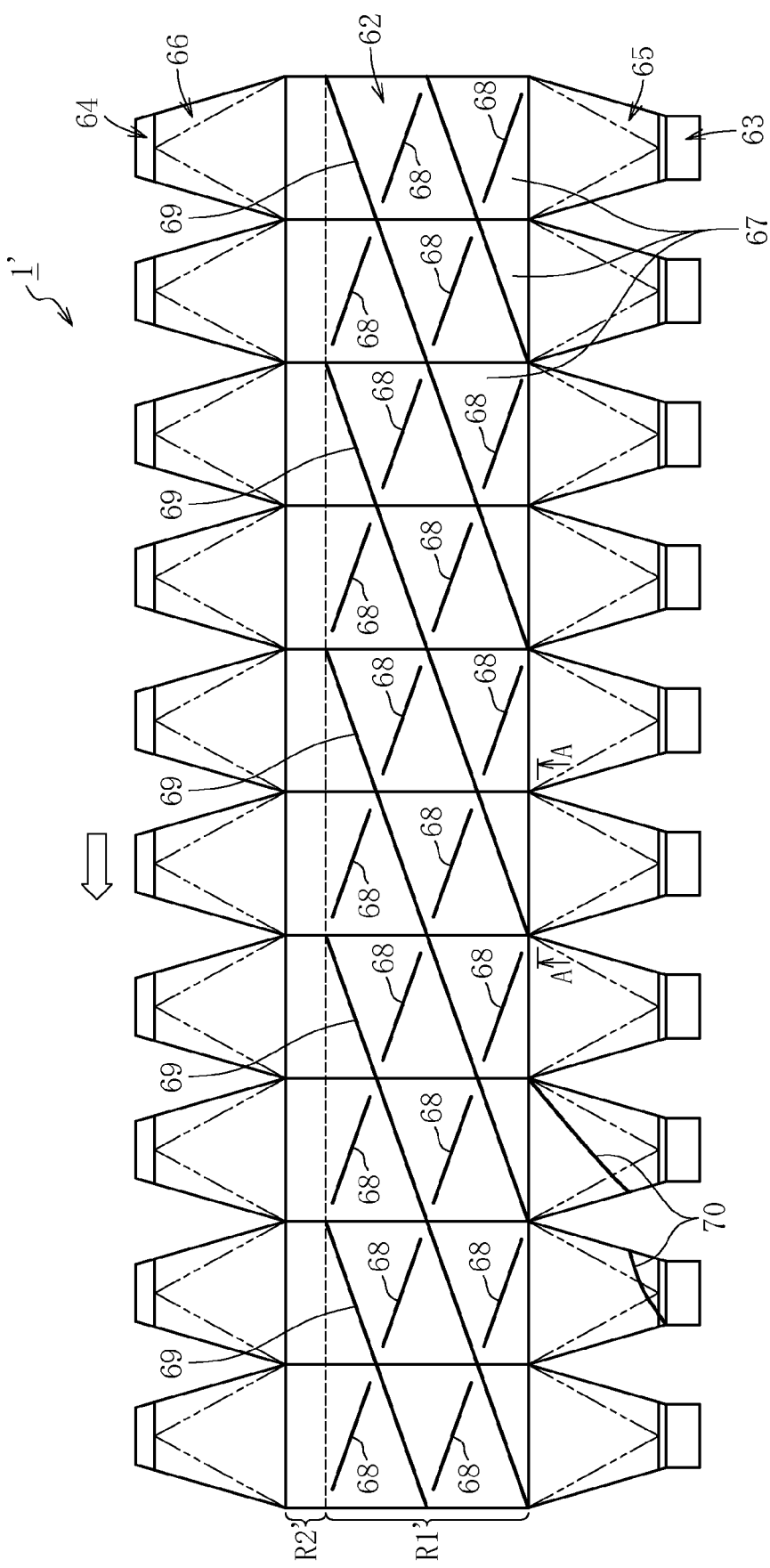
FIG. 24 is a schematic developed view of an inner surface side of a lateral wall portion of a rotating drum according to another embodiment of the present invention.

As illustrated in FIG. 24, a lateral wall portion 1' of the rotating drum comprises, as main components, a peripheral wall portion 62, end portions 63 and 64, and end wall portions 65 and 66 for connecting the peripheral wall portion 62 and the end portions 63 and 64 to each other. The end portions 63 form the mouth ring portion and the front end opening portion of the rotating drum.

The peripheral wall portion 62 is formed around a center of an axial direction of the lateral wall portion 1' along the circumferential direction in parallel to the axis of the lateral wall portion 1'. In this embodiment, the peripheral wall portion 62 has a decagonal shape in cross-section, and comprises ten rectangular flat-plate-like side wall portions 67 corresponding to sides of the decagonal shape. Further, the side wall portions 67 of the peripheral wall portion 62 each comprise a porous plate and are ventilated. In addition, in order to more effectively stir and mix the particle layer, an inner surface of the peripheral wall portion 62 comprises baffles of two types, that is, upper baffles 68 and lower baffles 69. The inner surface of the peripheral wall portion 62 is segmented into two regions in an axial direction (longitudinal direction in FIG. 24), that is, a baffle setting region R1' on the end wall portion 65 side in which the baffles are provided, and a baffle free region R2' on the end wall portion 66 side in which the baffles are not provided. In this embodiment, twenty upper baffles 68 are set and all formed into the same shape and the same dimensions, and five lower baffles 69 are set and all formed into the same shape and the same dimensions. The upper baffles 68 and the lower baffles 69 each have a flat plate shape, and are provided perpendicularly to the side wall portions 67. Although not described in detail here, the upper baffles 68 are adjustable in height with respect to inner surfaces of the side wall portions 67. In contrast, the lower baffles 69 are fixed to the side wall portions 67, and hence cannot be changed in height with respect to the inner surfaces of the side wall portions 67.

The five lower baffles 69 are equiangularly provided. Further, across four side wall portions 67, the lower baffles 69 each extend from an edge on the end wall portion 65 side to an edge on the end wall portion 66 side of the baffle setting region R1'. A half of each of the lower baffles 69 adjacent to each other in the circumferential direction is provided on the same two side wall portions 67. In addition, four upper baffles 68 are provided between the lower baffles 69. The upper baffles 68 between the lower baffles 69 are provided respectively on different side wall portions 67. The upper baffles 68 each extend from a vicinity of one circumferential end side to a vicinity of another circumferential end side in the side wall portions 67. The upper baffles 68 and the lower baffles 69 each extend in a direction inclined at the same angle with respect to the circumferential direction of the rotating drum (horizontal direction in FIG. 24), and the directions of the inclinations are opposite to each other. Further, a center in the extending direction of each of the upper baffles 68 is located on a circumferential center of the side wall portion 67, and a center in the extending direction of each of the lower baffles 69 is located on a boundary between side wall portions 67 adjacent on the circumferential center side among the four side wall portions 67. Further, the upper baffles 68 are arranged in a manner that, when the baffle setting region R1' is divided into four in the axial direction (longitudinal direction in FIG. 24), five upper baffles 68 are arranged in each of the four regions.

The end wall portions 65 comprise ten triangular sides having bases that double as edges on the peripheral wall portion 62 side of the end wall portions 65, and ten triangular sides having bases that double as edges on the end portion 63 side of the end wall portions 65. The end wall portions 66 comprise ten triangular sides having bases that double as edges on the peripheral wall portion 62 side of the end wall portions 66, and ten triangular sides having bases that double as edges on the end portion 64 side of the end wall portions 66. In this embodiment, the end wall portions 65 comprise a single delivery plate 70 for guiding particles at the time of delivering the particles. The delivery plate 70 extends across four triangular sides from the edge on the peripheral wall portion 62 side of the end wall portion 65 to the edge on the end portion 63 side of the end wall portion 65 in a direction inclined with respect to the circumferential direction of the rotating drum (horizontal direction in FIG. 24).

During a process on particles, the rotating drum is rotated in a direction indicated by a hollow arrow in FIG. 24. The upper baffles 68 and the lower baffles 69 extend in directions different from each other, and hence the upper baffles 68 and the lower baffles 69 move the particles in the directions different from each other. With this, stirring and mixing effects that are greater than those in a case where baffles extend in a single direction can be obtained.

At the time of delivery of the particles from the rotating drum, the rotating drum is rotated in a direction opposite to the hollow arrow in FIG. 24. The particles are moved to the end wall portions 65 by the lower baffles 69, and moved from the end wall portions 65 to the end portions 63 by being guided by the delivery plate 70. After the particles are accumulated in the end portions 63, the particles are pushed out by succeeding particles and delivered through the opening portion.

Figure 25:
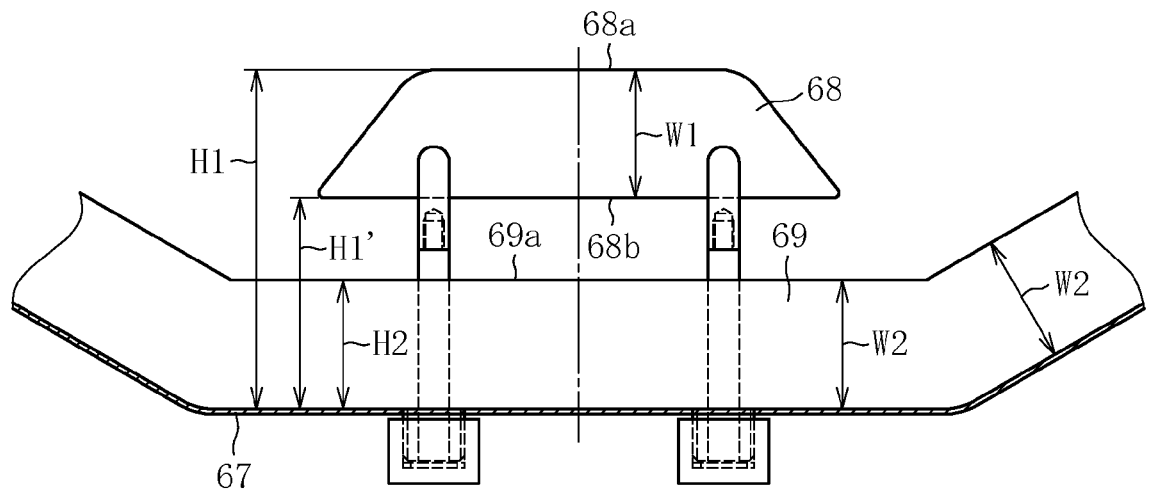
FIG. 25 is a sectional view taken along the arrows A-A in FIG. 24.

As illustrated in FIG. 25, a height H1 of an upper end 68a of the upper baffle 68 with respect to the inner surface of the side wall portion 67 is larger than a height H2 of an upper end 69a of the lower baffle 69. Note that, a height direction and upper and lower directions each refer to a direction perpendicular to the side wall portion 67 (the same applies hereinafter unless otherwise specified). Further, the "upper" and "lower" mean the "upper side" and "lower side" in the drawings, and vary depending on the rotation state of the rotating drum. In this way, the "upper" and "lower" are different from an actual "upper side" and "lower side" (the same applies hereinafter unless otherwise specified). In FIG. 25, a region in which the upper baffles 68 are provided does not overlap with a region in which the lower baffles 69 are provided. In other words, a height H1' of a lower end 68b of the upper baffle 68 is larger than the height H2 of the upper end 69a of the lower baffle 69. In this embodiment, a width W1 of the upper baffle 68 is equal to a width W2 of the lower baffle 69.

Figure 26:
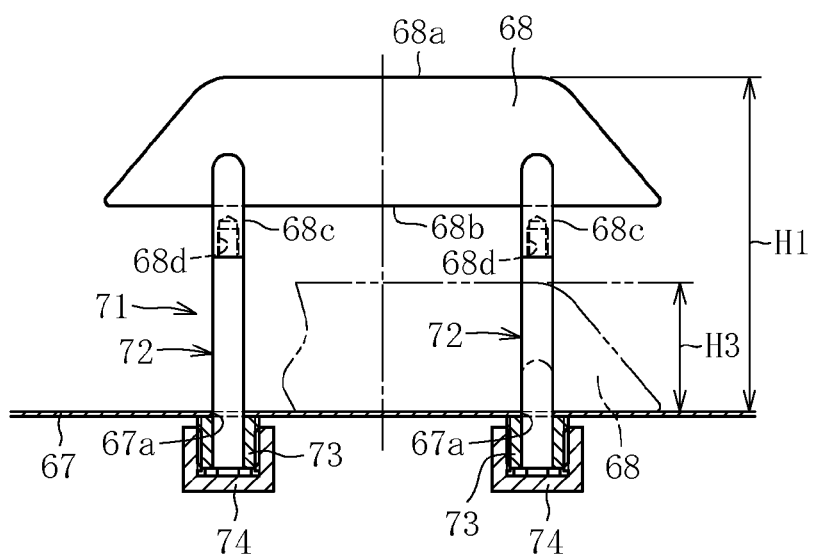
FIG. 26 is a partial sectional view of a vicinity of an upper baffle (viewed from the same side as that in FIG. 25).

As illustrated in FIG. 26, the upper baffle 68 is formed into a substantially trapezoidal plate shape comprising a pair of lateral sides gradually approaching the upper end 68a. The coating apparatus of this embodiment comprises height adjustment means 71 capable of adjusting the height H1 of the upper end 68a of the upper baffle 68 with respect to the inner surface of the side wall portion 67 from the outside of the rotating drum. In this embodiment, in order to adjust the height H1 of the upper baffle 68, a position of the upper baffle 68 is changed along the height direction with the height adjustment means 71. The height adjustment means 71 comprises height adjustment pins 72 each having a height to pass through the side wall portions 67 of the rotating drum in a freely retractable manner. Although not described in detail here, the height adjustment pins 72 each comprise one end portion 72a mounted in a freely removable manner to the upper baffle 68, and another end portion 72b mounted in a freely removable manner to an outer side of the rotating drum. In order to change the position of the upper baffle 68 along the height direction, the height adjustment pins 72 are replaced with height adjustment pins each having a different height.

Figure 27A:
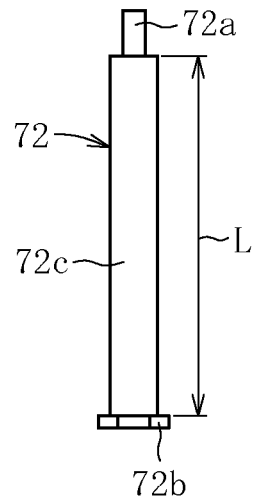
FIG. 27(A) is a view of a height adjustment pin used in FIG. 26.

As illustrated in FIG. 27(A), the height adjustment pin 72 comprises the one end portion 72a, the another end portion 72b, and a rod-shaped main body portion 72c having a circular shape in cross-section and extending along the height direction from the one end portion 72a to the another end portion 72b. The one end portion 72a comprises male threads, and the another end portion 72b comprises a flange having a hexagonal shape in cross-section and projecting to a radially outer side with respect to the main body portion 72c.

As illustrated in FIG. 26, the lower end of the upper baffle 68 comprises a pair of pin receiving portions 68c spaced apart from each other. The pin receiving portions 68c each comprise a rod having a circular shape in cross-section, and an upper end side fixed to the upper baffle 68, for example, by welding. The pin receiving portions 68c each comprise a lower end provided with a threaded hole 68d having an inner peripheral surface provided with female threads that are threadedly engaged with the male threads of the one end portion 72a of each of the height adjustment pins 72. An outer diameter of the pin receiving portion 68c and an outer diameter of the main body portion 72c of the height adjustment pin 72 are equal to each other.

The side wall portion 67 comprises a pair of through-holes 67a spaced apart from each other, and a mounting boss 73 is fixed, for example, by welding to a rim of each of the through-holes 67a on an outer side of the side wall portions 67. The mounting boss 73 has an outer periphery provided with male threads. In addition, the mounting boss 73 has mounted thereto a fixing nut 74 having a hexagonal shape in cross-section and comprising a threaded hole provided with female threads that are threadedly engaged with the male threads of the mounting boss 73. The another end portion 72b of the height adjustment pin 72 comprises a flange sandwiched and fixed between a lower end surface of the mounting boss 73 and a bottom surface of the threaded hole of the fixing nut 74. An inner diameter of each of the through-hole 67a and the mounting boss 73 is set to be slightly larger than the outer diameter of each of the height adjustment pin 72 and the pin receiving portion 68c of the upper baffle 68 so that the height adjustment pin 72 and the pin receiving portion 68c of the upper baffle 68 are freely retractable with respect to the side wall portion 67.

Figure 27B:
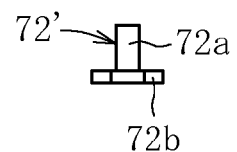
FIG. 27(B) is a view of the height adjustment pin prepared for replacement.

Instead of the height adjustment pin 72 illustrated in FIG. 27(A), there is separately prepared another height adjustment pin 72' that is different in height L of the main body portion 72c. For example, the height adjustment pin 72' comprises a main body portion 72c having a length L of zero as illustrated in FIG. 27(B) (not provided with the main body portion 72c). When the pair of height adjustment pins 72 are replaced with a pair of height adjustment pins 72', the position of the upper baffle 68 is changed along the height direction. In this way, the height of the upper baffle 68 is adjusted. Here, in the following, description is made of a case where the height adjustment pins 72 are replaced with the height adjustment pins 72' so as to change the height H1 of the upper baffle 68.

First, in the state illustrated in FIG. 26, both the pair of fixing nuts 74 are removed from the mounting bosses 73. Next, the pair of height adjustment pins 72 are pulled down to the outside simultaneously with each other. With this, the upper baffle 68 is moved down as indicated by two-dot chain lines in FIG. 26 until the lower end 68b thereof abuts against the side wall portion 67. In this state, the pair of pin receiving portions 68c of the upper baffle 68 are threadedly engaged with insides of the through-holes 67a and the mounting bosses 73, and a lower end surface of the pin receiving portions 68c and the lower end surface of each of the mounting bosses 73 are flush with each other.

Then, the flange of the another end portion 72b of each of the height adjustment pins 72 is rotated with a hex wrench or the like so as to release the threaded engagement between the male threads of the one end portion 72a of each of the height adjustment pins 72 and the females threads of the threaded hole 68d of each of the pin receiving portions 68c of the upper baffle 68. With this, the height adjustment pins 72 are removed from the upper baffle 68. Next, the height adjustment pins 72 are replaced with the height adjustment pins 72', and a flange of the another end portion 72b of each of the height adjustment pins 72' is rotated with a hex wrench or the like. With this, the male threads of the one end portion 72a are threadedly engaged with the female threads of each of the pin receiving portions 68c. After that, the fixing nut 74 is rotated and mounted to each of the mounting bosses 73. With this, the upper baffle 68 is fixed with the lower end 68b being held in abutment against the side wall portion 67 as indicated by the two-dot chain lines in FIG. 26. In this state, a height H3 of the upper end 68a of the upper baffle 68 with respect to the inner surface of the side wall portion 67 is secured. In this way, an operation of changing the height H1 of the upper baffle 68 to the height H3 is completed. Note that, as in the above description, when the height adjustment pins 72 are replaced with still other height adjustment pins that are different in length L of the main body portion 72c from the height adjustment pins 72', the upper baffle 68 can be set to a different height.

Irrespective of the state of the height H1 and the state of the height H3, the upper baffle 68 is provided along the direction perpendicular to the side wall portion 67. Further, in this embodiment, the width W1 of the upper baffle 68 is equal to the width W2 of the lower baffle 69, and hence the changed height H3 of the upper baffle 68 is equal to the height H2 of the lower baffles 69 illustrated in FIG. 25.

Note that, at the time of the operation of changing the height H1 of the upper baffle 68 to the height H3, it is preferred that the side wall portion 67 having mounted thereto the upper baffle 68 to be changed in height be located on a lower side in the rotating drum as a whole and take a horizontal posture. In this case, even after both the height adjustment pins 72 are removed, the pin receiving portions 68c remain engaged with the insides of the through-holes 67a and the mounting bosses 73, and hence the operation can be easily performed.

The rotating drum of the coating apparatus structured as described above according to this embodiment can provide advantages as described below.

The height of the upper end 68a of the upper baffle 68 with respect to the inner surface of the side wall portion 67 can be adjusted from the outside of the rotating drum. Thus, when the height of the upper baffle 68 is adjusted in this way, the height of the upper baffle 68 can be set in accordance with an amount of particles. Further, the height of the upper baffle 68 can be adjusted from the outside of the rotating drum, and hence a person need not enter the rotating drum for the adjustment. Thus, the operation of adjusting the height of the upper baffle 68 can be facilitated, and hence can be performed by a single person. Further, an operation time period can be shortened. In addition, washing need not be performed after the operation of adjusting the height of the upper baffle 68, and hence a time period and cost for the washing are not required.

Further, in this embodiment, the height adjustment pins 72 are replaced to adjust the height of the upper baffle 68. Thus, the height of the upper baffle 68 can be variously changed.

Figure 28:
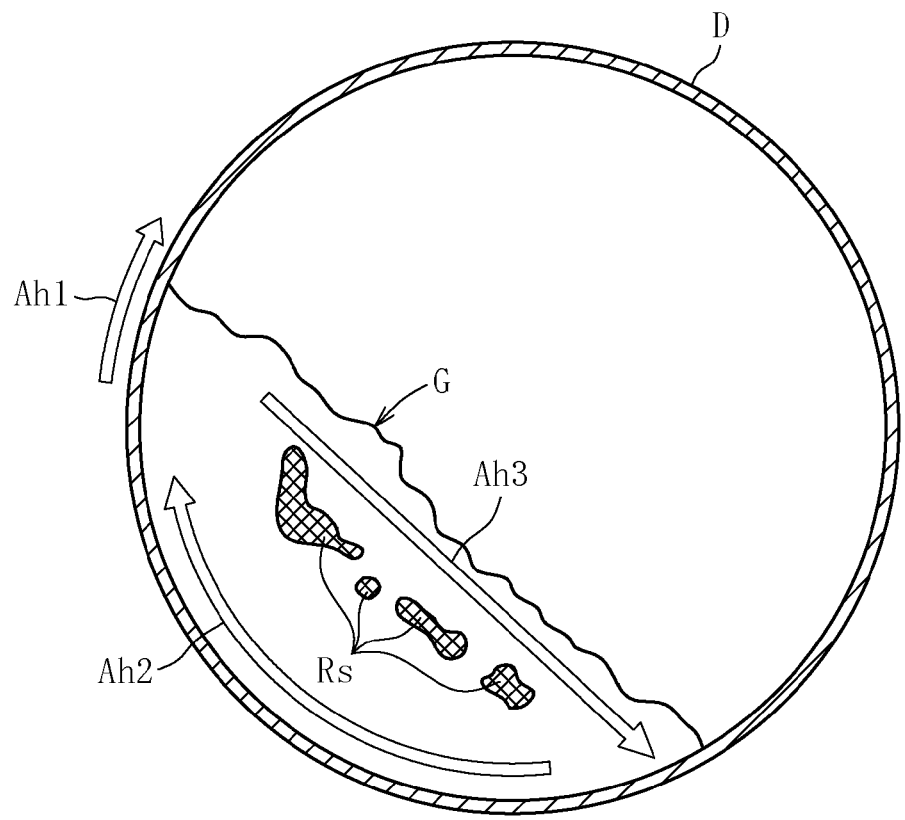
FIG. 28 is a cross sectional view illustrating movement of particles in a rotating drum of a conventional coating apparatus.

Still further, in a conventional pan coating apparatus, as illustrated in FIG. 28, when a rotating drum D is rotated in a direction indicated by a hollow arrow Ah1, the following regions are formed in a particle layer G. Specifically, along with rotation of the rotating drum D, a transportation region, in which particles are moved in a direction indicated by an arrow Ah2, is formed near an inner surface of the rotating drum D, a tumbling region, in which the particles are moved in a direction indicated by an arrow Ah3, is formed near a surface of the particle layer G by gravity, and a stagnation region Rs, in which the particles are moved slowly, is formed between the transportation region and the tumbling region (near the center of the particle layer G). In the stagnation region Rs, the particles are moved slowly, and hence mixing in the entire particle layer G may be insufficient. As a countermeasure, in the rotating drum of this embodiment, as illustrated in FIG. 25, the height of the upper baffle 68 is set to be high, and hence the upper baffles 68 and the lower baffles 69 are provided in two baffle stages. When the rotating drum having the two baffle stages is rotated, particles in a region corresponding to the stagnation region Rs can be moved. Thus, the entire particle layer G can be optimally mixed.

As described above in this embodiment, the position of the upper baffle 68 is changed along the height direction with the height adjustment means 71 so as to adjust the height of the upper baffle 68. Alternatively, as described below, the height of the baffle may be adjusted by inclining the baffles with the height adjustment means 71 with respect to the height direction.

Figure 29:
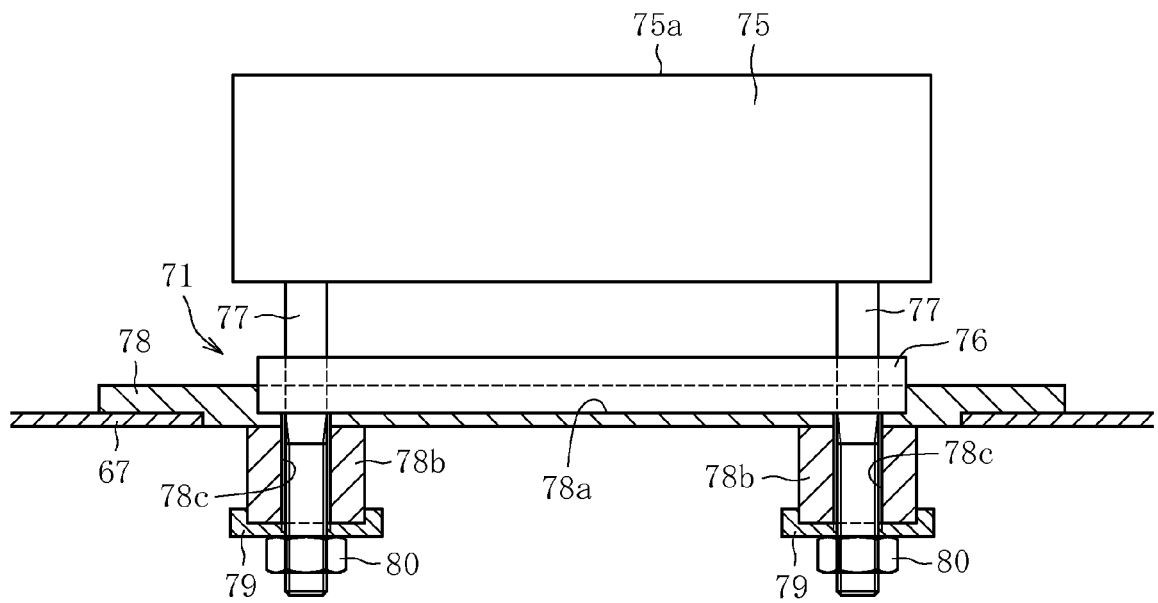
FIG. 29 is a partial sectional front view of a vicinity of a baffle according to another embodiment of the present invention.
Figure 30:
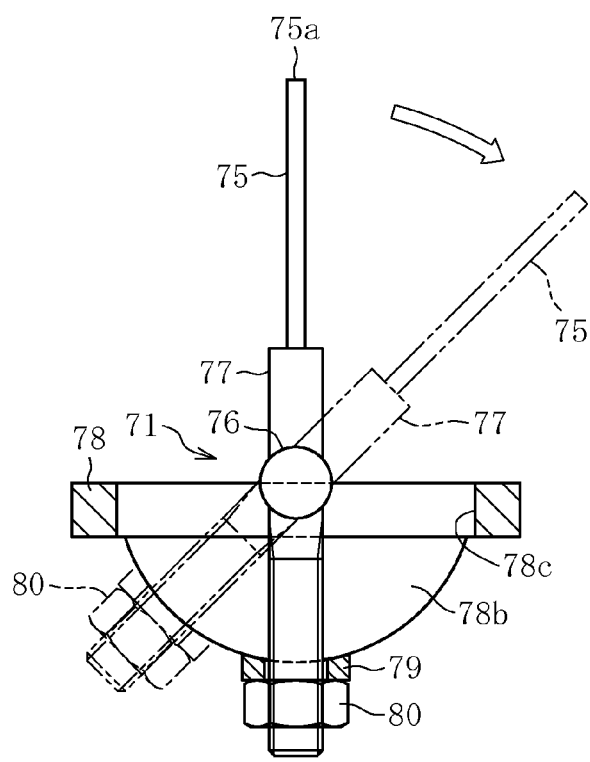
FIG. 30 is a partial sectional side view viewed from the right in FIG. 29.
Figure 31:
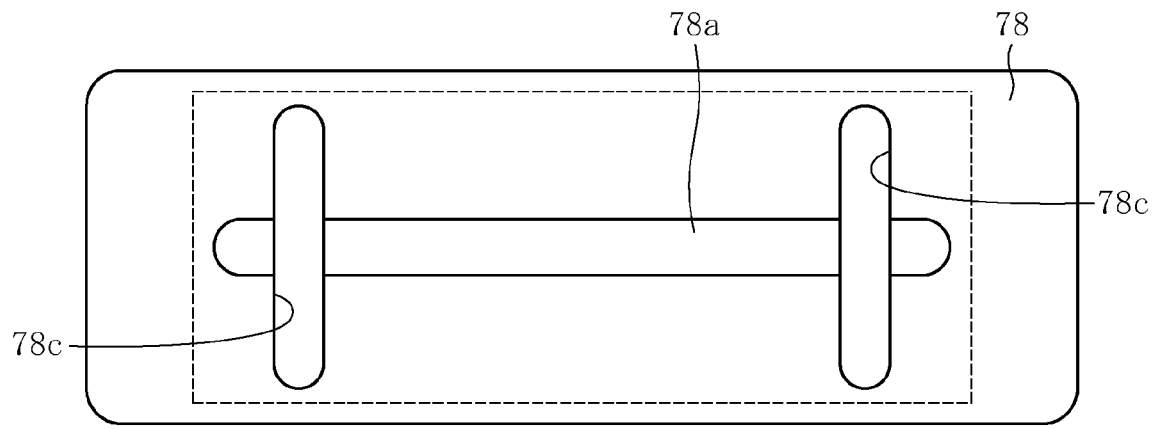
FIG. 31 is a plan view of a base plate according to the another embodiment.

Also in an embodiment of the present invention illustrated in FIGS. 29 to 31, a baffle 75 has a flat plate shape, and is arranged perpendicularly to the side wall portion 67. The height adjustment means 71 for the baffle 75 comprises a rocking shaft 76 supported in a freely rockable manner with respect to the side wall portion 67. The rocking shaft 76 comprises a pair of support rods 77 for supporting the baffle 75. In detail, the rocking shaft 76 has an outer peripheral surface supported in a freely rockable manner with respect to a recessed portion 78a provided on an inner side of a base plate 78 that serves as apart of the side wall portion 67 and is fixed to the side wall portion 67. Partially circular columnar mounting portions 78b are provided on an outer side of the base plate 78. Then, the support rods 77 are inserted in a freely rockable manner through oblong through-holes 78c that are formed through the base plate 78 and the mounting portion 78b thereof, and each comprise one end fixed to the baffle 75. The support rods 77 each comprise another end provided with male threads, and female threads of each nut 80 are threadedly engaged with the male threads through intermediation of a cover member 79. In this way, the another end of each of the support rods 77 is mounted in a freely removable manner to an outer periphery of the mounting portion 78b.

In this embodiment, the nut 80 is loosened to pivot the baffle 75 and the support rod 77 with respect to the side wall portion 67 through intermediation of the rocking shaft 76 as indicated by a hollow arrow in FIG. 30. After that, the nut 80 is tightened to incline the baffle 75 with respect to the height direction. In this way, a height of an upper end 75a of the baffle 75 with respect to the inner surface of the side wall portion 67 is changed.

Figure 32:
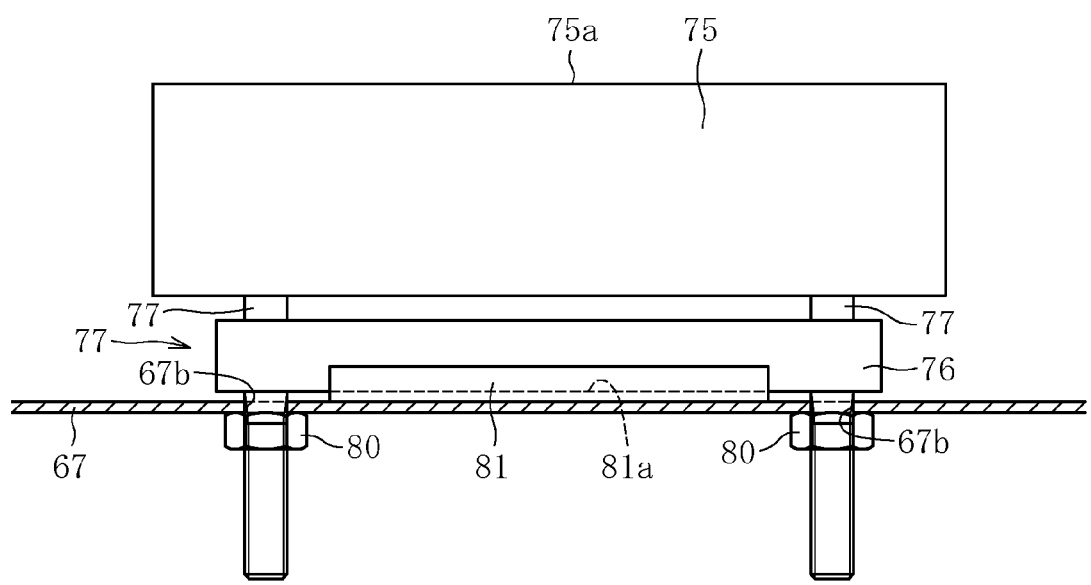
FIG. 32 is a partial sectional front view of a vicinity of a baffle according to another embodiment of the present invention.
Figure 33A:
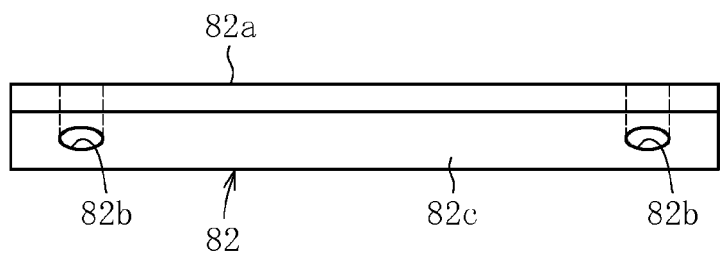
FIG. 33(A) is a front view of a mounting member according to the another embodiment.
Figure 33B:
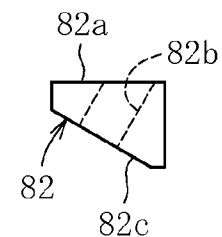
FIG. 33(B) is a right side view of FIG. 33(A).

Next, in an embodiment of the present invention illustrated in FIGS. 32 to 34, the outer peripheral surface of the rocking shaft 76 is supported in a freely rockable manner with respect to a recessed portion 81a provided to a shaft support portion 81 fixed to an inner side of the side wall portion 67. Then, the support rods 77 pass in a freely rockable manner through oblong through-holes 67b that are formed through the side wall portion 67. The one end of each of the support rods 77 is fixed to the baffle 75, and the another end thereof is provided with male threads. Female threads of each of the nuts 80 are threadedly engaged with the male threads. In this way, the another end of each of the support rods 77 is mounted in a freely removable manner to the outer side of the side wall portion 67. In FIG. 32, the baffle 75 is provided along the perpendicular direction, and is not inclined with respect to the height direction as illustrated in FIG. 34(A).

In this embodiment, in order to incline the baffle 75 with respect to the height direction, a mounting member 82 illustrated in FIG. 33, which is freely removable with respect to the side wall portion 67 and the support rods 77, is used. The mounting member 82 comprises a pair of through-holes 82b having a predetermined inclination angle with respect to a mounting surface 82a that abuts against the side wall portion 67, and a surface 82c that is perpendicular to the through-holes 82b. The pair of through-holes 82b of the mounting member 82 are configured to allow the pair of support rods 77 to be inserted therethrough.

Figure 34A:
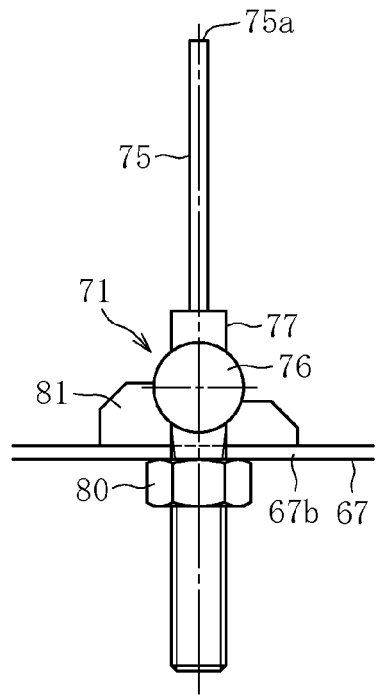
FIG. 34(A) is a view of a degree of inclination of the baffle according to the another embodiment (viewed from the right in FIG. 32), for illustrating a non-inclined state (inclination angle of) 0°.
Figure 34B:
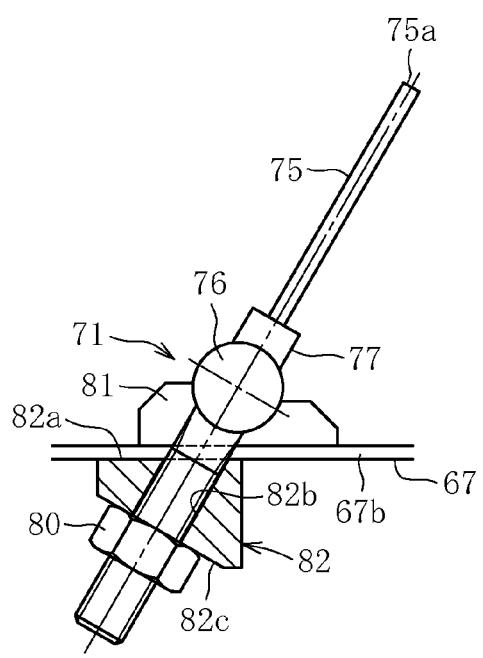
FIG. 34(B) is a view of a state at an inclination angle of 30°.
Figure 34C:
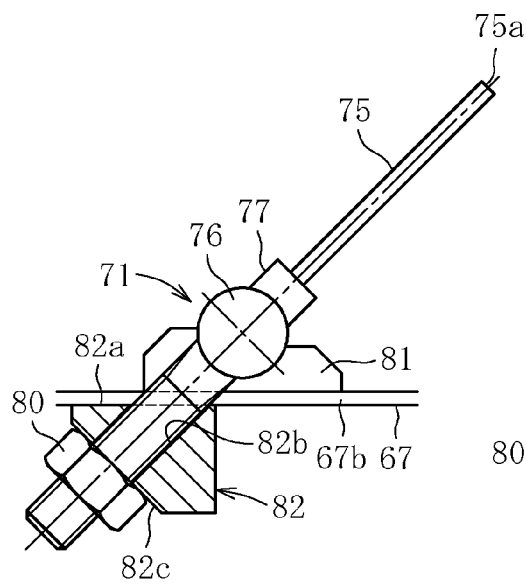
FIG. 34(C) is a view of a state at an inclination angle of 45°.
Figure 34D:
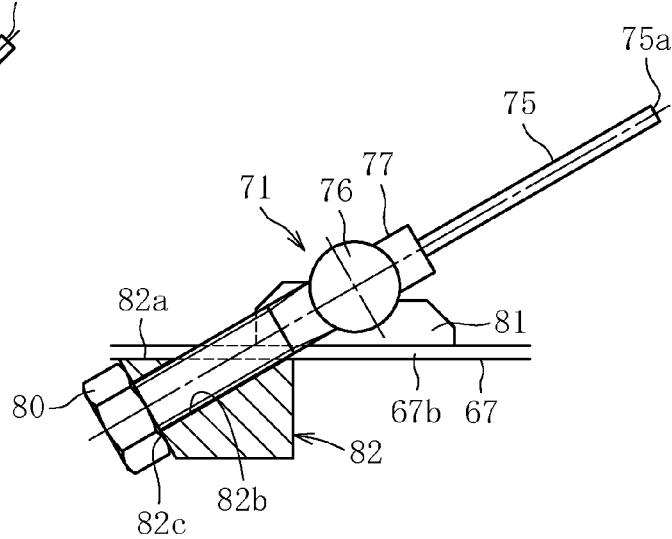
FIG. 34(D) is a view of a state at an inclination angle of 60°.

In this embodiment, the baffle 75 is inclined with respect to the height direction as described below. In the state illustrated in FIG. 34(A) (baffle inclination angle of 0°), after the nut 80 is removed, the support rods 77 are inserted through the through-holes 82b of the mounting member 82, and then the nut 80 is re-mounted to abut against the surface 82c. With this, the baffle 75 is inclined with respect to the height direction, and brought into the state illustrated in FIG. 34(B) (baffle inclination angle of 30°). In this way, the height of the upper end of the baffle 75 is changed with respect to the inner surface of the side wall portion 67. When the through-holes 82b of the mounting member 82 have different inclination angles with respect to the mounting surface 82a, the inclination angle of the baffle 75 can be changed as illustrated in FIG. 34(C) (baffle inclination angle of 45°) and FIG. 34(D) (baffle inclination angle of 60°). When the inclination angle of the baffle 75 is changed in this way, the height of the upper end 75a with respect to the inner surface of the side wall portion 67 can be changed.

Figure 35:
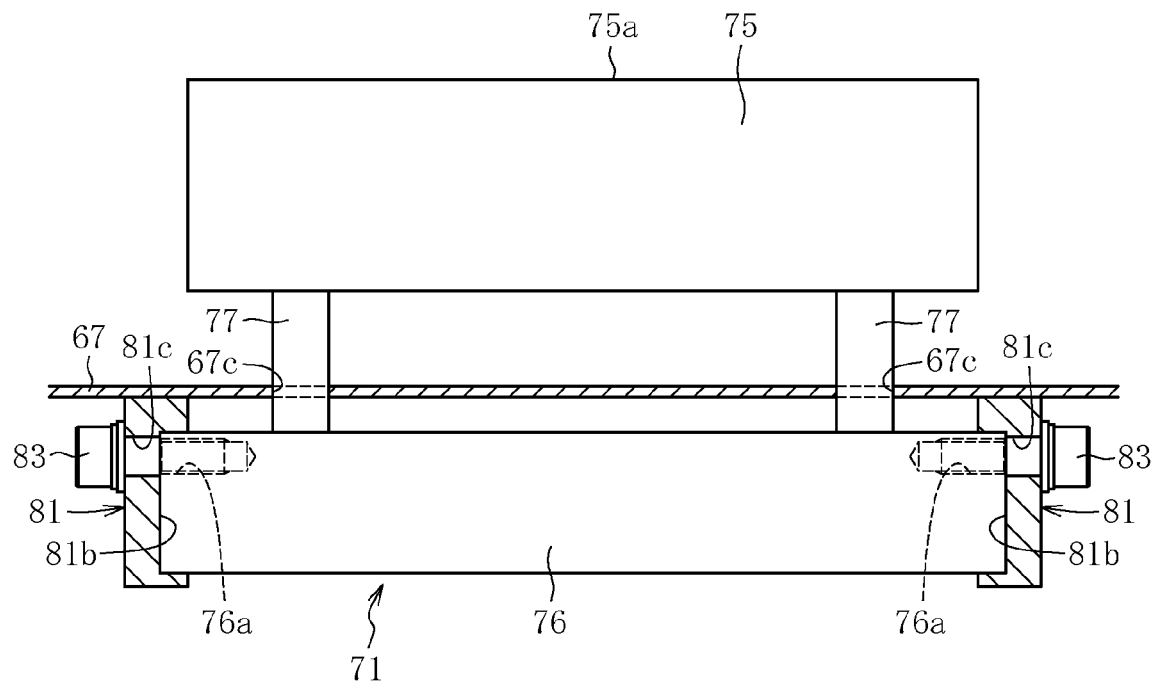
FIG. 35 is a partial sectional front view of a vicinity of a baffle according to another embodiment of the present invention.
Figure 36:
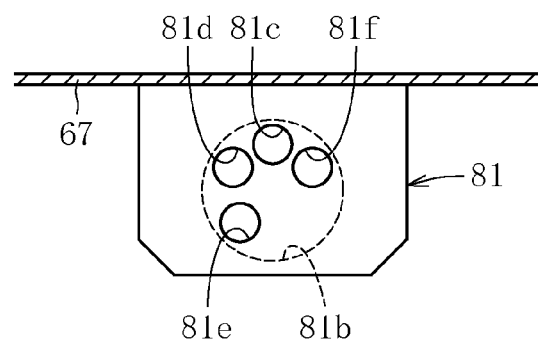
FIG. 36 is a view of a shaft support portion according to the another embodiment (side view viewed from the right in FIG. 35).
Figure 37:
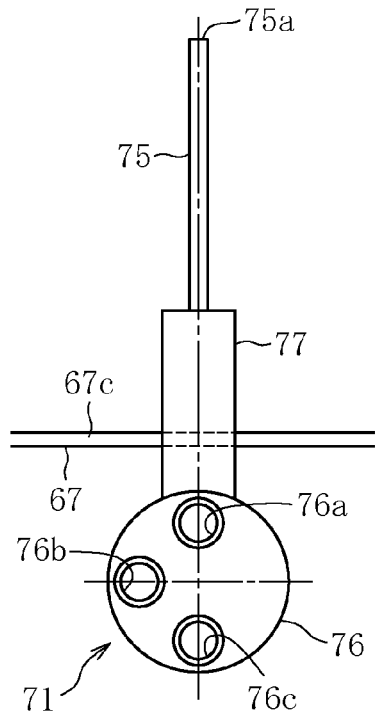
FIG. 37(A) is a view of a degree of inclination of the baffle according to the another embodiment (viewed from the right in FIG. 35), for illustrating a non-inclined state (inclination angle of) 0°.
FIG. 37(B) is a view of a state at an inclination angle of 30°.
FIG. 37(C) is a view of a state at an inclination angle of 45°.
FIG. 37(D) is a view of a state at an inclination angle of 60°.
Figure 37:
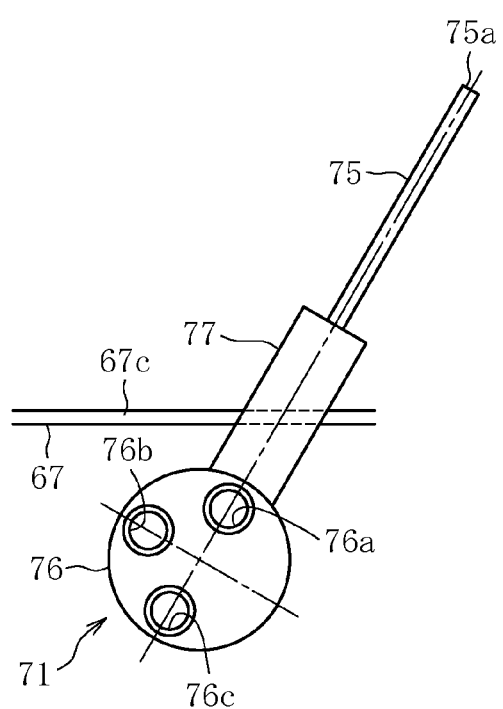
Figure 37:
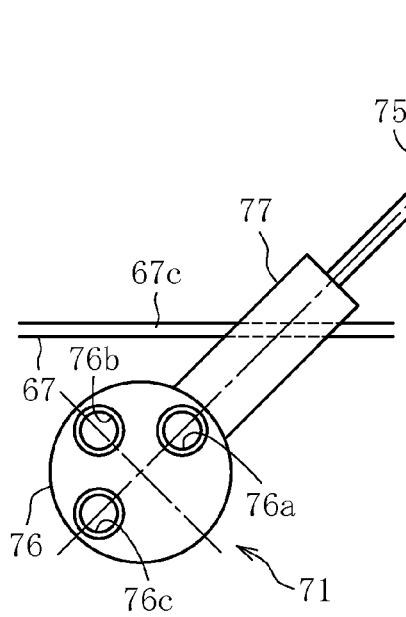
Figure 37:
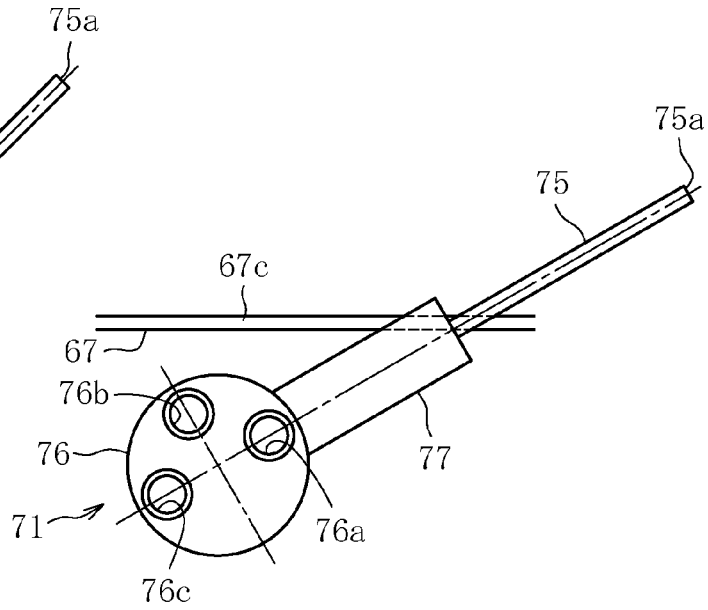

In an embodiment of the present invention illustrated in FIGS. 35 to 37, the rocking shaft 76 comprises axial ends that are supported in a freely rockable manner with respect to a recessed portion 81b provided to a pair of shaft support portions 81 fixed to the outer side of the side wall portion 67. In addition, the support rods 77 pass in a freely rockable manner through oblong through-holes 67c that are formed through the side wall portion 67. The one end of each of the support rods 77 is fixed to the baffle 75, and the another end thereof is fixed to the rocking shaft 76. The rocking shaft 76 has both end surfaces each comprising threaded holes 76a to 76c (refer to FIG. 37). The threaded holes 76a to 76c are each separated from a shaft core by an equal distance, and form a central angle of 90° with respect to each other. Meanwhile, the pair of shaft support portions 81 each comprise through-holes 81c to 81f. In FIG. 35, bolts 83 are threadedly engaged with the threaded holes 76a through the through-holes 81c of the shaft support portions 81 (state illustrated in FIG. 37(A), in which baffle inclination angle is 0°).

In this embodiment, in order to incline the baffle 75 with respect to the height direction, the through-holes 81c to 81f of the shaft support portion 81, through which the bolts 83 are inserted, and the threaded holes 76a to 76c, with which the bolts 83 are threadedly engaged, are changed. For example, when the bolts 83 are threadedly engaged with the threaded holes 76b through the through-holes 81d, the baffle 75 is inclined at 30° as illustrated in FIG. 37(B). Alternatively, when the bolts 83 are threadedly engaged with the threaded holes 76c through the through-holes 81e, the baffle 75 is inclined at 45° as illustrated in FIG. 37(C). Still alternatively, when the bolts 83 are threadedly engaged with the threaded holes 76a through the through-holes 81f, the baffle 75 is inclined at 60° as illustrated in FIG. 37(D). In this way, in this embodiment, the height of the upper end 75a of the baffle 75 with respect to the inner surface of the side wall portion 67 is changed.

Figure 38A:
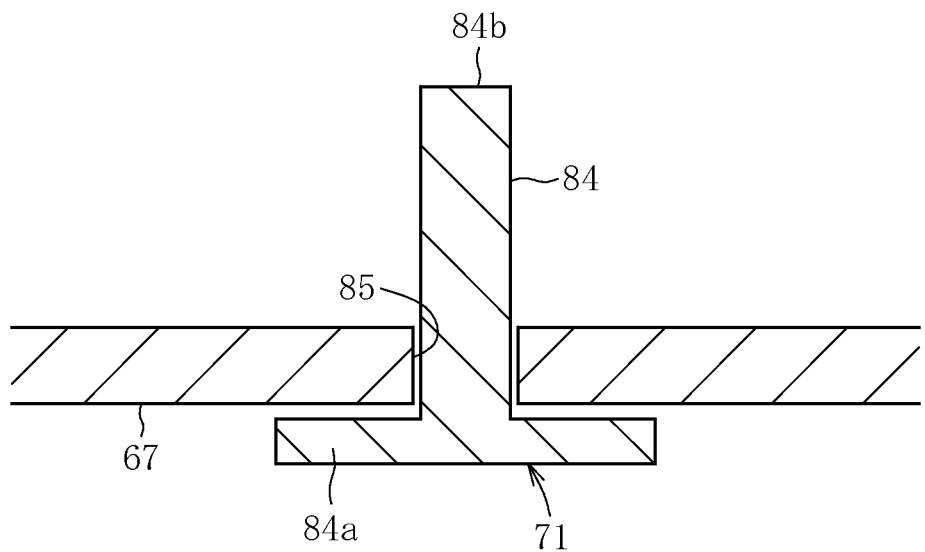
FIG. 38(A) is a sectional view of a vicinity of a baffle according to another embodiment of the present invention.
Figure 38B:
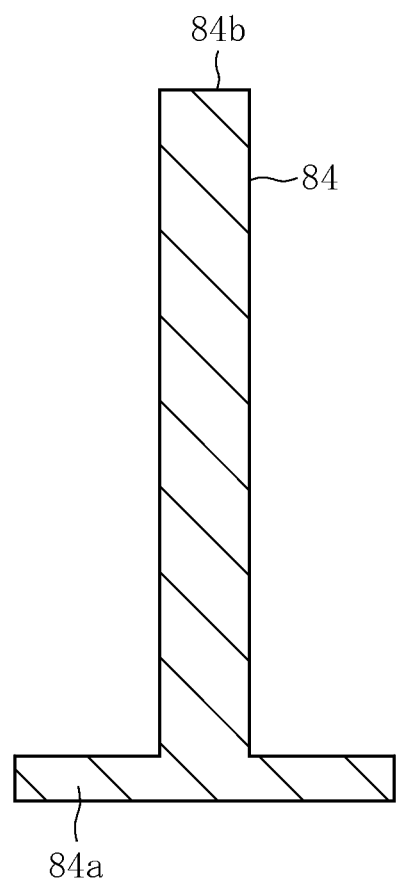
FIG. 38(B) is a view of a baffle prepared for replacement.

In an embodiment of the present invention illustrated in FIG. 38, the height adjustment means 71 comprises a baffle 84. The side wall portion 67 comprises an oblong through-hole 85. The baffle 84 is freely retractable with respect to the side wall portion 67 through intermediation of the through-hole 85. The baffle 84 comprises one end comprising a mounting portion 84a, and the mounting portion 84a is fixed to an outer surface of the side wall portion 67, for example, by fixing means such as a bolt (not shown).

In order to change a height of an upper end 84b of the baffle 84 with respect to the inner surface of the side wall portion 67, the mounting portion 84a is unfixed to remove the baffle 84 from the side wall portion 67. Next, another baffle 84 illustrated in FIG. 38(B), which has a different height, is inserted through the through-hole 85 of the side wall portion 67. Then, the mounting portion 84a of the another baffle 84 is fixed to the outer surface of the side wall portion 67. All the operation of changing the another baffle 84 can also be performed from the outside of the side wall portion 67 (rotating drum).

Figure 39:
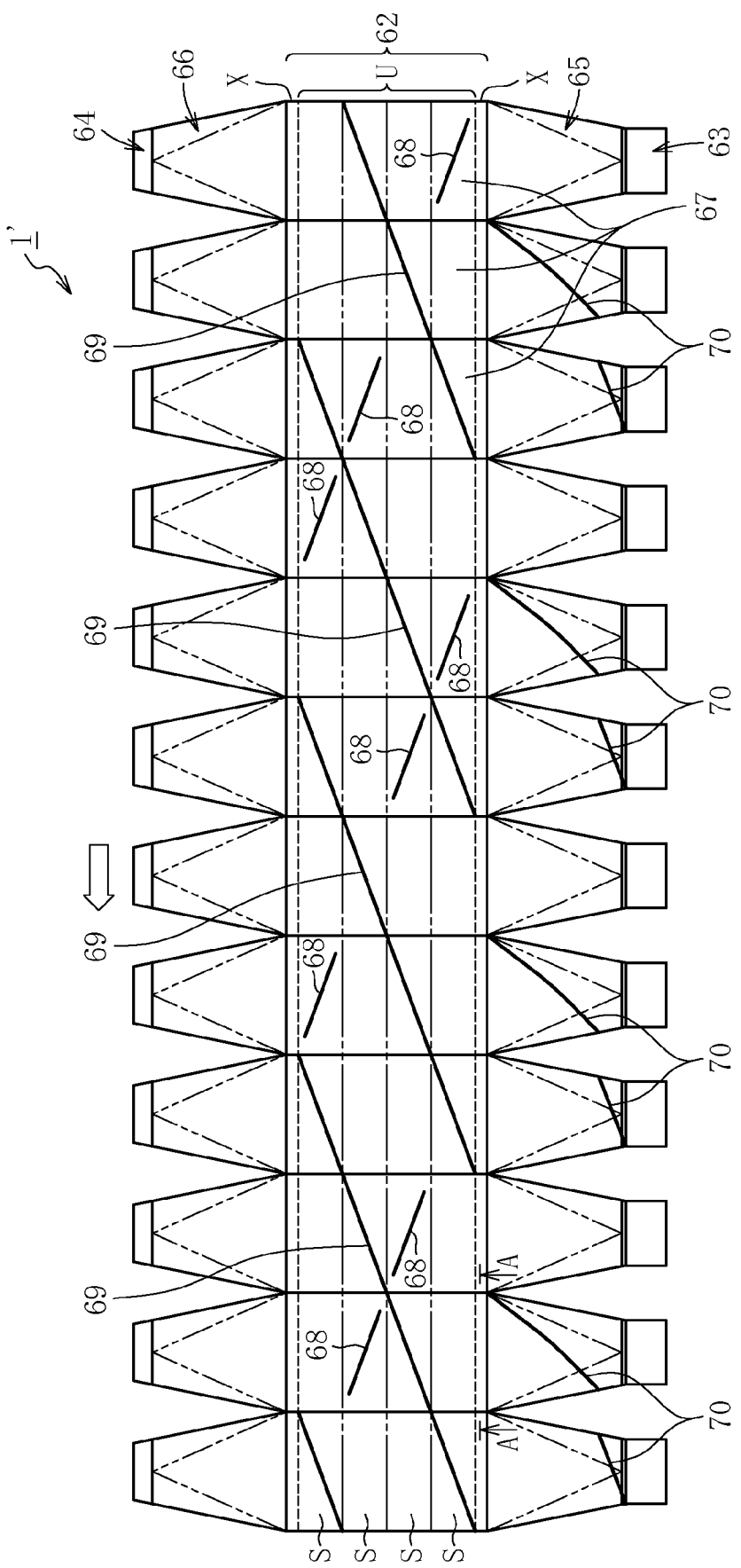
FIG. 39 is a schematic developed view of an inner surface side of a lateral wall portion of a rotating drum according to another embodiment of the present invention.

In another embodiment of the present invention illustrated in FIG. 39, the peripheral wall portion 62 is formed around the center of the axial direction of the lateral wall portion 1' along the circumferential direction in parallel to the axis of the lateral wall portion 1'. In order to more effectively stir and mix the particle layer, in the inner surface of the peripheral wall portion 62, there are provided baffles of two types, that is, the upper baffles 68 and the lower baffles 69 that are respectively relatively high and low with respect to the inner surface of the peripheral wall portion. The peripheral wall portion 62 is segmented along the circumferential direction into a unit region U in which the baffles 68 and 69 are arranged, and regions X on both sides in the axial direction with respect to the unit region U, in which the baffles 68 or 69 are not arranged.

In this embodiment, the peripheral wall portion 62 has a dodecagonal shape in cross-section, and comprises twelve rectangular flat-plate-like side wall portions 67 corresponding to sides of the dodecagonal shape. Further, the side wall portions 67 of the peripheral wall portion 62 each comprise a porous plate and are ventilated.

In the example of FIG. 39, eight upper baffles 68 are set and all formed into the same shape and the same dimensions, and four lower baffles 69 are set and all formed into the same shape and the same dimensions. The upper baffles 68 and the lower baffles 69 each have a flat plate shape, and are provided perpendicularly to the side wall portions 67. The upper baffles 68 are each formed into a substantially trapezoidal plate shape comprising a pair of lateral sides gradually approaching the upper end 68a. The upper baffles 68 can be adjusted in height with respect to the inner surfaces of the side wall portions 67 with the height adjustment means similar to that in the embodiment described above. In contrast, the lower baffles 69 are fixed to the side wall portions 67, and hence cannot be changed in height with respect to the inner surfaces of the side wall portions 67.

The four lower baffles 69 are equiangularly provided. Further, across four side wall portions 67, the lower baffles 69 each extend from a vicinity of an edge on the end wall portion 65 side to a vicinity of an edge on the end wall portion 66 side of the peripheral wall portion 62. End portions of the lower baffles 69 adjacent to each other in the circumferential direction are provided on the same side wall portion 67. In addition, two upper baffles 68 are provided between the lower baffles 69. The upper baffles 68 are provided respectively on different side wall portions 67. The upper baffles 68 each extend from the vicinity of one circumferential end side to the vicinity of another circumferential end side in the side wall portions 67.

The upper baffles 68 and the lower baffles 69 each extend in a direction inclined at the same angle with respect to the circumferential direction of the rotating drum (horizontal direction in FIG. 39), and the directions of the inclinations are opposite to each other. The inclination angle of each of the extending directions with respect to the circumferential direction ranges, for example, from 15° to 25°. Further, the center in the extending direction of each of the upper baffles 68 is located on the circumferential center of the side wall portion 67, and the center in the extending direction of each of the lower baffles 69 is located on the boundary between side wall portions 67 adjacent on the circumferential center side among the four side wall portions 67.

The unit region U of the peripheral wall portion 62 is divided along the circumferential direction as indicated by two-dot chain lines in FIG. 39 into a plurality of (four in FIG.

39) compartments S that are equal to each other in axial length. In this case, the compartments S are equal to each other in numbers of the upper baffles 68 and the lower baffles 69. In FIG. 39, the compartments S each comprise two upper baffles 68 and four lower baffles 69.

The end wall portions 65 comprise twelve triangular sides having bases that double as the edges on the peripheral wall portion 62 side of the end wall portions 65, and twelve triangular sides having bases that double as the edges on the end portion 63 side of the end wall portions 65. The end wall portions 66 comprise twelve triangular sides having bases that double as the edges on the peripheral wall portion 62 side of the end wall portions 66, and twelve triangular sides having bases that double as the edges on the end portion 64 side of the end wall portions 66. In this embodiment, four delivery plates 70 are provided to the end wall portions 65 so as to guide particles at the time of delivering the particles. Those four delivery plates 70 are equiangularly provided. The delivery plates 70 each extend across four triangular sides from the edge on the peripheral wall portion 62 side of the end wall portion 65 to the edge on the end portion 63 side of the end wall portion 65 in the direction inclined with respect to the circumferential direction of the rotating drum (horizontal direction in FIG. 39). The delivery plates 70 and the lower baffles 69 are each inclined in the same direction with respect to the circumferential direction of the rotating drum.

As illustrated in FIGS. 25 and 26, the height H1 of the upper end 68a of the upper baffle 68 with respect to the inner surface of the side wall portion 67 is larger than the height H2 of the upper end 69a of the lower baffle 69. The upper baffle 68 is fixed to the inner surface of the side wall portion 67 through intermediation of the height adjustment pins 72 or the like so that a clearance is secured between the upper baffle 68 and the inner surface of the side wall portion 67. Meanwhile, the lower baffle 69 comprises a lower end fixed directly to the inner surface of the side wall portion 67, and hence a clearance is not secured between the lower baffle 69 and the inner surface of the side wall portion 67. The height H1' of the lower end 68b of the upper baffle 68 is equal to or larger than the height H2 of the upper end 69a of the lower baffle 69. In this embodiment, the height H1' of the lower end 68b is larger than the height H2 of the upper end 69a.

Figure 40:
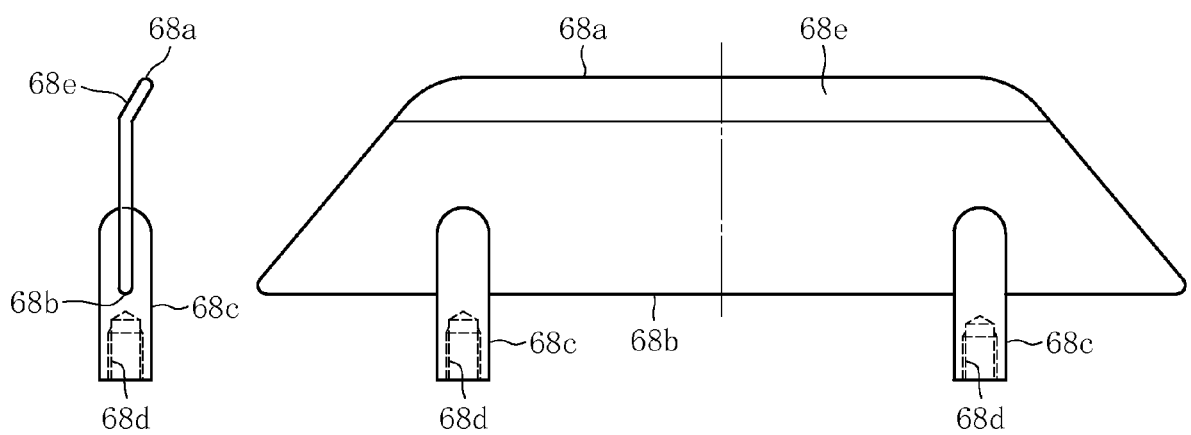
FIG. 40(A) is a side view of another example of an upper baffle.
FIG. 40(B) is a front view of another example of the upper baffle.

As illustrated in FIG. 40, the upper baffle 68 may comprise a distal end portion 68e inclined with respect to other parts. A direction of the inclination is opposite to the rotational direction of the rotating drum at the time of processing particles (upstream side in the rotational direction). An angle of the inclination ranges preferably from 25° to 45°, more preferably from 30° to 45°.

With use of the upper baffle 68 having the distal end portion 68e inclined in this way, the particles under processing are suppressed from perpendicularly colliding against the distal end portion 68e, and hence the particles can be suppressed from cracking or chipping. However, when the inclination angle of the distal end portion 68e is smaller than 25° or larger than 45°, this advantage may not be sufficiently obtained.

Further, with use of the upper baffle 68 having the inclined distal end portion 68e, at the time of delivery of the particles (reverse rotation of the rotating drum), the distal end portion 68e advantageously scoops up the particles. This advantage enables the distal end portion 68e to efficiently guide the particles to a proximal portion side of the lower baffle 69. Thus, a delivery amount of the particles per hour increases, with the result that a delivery step time period can be shortened. However, when the inclination angle of the distal end portion 68e is smaller than 30°, the advantage of scooping up the particles may not be sufficiently obtained.

All the other details are the same as those in the embodiments described above, and hence redundant description thereof is omitted.

Figure 41:
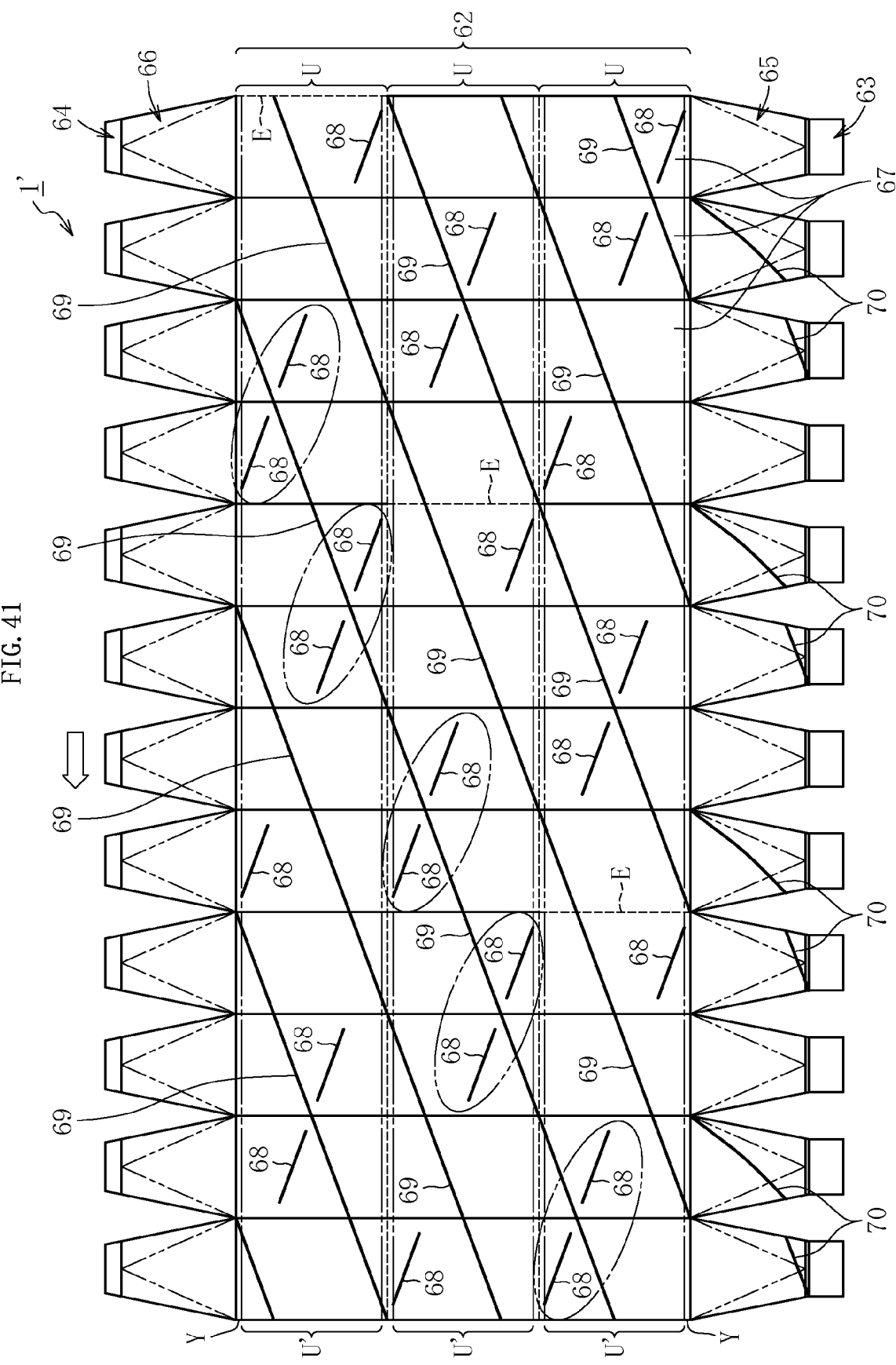
FIG. 41 is a schematic developed view of an inner surface side of a lateral wall portion of a scale-up rotating drum.

As a method of scaling up the rotating drum comprising the baffles as described above, there may be employed a method of expanding, as illustrated, for example, in FIG. 41, the peripheral wall portion 62 of the rotating drum in the axial direction thereof. Three unit regions U extending over the entire circumferential direction are arrayed in the axial direction in the peripheral wall portion 62 exemplified in FIG. 41. The unit regions U are the same as each other in arrangement, shape, and dimension of the baffles (upper baffles 68 and lower baffles 69). The "arrangement" conceptually comprises at least positions, directions, and numbers (hereinafter the same).

Note that, in this embodiment, the unit regions U are shifted equidistantly to one side in the circumferential direction sequentially from the unit region U along one axial end toward the unit region U along another axial end. For example, as indicated by dotted lines in FIG. 41, a corresponding circumferential position E of the middle unit region U is shifted to the left with respect to a circumferential position E of the uppermost unit region U by an amount corresponding to four side wall portions 67, and a corresponding circumferential position E of the lowermost unit region is shifted further to the left with respect to the circumferential position E of the middle unit region U by an amount corresponding to four side wall portions 67. Note that, in this embodiment, the unit regions U need not necessarily be sequentially arrayed in the axial direction, but may be arrayed through intermediation of regions in which baffles are not arranged.

The unit regions U of the peripheral wall portion 62 of FIG. 41 are the same as each other in arrangement, shape, and dimension of the baffles (upper baffles 68 and lower baffles 69) as those of the unit region U of the peripheral wall portion 62 illustrated in FIG. 39. In other words, the rotating drum illustrated in FIG. 41 is obtained by scaling up the rotating drum illustrated in FIG. 39, that is, by increasing the number of axial arrays of the unit region U of the peripheral wall portion 62 illustrated in FIG. 39 from one to three. With the scale-up of the rotating drum, the peripheral wall portion 62 is scaled up three times in the axial direction, and in accordance therewith, a processing capacity of the rotating drum is increased approximately three times.

In this way, the rotating drum comprising the unit region U can be scaled up through application of the method of increasing the number of the axial arrays of the unit region U. By this method, the processing capacity of the rotating drum can be increased in proportion to the number of the arrays of the unit region U. Meanwhile, particle mixing amounts in the unit regions U are substantially the same as each other, and hence mixing properties are substantially the same as each other. In other words, this method enables both suppression of variation in mixing performance and scale-up of the rotating drum.

Figure 42:
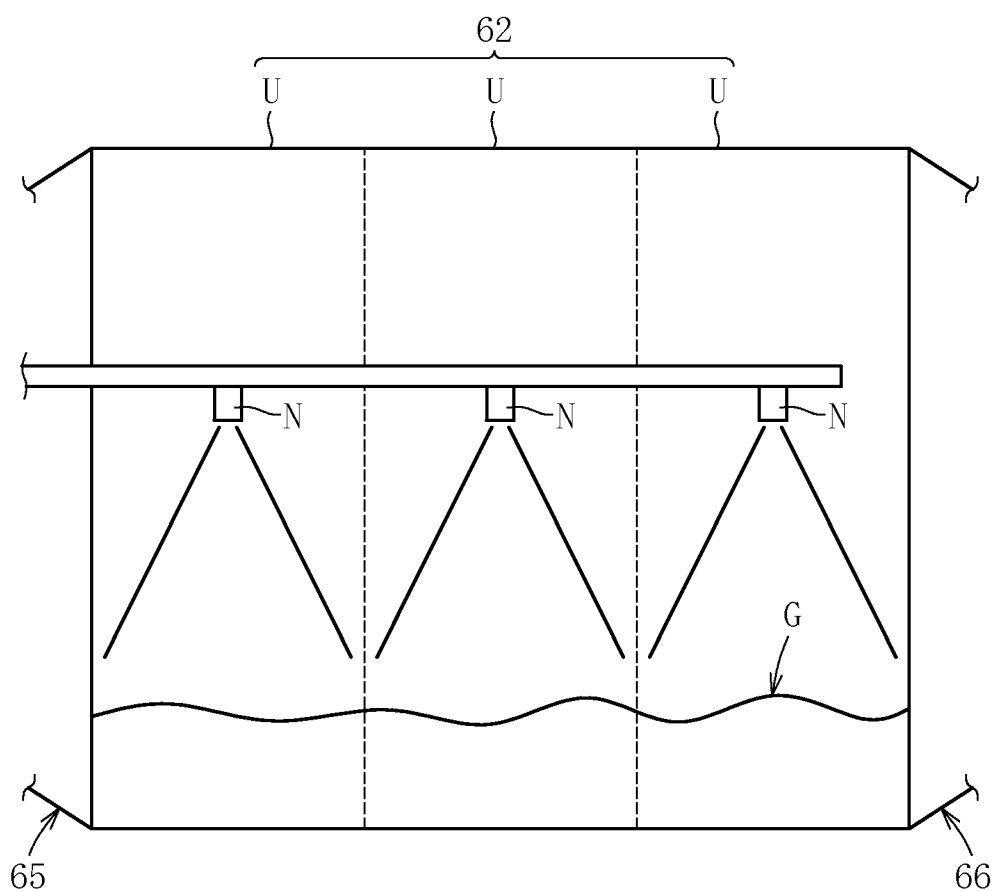
FIG. 42 is a schematic axial sectional view illustrating an operation state of the scale-up rotating drum.

Further, as illustrated in FIG. 42, it is preferred that the numbers of respective spray nozzles N (one in the example of FIG. 42) in the unit regions U after the scale-up be equalized to each other, and that the numbers of the respective spray nozzles N be equalized to the numbers of the respective spray nozzles N in the unit regions U before the scale-up. With this, respective spray areas in the unit regions U before and after the scale-up can be substantially equalized to each other, and hence the spray nozzles N need not be changed, for example, in design. Still further, it is preferred that spray directions and spray positions of the spray nozzles N with respect to the unit regions U before and after the scale-up be set to the same as each other.

In addition, as described above, the unit regions U are arrayed in a shifted pattern in the circumferential direction, and hence the lower baffles 69 are continuous across the unit regions U as illustrated in FIG. 41. Further, for example, as circled by two-dot chain lines, pairs of the upper baffles 68 arranged on each side of the lower baffle 69 are arrayed at a regular interval along the lower baffle 69. In a case where additional unit regions U are provided and arrayed in the same way, the lower baffles 69 are each continuous, and the pairs of the upper baffles are arrayed at the regular interval along the lower baffle 69. In this way, by the scale-up method using the unit regions U in this embodiment, the baffles in the same pattern are continuously and repeatedly arranged in the axial direction. From another viewpoint, that is, with respect to the lower baffles 69, the upper baffles 68 and the lower baffles 69 are continuously arranged in a spiral pattern in the axial direction.

Thus, in the scale-up rotating drum illustrated in FIG. 41, the baffles 68 and 69 are arranged substantially uniformly as viewed not only in the circumferential direction but also in the axial direction. With this, in the scale-up rotating drum, it is unimportant (unnecessary) to circulate or move particles in a depth direction (axial direction) so as to enhance the mixing properties. As a result, the upper baffles 68 and the lower baffles 69 can be structured mainly in consideration of mixing or rolling of particle grains in minute areas. Further, the particles need not be significantly circulated or significantly moved in the entire depth direction of the rotating drum, and hence energy for the significant circulation or the significant movement need not be applied to the particles. As a result, the energy can be effectively used for the mixing and rolling of the particles in the minute areas. In other words, unnecessarily high energy for enhancing the mixing properties need not be applied, and hence application of unnecessary stress to the particles is avoided.

Further, the lower baffles 69 are each continuous across the unit regions. Thus, at the time of delivery of the particles from the rotating drum, the lower baffles 69 cause the particles on a depth side (bottom wall portion side) in the axial direction of the rotating drum to be smoothly moved to the delivery plates 70. As a result, the particles can be delivered from the rotating drum within a shorter time period.

Description is herein made of a case where the rotating drum is scaled up. Meanwhile, for example, the rotating drum illustrated in FIG. 41 may be scaled down to the rotating drum illustrated in FIG. 39 by using a smaller number of the axial arrays of the unit region U.

By the way, in FIG. 41, in regions Y at both axial ends of the peripheral wall portion 62 (regions between the upper baffles 68 on both outermost axial end sides and the end wall portions 65 and 66), the lower baffles 69 may be partially omitted from the regions Y so as not to interfere with the end wall portions 65 and 66. In this case, unit regions U' are formed by omitting regions corresponding to the regions Y from both the axial ends of the unit regions U, and hence three unit regions U' are arrayed in the axial direction. The unit regions U' are the same as each other in arrangement, shape, and dimension of the baffles (upper baffles 68 and lower baffles 69).

Figure 43:
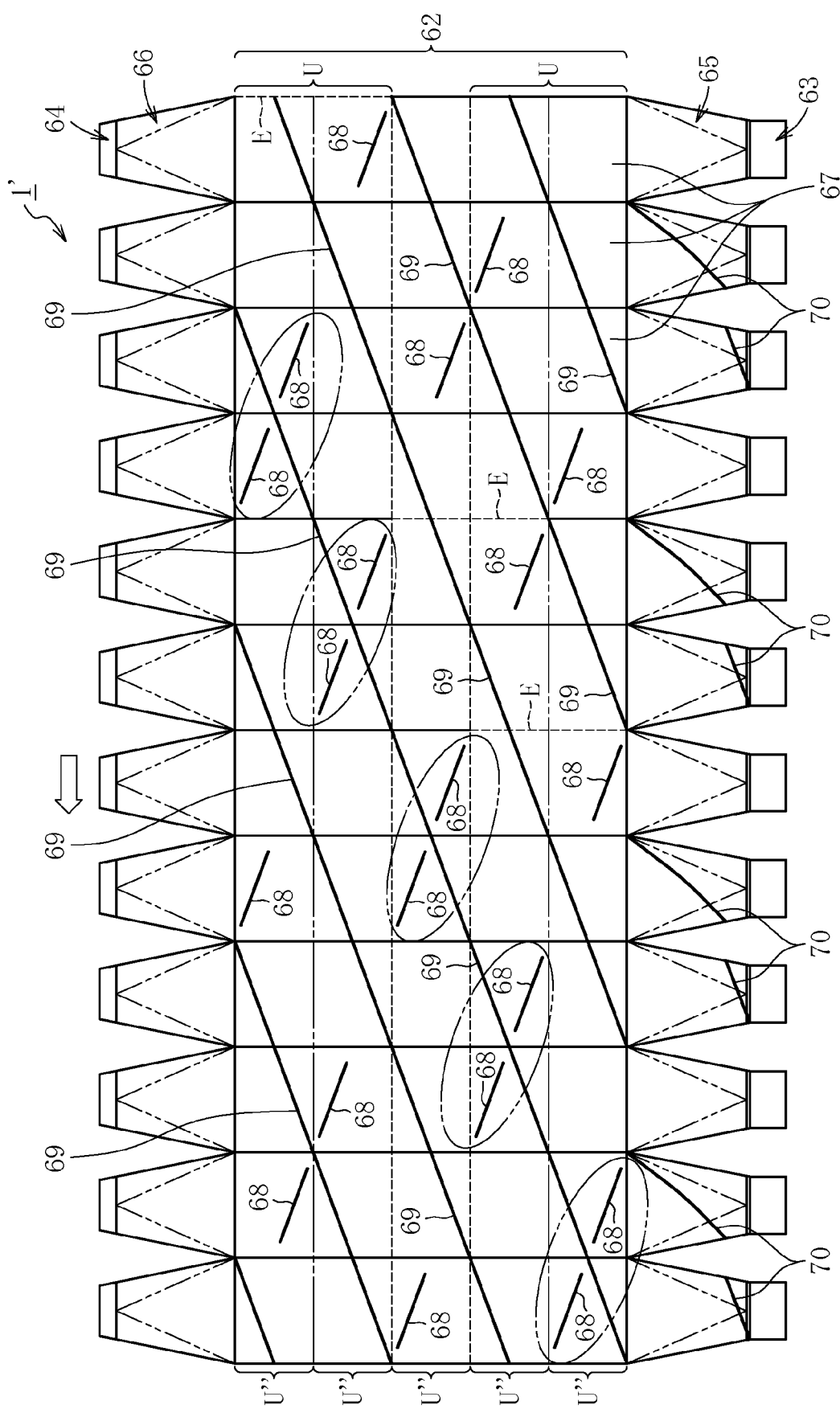
FIG. 43 is a schematic developed view of an inner surface side of a lateral wall portion of a modification of the scale-up rotating drum.

Further, as illustrated in FIG. 43, it may also be appropriate to arrange two point five unit regions U in the axial direction on the peripheral wall portion 62. In this case, the corresponding circumferential position E of the lowermost unit region is shifted to the left with respect to the circumferential position E of the uppermost unit region U by the amount corresponding to six side wall portions 67. Further, in this case, unit regions U" are formed by bisecting each of the unit regions U at an axial center, and hence five unit regions U" are arrayed in the axial direction. The unit regions U" are the same as each other in arrangement, shape, and dimension of the baffles (upper baffles 68 and lower baffles 69). Further, the unit regions U" are shifted to one side in the circumferential direction sequentially from the unit region U" along one axial end toward the unit region U" along another axial end by an amount corresponding to two side wall portions 67.

The baffle structures of the embodiments described above are applicable to the rotating drum 1 of the coating apparatus according to the embodiment described above. Further, the baffle structures may be applicable not only to a rotating drum having what is called a jacketless structure, but also to a rotating drum having jackets mounted thereto. Still further, the baffle structures may be applicable to a rotating drum without ventilation portions.

The present invention is applicable not only to the coating apparatus comprising the rotating drum that comprises the peripheral wall portion having the polygonal shape in cross-section, but also to a coating apparatus comprising a rotating drum that comprises a peripheral wall portion having a circular shape, a conical shape, or a polygonal conical shape in cross-section. Further, the present invention is applicable not only to a coating apparatus having what is called the jacketless structure, but also to a coating apparatus having a structure in which jackets are mounted to the peripheral wall portion of the rotating drum. Still further, the present invention is applicable not only to a coating apparatus in which the rotating drum is driven to rotate about the axis parallel to or substantially parallel to a horizontal line, but also to a coating apparatus in which the rotating drum is driven to rotate about an axis inclined with respect to the horizontal line.

REFERENCE SIGNS LIST 1 rotating drum
1a peripheral wall portion
1a1 side surface
1a2 apexe
10 ventilation member
10a sliding contact portion
10b ventilation hole
13 sealing ring
14 partition portion
14a proximal portion
14b sealing member
40 cylindrical ventilation member
40a inner periphery
40b ventilation hole

The invention claimed is:
1. A coating apparatus comprising:
a ventilated rotating drum that is to contain particles to be processed and is driven by a rotary drive mechanism to rotate about an axis of the rotating drum;
a spray nozzle unit comprising at least one spray nozzle for spraying a spray liquid to a particle layer of the particles at an inside of the rotating drum;
a nozzle moving mechanism configured to move the spray nozzle unit between the inside of the rotating drum and outside of the rotating drum; and
a ventilation member,
wherein the rotating drum comprises:
a peripheral wall portion comprising a ventilation portion for communicating the inside of the rotating drum and the outside of the rotating drum to each other; and a plurality of partition portions provided on an outer periphery of the peripheral wall portion at predetermined intervals in a rotational direction of the rotating drum, wherein the ventilation member comprises a ventilation hole and is arranged on an outer peripheral side of the peripheral wall portion of the rotating drum, and wherein the plurality of partition portions each comprise:
- a proximal portion fixed to the outer periphery of the peripheral wall portion; and
- a sealing member mounted to the proximal portion in a manner that the sealing member is allowed to move in inner and outer circumferential directions of the peripheral wall portion, the sealing member being held in sliding contact with the ventilation member during rotation of the rotating drum.

2. The coating apparatus according to claim 1, further comprising annular sealing rings mounted to both axial end portions of the outer periphery of the peripheral wall portion,
wherein the annular sealing rings are held in sliding contact with the ventilation member during rotation of the rotating drum.

3. The coating apparatus according to claim 1, wherein the ventilation member is arranged at a predetermined position in the rotational direction of the rotating drum.

4. The coating apparatus according to claim 1, wherein the ventilation member is arranged so as to cover the peripheral wall portion of the rotating drum from the outer peripheral side.

5. The coating apparatus according to claim 1, wherein the sealing member of each of the plurality of partition portions is held in press-contact with the ventilation member by being urged by a centrifugal force generated during rotation of the rotating drum.

6. The coating apparatus according to claim 1, wherein the peripheral wall portion of the rotating drum has a polygonal shape in cross-section.

7. The coating apparatus according to claim 6, wherein the plurality of partition portions are arranged at apexes and side surfaces of the peripheral wall portion of the rotating drum.

8. The coating apparatus according to claim 1, wherein
the rotating drum has a front end opening portion through which the nozzle moving mechanism is configured to move the spray nozzle unit between the inside of the rotating drum and the outside of the rotating drum, and
the nozzle moving mechanism comprises a nozzle position adjustment mechanism configured to move the spray nozzle unit between a first position at which the spray nozzle unit is located on a radially inner side with respect to a diameter of the front end opening portion of the rotating drum, and a second position at which the at least one spray nozzle of the spray nozzle unit is located on a radially outer side with respect to the diameter of the front end opening portion of the rotating drum and on a downstream side in the rotational direction of the rotating drum with respect to a vertical plane including the axis of the rotating drum.

9. The coating apparatus according to claim 1, further comprising an air inlet portion for supplying a process gas to the inside of the rotating drum through an opening portion provided to at least one of a front end portion and a rear end portion of the rotating drum,
wherein the air inlet portion comprises an airflow control portion configured to control a flow of the process gas supplied to the inside of the rotating drum through the opening portion so that the process gas flows toward a space portion in the rotating drum, the space portion being above the particle layer and an upstream side in the rotational direction of the rotating drum with respect to the spray nozzle unit.

10. The coating apparatus according to claim 1, further comprising:
- a baffle for stirring the particles, the baffle being provided on an inner surface of the peripheral wall portion of the rotating drum; and
- a height adjustment unit configured to adjust a height of the baffle with respect to the inner surface of the peripheral wall portion from the outside of the rotating drum.

11. The coating apparatus according to claim 1, further comprising a plate shaped baffle provided on an inner surface of the peripheral wall portion of the rotating drum, the plate shaped baffle comprising a plurality of upper baffles arranged at predetermined intervals in the rotational direction of the rotating drum and a plurality of lower baffles arranged at predetermined intervals in the rotational direction of the rotating drum,
wherein the upper baffles and the lower baffles extend in respective directions inclined opposite to each other with respect to the rotational direction of the rotating drum, and
wherein a height of a lower end of each of the upper baffles is equal to or larger than a height of an upper end of each of the lower baffles.

* * * * *